United States Patent
Yajima et al.

(10) Patent No.: US 11,080,882 B2
(45) Date of Patent: Aug. 3, 2021

(54) DISPLAY CONTROL DEVICE, DISPLAY CONTROL METHOD, AND PROGRAM

(71) Applicant: Sony Corporation, Tokyo (JP)

(72) Inventors: Masakazu Yajima, Kanagawa (JP); Tomoya Onuma, Shizuoka (JP); Mari Saito, Kanagawa (JP); Yoshiyasu Kubota, Kanagawa (JP); Shogo Kawata, Tokyo (JP); Chisako Kajihara, Tokyo (JP); Akihiro Mukai, Chiba (JP)

(73) Assignee: Sony Corporation

( * ) Notice: Subject to any disclaimer, the term of this patent is extended or adjusted under 35 U.S.C. 154(b) by 114 days.

(21) Appl. No.: 16/465,609

(22) PCT Filed: Oct. 6, 2017

(86) PCT No.: PCT/JP2017/036444
§ 371 (c)(1),
(2) Date: May 31, 2019

(87) PCT Pub. No.: WO2018/105222
PCT Pub. Date: Jun. 14, 2018

(65) Prior Publication Data
US 2019/0385332 A1 Dec. 19, 2019

(30) Foreign Application Priority Data
Dec. 8, 2016 (JP) .............................. JP2016-238166

(51) Int. Cl.
*G06K 9/00* (2006.01)
*A01K 1/10* (2006.01)
(Continued)

(52) U.S. Cl.
CPC .............. *G06T 7/70* (2017.01); *G02B 27/017* (2013.01); *G06T 11/001* (2013.01); *G06T 11/60* (2013.01);
(Continued)

(58) Field of Classification Search
USPC ........ 382/100, 103, 106–107, 110, 155, 162, 382/168, 173, 181, 206, 214, 209, 219,
(Continued)

(56) References Cited

U.S. PATENT DOCUMENTS

2002/0010390 A1* 1/2002 Guice .................. A61B 5/0031
600/300
2005/0257748 A1* 11/2005 Kriesel .................. A01K 29/00
119/51.02
(Continued)

FOREIGN PATENT DOCUMENTS

JP 9-153145 A 6/1997
JP 2008-073005 A 4/2008
(Continued)

OTHER PUBLICATIONS

International Search Report and Written Opinion and English translation thereof dated Dec. 26, 2017 in connection with International Application No. PCT/JP2017/036444.

*Primary Examiner* — Seyed H Azarian
(74) *Attorney, Agent, or Firm* — Wolf, Greenfield & Sacks, P.C.

(57) ABSTRACT

[Object] It is desirable to provide a technology capable of more enjoyably managing a target object.
[Solution] Provided is a display control device including a display control unit configured to perform control such that an image corresponding to state information of a target object located in a field of view of a user is displayed at a position having a predetermined positional relation with a
(Continued)

position of the target object and an output control unit configured to control output of comment information of the target object corresponding to the state information of the target object and feature information of the target object.

17 Claims, 25 Drawing Sheets

(51) Int. Cl.
*G06T 7/70* (2017.01)
*G02B 27/01* (2006.01)
*G06T 11/00* (2006.01)
*G06T 11/60* (2006.01)
*G06T 19/00* (2011.01)
*G10L 15/26* (2006.01)

(52) U.S. Cl.
CPC ............ *G06T 19/006* (2013.01); *G10L 15/26* (2013.01); *G02B 2027/0178* (2013.01); *G06T 2207/20101* (2013.01)

(58) Field of Classification Search
USPC .............. 382/224, 254, 276, 305, 312, 154; 600/300; 119/51.02, 51.03; 73/431
See application file for complete search history.

(56) References Cited

U.S. PATENT DOCUMENTS

| 2011/0295513 | A1 | 12/2011 | Owada |
| 2012/0206598 | A1 | 8/2012 | Hanafusa et al. |
| 2014/0338447 | A1* | 11/2014 | Sharpe .................. A01K 11/00 73/431 |
| 2016/0275580 | A1* | 9/2016 | Uechi ................ G06Q 10/0838 |
| 2017/0006838 | A1* | 1/2017 | Brayer ................ A01K 15/029 |
| 2018/0227697 | A1* | 8/2018 | Norris ..................... H04S 7/304 |

FOREIGN PATENT DOCUMENTS

| JP | 2011-049773 A | 3/2011 |
| JP | 2011-248502 A | 12/2011 |
| JP | 2012-165709 A | 9/2012 |
| JP | 2017-135570 A | 8/2017 |
| WO | WO 2014/188273 A2 | 11/2014 |

* cited by examiner

| PERSONIFICATION MODEL ID | PERSONIFICATION MODEL NAME | PERSONIFICATION MODEL FEATURE INFORMATION | CONVERSATION INFORMATION ||| ICON INFORMATION ||
|---|---|---|---|---|---|---|---|
| | | | EACH NATIONAL LANGUAGE ID | DIALECT ID | SPEAKING STYLE INFORMATION | ABNORMALITY CONFIRMATION | ... |
| 01 | ACTRESS A | XXXXXX | 00: JAPANESE | 05: HOKKAIDO | FILE FL-1 | G-2-01 | ... |
| ... | ... | ... | ... | ... | ... | ... | ... |

FIG. 7

| INDIVIDUAL ID | PERSONIFICATION MODEL ID | STATE INFORMATION | INDIVIDUAL FEATURE INFORMATION | ... |
|---|---|---|---|---|
| 05:COW B-2 | 01: ACTRESS A | "ABNORMALITY CONFIRMATION" | xxxxxx | ... |
| ... | ... | ... | ... | ... |

222

DISPLAY CONTROL DEVICE, DISPLAY CONTROL METHOD, AND PROGRAM

Cross-Reference To Related Applications

This application claims the benefit under 35 U.S.C. § 371 as a U.S. National Stage Entry of International Application No. PCT/JP2017/036444, filed in the Japanese Patent Office as a Receiving Office on Oct. 6, 2017, which claims priority to Japanese Patent Application Number JP2016-238166, filed in the Japanese Patent Office on Dec. 8, 2016, each of which is hereby incorporated by reference in its entirety.

TECHNICAL FIELD

The present disclosure relates to a display control device, a display control method, and a program.

BACKGROUND ART

In recent years, various techniques have been known as techniques for managing a target object. For example, a technique for managing a farm animal which is an example of a target object is known. Further, various techniques have been disclosed as techniques for managing farm animals. For example, a technique for managing farm animals using position information from a Global Navigation Satellite System (GNSS) has been disclosed (for example, see Patent Literature 1).

CITATION LIST

Patent Literature

Patent Literature 1: JP 2008-73005A

DISCLOSURE OF INVENTION

Technical Problem

However, it is desirable to provide a technology capable of more enjoyably managing a target object.

Solution to Problem

According to the present disclosure, provided is a display control device including a display control unit configured to perform control such that an image corresponding to state information of a target object located in a field of view of a user is displayed at a position having a predetermined positional relation with a position of the target object and an output control unit configured to control output of comment information of the target object corresponding to the state information of the target object and feature information of the target object.

According to the present disclosure, provided is a display control method including performing control such that an image corresponding to state information of a target object located in a field of view of a user is displayed at a position having a predetermined positional relation with a position of the target object and controlling, by a processor, output of comment information of the target object corresponding to the state information of the target object and feature information of the target object.

According to the present disclosure, provided is a program causing a computer to function as a display control device including a display control unit configured to perform control such that an image corresponding to state information of a target object located in a field of view of a user is displayed at a position having a predetermined positional relation with a position of the target object and an output control unit configured to control output of comment information of the target object corresponding to the state information of the target object and feature information of the target object.

Advantageous Effects of Invention

As described above, in accordance with the present disclosure, a technology capable of more enjoyably managing a target object is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a diagram illustrating an example of personification model information.

FIG. 7 is a diagram illustrating an example of some individual information.

MODE(S) FOR CARRYING OUT THE INVENTION

Figure 1:
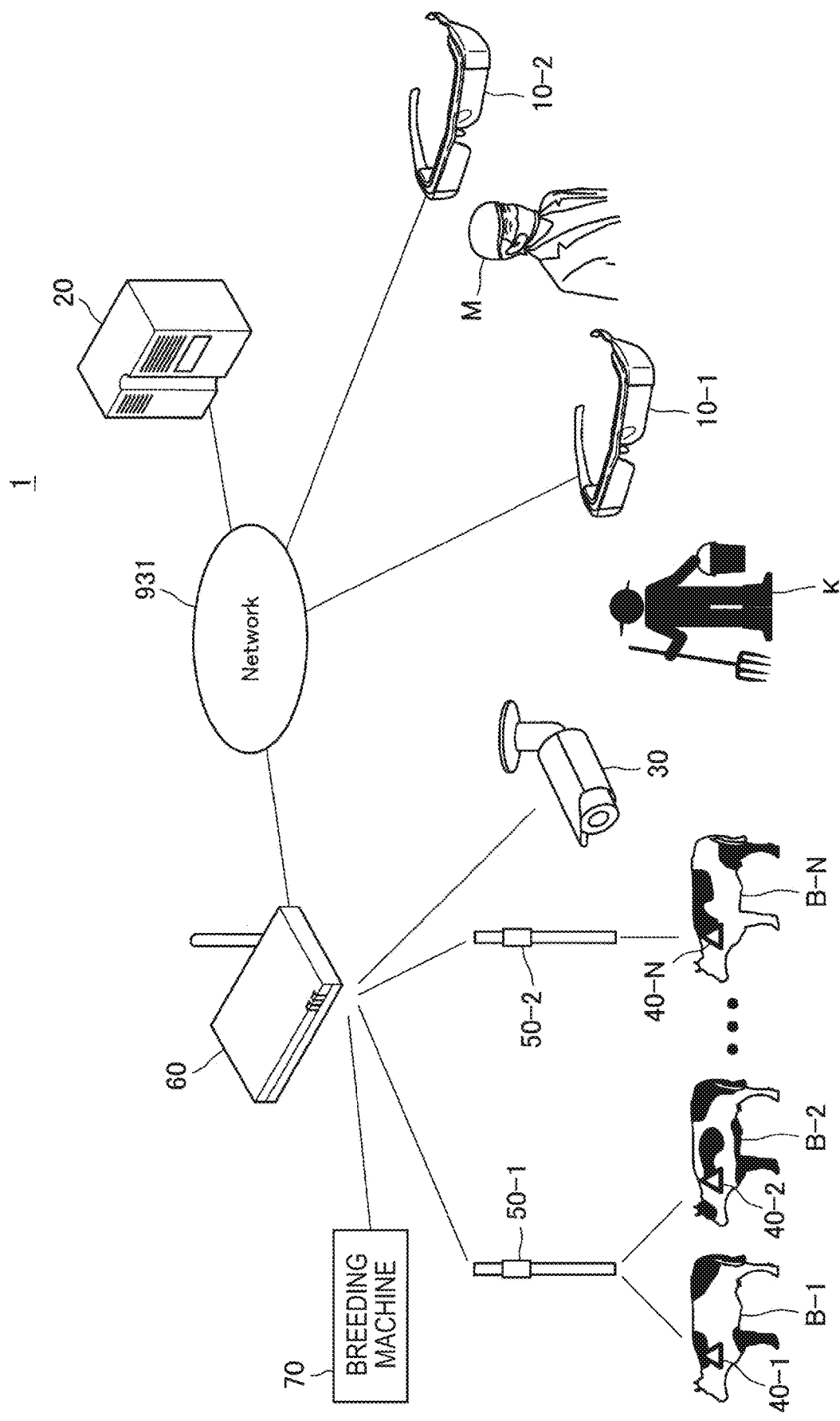
FIG. 1 is a diagram illustrating a configuration example of a display control system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in the present specification and the drawings, structural elements that have substantially the same or similar function and structure are sometimes distinguished from each other using different numbers after the same reference sign. However, when there is no need in particular to distinguish structural elements that have substantially the same or similar function and structure, the same reference sign alone is attached. Further, there are cases in which similar structural elements of different embodiments are distinguished by adding the same reference numeral followed by different letters. However, in a case where it is not necessary to particularly distinguish each of similar structural element, only the same reference signs are attached.

Further, the description will proceed in the following order.

0. Overview
1. Embodiment of the present disclosure
1.1. System configuration example
1.2. Functional configuration example of communication terminal
1.3. Functional configuration example of server
1.4. Functional configuration example of external sensor
1.5. Functional configuration example of wearable device
1.6. Details of functions of display control system
1.6.1. Communication terminal used by farmer
1.6.2. Communication terminal used by veterinarian
1.6.3. Operation examples
1.7. Hardware configuration example
2. Conclusion

0. OVERVIEW

In recent years, various techniques have been known as techniques for managing a target object. For example, a technique for managing a farm animal which is an example of a target object is known. Further, various techniques have been disclosed as techniques for managing farm animals. For example, a technique for managing farm animals using position information from a Global Navigation Satellite System (GNSS) has been disclosed (for example, see JP 2008-73005A). However, it is desirable to provide a technology capable of more enjoyably managing a target object.

As an example, in the case of farm animals such as milk cows, there are cases in which a breeding headcount exceeds 100, and there are also cases in which a breeding headcount exceeds 1000. Therefore, in the case of farm animals such as milk cows, it is necessary to manage a plurality of farm animals as a group (group management is necessary). In the following description, farm animals (in particular, cows, which are farm animals) will be described as target objects to be managed as a group, but target objects to be managed as a group are not limited to farm animals. For example, the target objects to be managed as a group may be living objects other than farm animals (for example, human beings or the like) or non-living objects (for example, mobile objects such as robots or vehicles).

Further, in this specification, a case in which a group of cows is located in an indoor farm is mainly assumed. However, a place in which a group of cows is located is not limited to an indoor farm. For example, a group of cows may be located in an outdoor farm. Further, in this specification, a case in which a user is a farmer who performs work on a cow and a case in which the user is a veterinarian who examines a state of a cow are mainly assumed. However, the user is not limited to a farmer, and the user is not limited to a veterinarian.

Here, as an example, a case in which a farmer specifies a cow with a bad state (for example, a health state or the like) from a group of cows and desires to perform work on the specified cow or calls a veterinarian for the specified cow to be examined by the veterinarian or the like is assumed. In this case, if the states of all the cows included in the group of cows are to be displayed on a portable terminal or the like, since the states of all the cows are displayed in a very complicated way, it may be difficult to specify a cow. Further, even in a case in which a cow can be specified, it may be difficult to perform confirmation corresponding to a state of the cow.

In this regard, in this specification, a technology of making it possible to easily specify a cow in a predetermined state from a group of cows will be described. Further, in this specification, a technology of making it possible to easily perform confirmation corresponding to a state of a specified cow. Further, in this specification, a technology of making it possible to efficiently perform state confirmation and examination of a cow. Further, taking care of cow may give hard work to a farmer. In this regard, in this specification, a technology of enabling a farmer to take care of a cow especially more enjoyably.

Further, in a case in which a farmer takes care of a farm animal, the hands of the farmer often get dirty. For this reason, in a case in which a farmer takes care of a farm animal, it may be difficult for the farmer to perform a manipulation using a touch panel. In this regard, in this specification, a technique capable of enabling a farmer to easily perform a manipulation without using her or his hands will be described as well.

The overview of the embodiment of the present disclosure has been described above.

1. EMBODIMENT OF THE PRESENT DISCLOSURE

1.1. System Configuration Example

Next, a configuration example of a display control system according to an embodiment of the present disclosure will be described with reference to the appended drawings. FIG. 1 is a diagram illustrating a configuration example of a display control system according to an embodiment of the present disclosure. As illustrated in FIG. 1, a display control system 1 includes a display control device (hereinafter also referred to as a "communication terminal") 10-1, a display control device (hereinafter also referred to as a "communication terminal") 10-2, a server 20, an external sensor 30, wearable devices 40-1 to 40-N, repeaters 50-1 and 50-2, a gateway device 60, a breeding machine 70, and a network 931.

In this specification, a case in which the network 931 is a wireless local area network (LAN) is mainly assumed, but as will be described later, a type of network 931 is not limited. Further, the repeater 50 (the repeaters 50-1 and 50-2) relays communication between the wearable device 40 (the wearable devices 40-1 to 40-N) and the server 20. In the example illustrated in FIG. 1, the number of repeaters 50 is two, but the number of repeaters 50 is not limited to two and is preferably two or more. The gateway device 60 connects the network 931 with the repeater 50 (the repeaters 50-1 and 50-2) and the external sensor 30.

The communication terminal 10-1 is a device used by a farmer K. The farmer K is a breeder breeding cows B-1 to B-N(N is an integer of 2 or more). The communication terminal 10-1 is connected to the network 931 and displays an image (hereinafter also referred to as an "icon") in accordance with a position of a cow located in the field of view of the farmer K and performs transmission and reception of necessary information with the server 20 appropriately, and thus the farmer K can smoothly manage the cows. The icon may be stored by the communication terminal 10-1 or may be stored by the server 20.

Further, in this specification, in consideration of allowing the farmer K to efficiently perform manual labor, a case in which the communication terminal 10-1 is a type of device that is worn by the farmer K (for example, a glasses type, head-mounted display) is assumed. However, the communication terminal 10-1 may be a type of device which is not worn by the farmer K (for example, a smartphone, a panel display mounted on a wall, or the like). Further, in this specification, a case in which the communication terminal 10-1 is a see-through type device is assumed. However, the communication terminal 10-1 may be a non-see-through type device.

The communication terminal 10-2 is a device used by a veterinarian M. The veterinarian M treats an injury or illness of the cows B-1 to B-N. The communication terminal 10-2 is connected to the network 931 and can perform various types of communication and information sharing with the communication terminal 10-1 used by the farmer K via the server 20. For example, the communication terminal 10-2 is capable of making a call with the communication terminal 10-1 used by the farmer K, and is capable of seeing a check result list of registered cows on the basis of a manipulation of the farmer K. The veterinarian M confirms the necessity of taking care of the cow by the farmer K in accordance with a request by a call from the farmer K or by seeing the check result check list, goes to the farmer K and conducts medical practice.

Further, in this specification, in consideration of allowing the veterinarian M to efficiently perform manual labor, a case in which the communication terminal 10-2 is a type of device that is worn by the veterinarian M (for example, a glasses type, head-mounted display) is assumed. However, the communication terminal 10-2 may be a type of device which is not worn by the veterinarian M (for example, a smartphone, a panel display mounted on a wall, or the like). Further, in this specification, a case in which the communication terminal 10-2 is a see-through type device is assumed. However, the communication terminal 10-2 may be a non-see-through type device.

The external sensor 30 is a sensor not directly attached to the body of a cow B (cows B-1 to B-N). In this specification, a case in which the external sensor 30 is a surveillance camera is mainly assumed, but the external sensor 30 is not limited to the surveillance camera. For example, the external sensor 30 may be a drone equipped with a camera. Further, in this specification, a case in which an image (hereinafter also referred to as an "overhead image") is obtained by capturing an overhead image of a part or whole of the cow B (the cows B-1 to B-N) by the external sensor 30 is mainly assumed. However, the direction of the external sensor 30 is not limited.

Further, in this specification, a case in which the external sensor 30 is a visible light camera is mainly assumed. However, a type of external sensor 30 is not limited. For example, the external sensor 30 may be an infrared thermography camera. In a case in which the external sensor 30 is an infrared thermography camera, it is possible to measure a body surface temperature of a cow from an image captured by the infrared thermography camera. Alternatively, the external sensor 30 may be any other type of camera such as a depth sensor capable of acquiring three-dimensional data of a space. The image obtained by the external sensor 30 is transmitted from the external sensor 30 to the server 20 via the gateway device 60 and the network 931.

Further, in addition to the camera, the external sensor 30 may include environmental sensors such as an outside air temperature sensor and a humidity sensor. Values measured by the environmental sensors are transmitted to the server 20 as measurement values.

The server 20 is a device that performs various types of information processing for managing the cow B (the cows B-1 to B-N). Specifically, the server 20 stores information (hereinafter also referred to as "cow information") in which individual information (including identification information), position information, and the wearable device ID of the cow B (the cows B-1 to B-N) are associated with each other, and performs a reading process if necessary. The identification information may include individual identification information assigned from a country, an identification number of an Internet of Things (TOT) device, an individual ID assigned by the farmer K, or the like. Then, the server 20 updates the cow information and reads the cow information if necessary.

The individual information includes basic information (identification information, a name, a date of birth, a sex, or the like), health information (a body length, a weight, a medical history, a treatment history, a pregnancy history, a health level, a breeding history, or the like), activity information (an exercise history or the like), harvest information (a yield history, milk components, or the like), state information (a current situation, information related to work required by a cow, or the like), a schedule (a treatment schedule, a birthing schedule, or the like), feature information, a sensor data log, and the like. Here, the state information (individual state information) is information indicating a state of a cow estimated on the basis of sensor data. On the other hand, the feature information (individual feature information) may include objective data such as a pedigree, subjective data of a user such as a character of a cow decided by the user, and the like in addition to the sensor data.

Examples of the information related to the work required by the cow (hereinafter also referred to as "work content") include periodic measurement, abnormality confirmation, estrus confirmation, and the like (in addition, injury confirmation, pregnancy confirmation, physical condition confirmation, and the like). Further, examples of the current situation include a current place (grazing, a cowshed, milking, or waiting for milking).

The individual information can be input and updated manually by the farmer K or automatically. For example, the farmer K can determine whether a physical condition of the cow is good or bad by visually observing the state of the cow and input information indicating whether the determined physical condition of the cow is good or bad. A health state on the server 20 is updated depending on whether the physical condition of the cow is good or bad which is input by the farmer K. On the other hand, the veterinarian M can examine the cow and input a diagnosis result. The health state on the server 20 is updated in accordance with the diagnosis result input by the veterinarian M.

Figure 3:
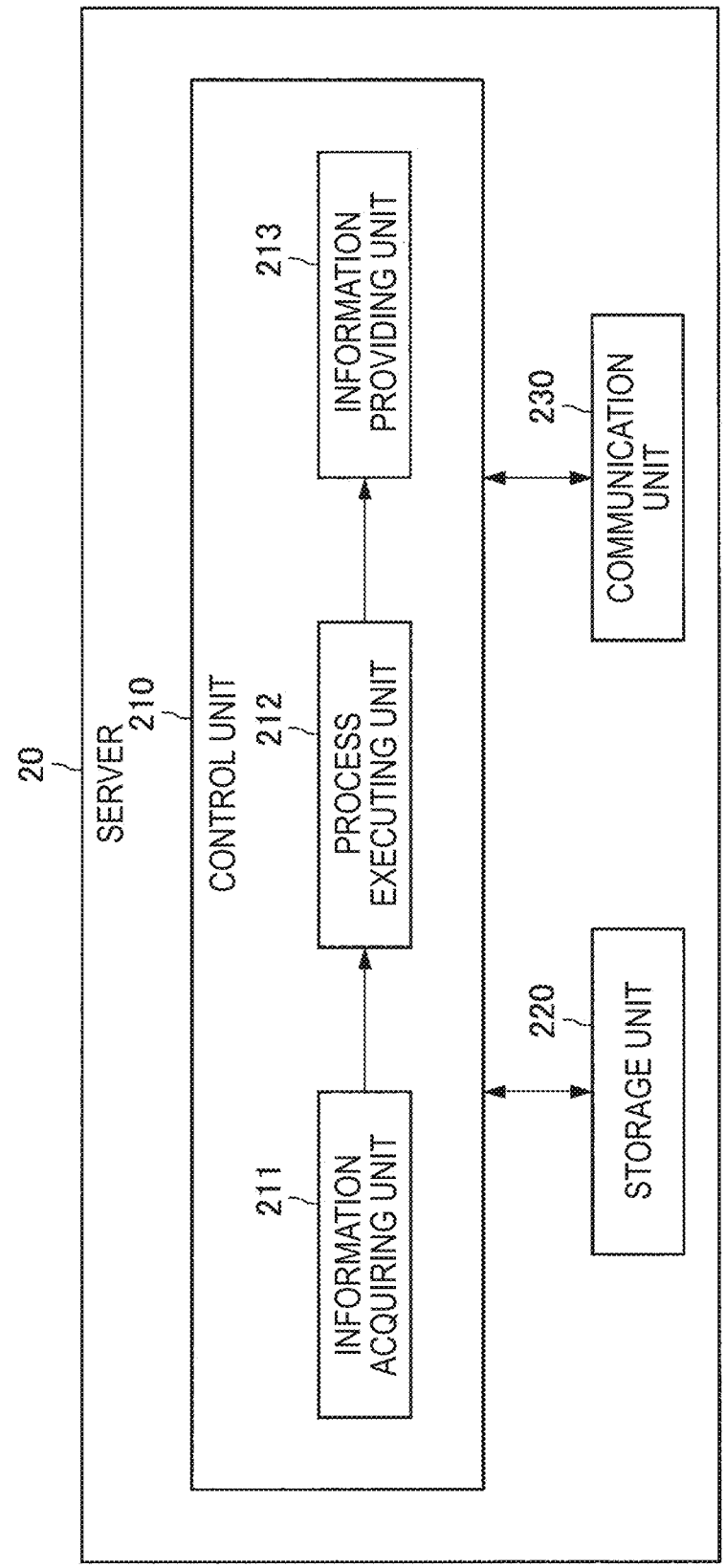
FIG. 3 is a block diagram illustrating a functional configuration example of a server according to the embodiment.

The server 20 can estimate the state of the cow. For example, the server 20 receives a sensor ID and sensor data from the wearable device 40 and the external sensor 30, and estimates the state of each cow by performing a process based on a predetermined algorithm or a machine learning process on the sensor data through a processing unit (machine learning control unit) 212 (FIG. 3). For example, the server 20 estimates a state indicating that a cow whose body temperature has rapidly increased has an infectious disease or estimates a state indicating that a cow whose activity amount has suddenly increased has an estrus sign. Further, the server 20 may estimate a state such as estrus from breeding information such as an estrus history collected so far in addition to the sensor data or may estimate a state on the basis of a combination of the sensor data and cow information (data in a database).

Further, in this specification, a case in which the cow information is stored in the server 20 is mainly assumed. However, a location in which the cow information is stored is not limited. For example, the cow information may be stored in a server different from the server 20. Alternatively, the cow information may be stored in the communication terminal 10.

The wearable device 40 (40-1 to 40-N) includes a communication circuit, a sensor, a memory, or the like, and is attached to the body of the cow B (the cows B-1 to B-N). The sensor may include an activity amount sensor, a body temperature sensor, a meal amount measuring sensor that measures the number of ruminations or may have any other sensor. The wearable device 40 (40-1 to 40-N) may use a secondary battery as a power source or may be driven using self-power generation using electric power of a solar cell or vibration power generation as at least a part thereof as a power source.

A shape of the wearable device 40 is not particularly limited. For example, the wearable device 40 may be a tag type device. Further, the wearable device 40 transmits an identification number of the IOT device of the corresponding cow B, the sensor data (for example, information specifying the position information), and a wearable device ID to the server 20 via the repeater 50-1, the repeater 50-2, the gateway device 60, and the network 931. Here, various types of information are assumed as information specifying the position information of the cow B.

In the specification, the information specifying the position information of the cow B includes a reception strength of a wireless signal transmitted from each of the repeater 50-1 and the repeater 50-2 at predetermined time intervals in the wearable device 40. Then, the server 20 specifies the position information of the wearable device 40 (the cow B) on the basis of the reception strengths and the position information of each of the repeaters 50-1 and 50-2. Accordingly, in the server 20, it is possible to manage the position information of the cow B in real time.

Further, the information specifying the position information of the cow B is not limited to this example. For example, the information specifying the position information of the cow B may include identification information of a relay station which is a transmission source of a wireless signal received by the wearable device 40 among wireless signals transmitted from the repeaters 50-1 and 50-2 at predetermined time intervals. In this case, the server 20 may specify a position of the relay station identified by the identification information of the relay station of the transmission source as the position information of the wearable device 40 (the cow B).

For example, the information specifying the position information of the cow B may include an arrival period of time (a difference between a transmission time and a reception time) of a signal received from each Global Positioning System (GPS) satellite by the wearable device 40. Further, in this specification, a case in which the position information of the cow B is specified in the server 20 is mainly assumed, but the position information of the cow B may be specified in the wearable device 40. In this case, the position information of the cow B may be transmitted to the server 20 instead of the information specifying the position information of the cow B.

Alternatively, the information specifying the position information of the cow B may be an overhead image obtained by the external sensor 30. For example, if the server 20 manages a pattern of the cow B in advance for each individual, it is possible for the server 20 to specify a position of the pattern of the cow B recognized from the overhead image obtained by the external sensor 30 as the position information of the cow B.

Further, identification information (for example, an identification number of the TOT device) is written in the wearable device 40, and the farmer K can comprehend the identification information of the wearable device 40 by looking at the wearable device 40. The wearable device 40 also includes a proximity sensor, and in a case in which the wearable device 40 approaches a specific facility, the proximity sensor can detect the specific facility. With the record of the position information of the wearable device 40 and the information related to the facility which the wearable device 40 approaches, a behavior of the cow can be automatically recorded.

For example, the proximity sensor may be installed at a place where milking is performed as an example of a specific facility, and if the wearable device 40 including a proximity sensor communicating with the proximity sensor is associated with a milking record by an automatic milking machine, a cow producing milk and a produced milk amount can be recorded.

The breeding machine 70 is a machine used for breeding the cows. For example, the breeding machine 70 may be various types of robots such as an automatic feeder, an automatic milking machine, and an automatic livestock barn cleaning machine. The breeding machine 70 can change a feeding amount, the necessity of milking, or the frequency of cleaning in accordance with an instruction command from the server 20 or the communication terminal 10. Further, the automatic milking machine can measure milk components, and a measurement result can be treated as part of external sensor data.

The configuration example of the display control system 1 according to an embodiment of the present disclosure has been described above.

1.2. Functional Configuration Example of Communication Terminal

Figure 2:
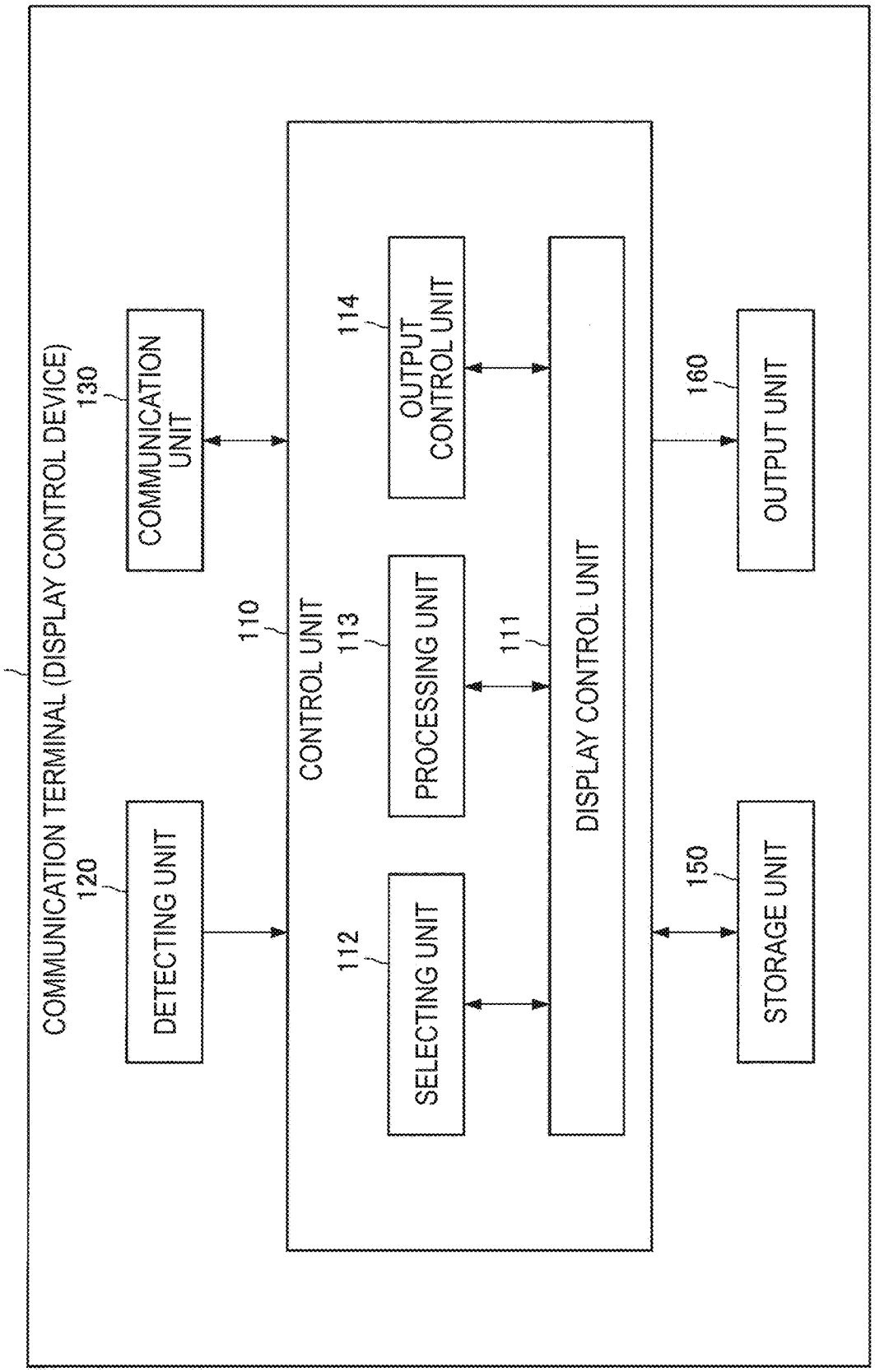
FIG. 2 is a block diagram illustrating a functional configuration example of a communication terminal according to the embodiment.

Next, a functional configuration example of the communication terminal 10 according to an embodiment of the present disclosure will be described. FIG. 2 is a block diagram illustrating a functional configuration example of the communication terminal 10 according to an embodiment of the present disclosure. As illustrated in FIG. 2, the communication terminal 10 includes a control unit 110, a detecting unit 120, a communication unit 130, a storage unit 150, and an output unit 160. The functional blocks of the communication terminal 10 will be described below. Further, although the functional configuration example of the communication terminal 10-1 used by the farmer K will be mainly described here, the functional configuration of the communication terminal 10-2 used by the veterinarian M can be realized similarly to the functional configuration of the communication terminal 10-1 used by the farmer K.

The control unit 110 controls each unit of the communication terminal 10-1. Further, the control unit 110 may be constituted by a processing device such as one or more central processing units (CPUs). In a case in which the control unit 110 is constituted by a processing device such as a CPU, the processing device may be constituted by an electronic circuit. As illustrated in FIG. 2, the control unit 110 includes a display control unit 111, a selecting unit 112, a processing unit 113, and an output control unit 114. The blocks of the control unit 110 will be described later in detail.

The detecting unit 120 includes a sensor, and can detect a direction in which the farmer K in a three-dimensional space is paying attention (hereinafter also referred to simply as a "direction of interest"). In this specification, a case in which a direction of the face of the farmer K (the position of the field of view of the farmer K) is used as the direction of interest will be mainly described. Here, the direction of the face of the farmer K may be detected using any method. As an example, the direction of the face of the farmer K may be a direction of the communication terminal 10-1. The direction of the communication terminal 10-1 may be detected by an axis-of-earth sensor or may be detected by a motion sensor.

The detecting unit 120 can detect the direction indicated by the farmer K in a three-dimensional space (hereinafter also referred to simply as an "indication direction"). In this specification, a case in which the line of sight of the farmer K is used as the indication direction will be mainly described. Here, the line of sight of the farmer K can be detected using any method. As an example, in a case in which the detecting unit 120 includes an imaging device, the line of sight of the farmer K may be detected on the basis of an eye region shown in an image obtained by the imaging device.

The direction of interest or the indication direction may be detected on the basis of a detection result by a motion sensor detecting a motion of the farmer K (an indication direction in which a position in a three-dimensional space detected by a motion sensor is a front may be detected). The motion sensor may detect an acceleration with the acceleration sensor or may detect an angular velocity with a gyro sensor (for example, a ring type gyroscope or the like). Alternatively, the direction of interest or the indication direction may be detected on the basis of a detection result by a tactile device. An example of the tactile device is a pen type tactile device.

Alternatively, the direction of interest or the indication direction may be a direction indicated by a predetermined object (for example, a direction in which a leading end of a stick points) or may be a direction indicated by a finger of the farmer K. In a case in which the detecting unit 120 includes an imaging device, the direction in which the predetermined object points and the direction indicated by the finger of the farmer K may be detected on the basis of an object and a finger shown in an image obtained by the imaging device.

Alternatively, the indication direction may be detected on the basis of a face recognition result of the farmer K. For example, in a case in which the detecting unit 120 has an imaging device, a center position between the eyes may be recognized on the basis of an image obtained by the imaging device, and a straight line extending from the center position between the eyes may be detected as the indication direction.

Alternatively, the direction of interest or the indication direction may be a direction corresponding to speech content of the farmer K. In a case in which the detecting unit 120 includes a microphone, the direction corresponding to the speech content of the farmer K may be detected on the basis of a voice recognition result for sound information obtained by a microphone. For example, in a case in which the farmer K desires to designate an inner side of the field of view as the front in the indication direction, it is sufficient to produce speech indicating the inner side of the field of view (for example, "speech" such as "the cow on the inner side"). Accordingly, text data "the cow on the inner side" is obtained as the voice recognition result for such speech, and the indication direction in which the inner side of the field of view is the front can be detected on the basis of the text data "the cow on the inner side." Further, the speech content may be "show an overhead image," "show it from above," "show the cow on the inner side," or the like.

Further, the detecting unit 120 can detect various types of manipulations by the farmer K. Further, in this specification, a selection manipulation and a switching manipulation will be mainly described as examples of various types of manipulations by the farmer K. Here, various types of manipulations by the farmer K can be detected through any method. As an example, various types of manipulations by the farmer K may be detected on the basis of a motion of the farmer K.

The detection of the motion of the farmer K can be performed through any method. For example, in a case in which the detecting unit 120 includes an imaging device, the motion of the user farmer K may be detected from an image obtained by the imaging device. The motion of the farmer K may be a predetermined motion such as a wink (For example, an action of closing both eyes, an operation of closing one eye, or the like), a motion of clenching an opened hand, a virtual tap gesture, or the like. Alternatively, the detecting unit 120 may detect the motion of the farmer K with a motion sensor. For the motion sensor, an acceleration may be detected by an acceleration sensor, or an angular velocity may be detected by a gyro sensor. Alternatively, the motion of the farmer K may be detected on the basis of a voice recognition result.

Alternatively, various types of manipulations by the farmer K may be detected on the basis of the position of the body of the farmer K (such as the position of the head or the like) or may be detected on the basis of the posture of the farmer K (such as the posture of the whole body). Alternatively, various types of manipulations by the farmer K may be detected on the basis of myoelectricity (for example, myoelectricity of a jaw, myoelectricity of an arm, or the like) or may be detected on the basis of an electroencephalogram. Alternatively, various types of manipulations by the farmer K may include a manipulation on a switch, a lever, a button, or the like installed in the communication terminal 10-1 or a controller connected with the communication terminal 10-1 in a wired or wireless manner and as a touch manipulation on the communication terminal 10-1.

Further, the detecting unit 120 can detect the position information of the communication terminal 10-1 in addition to the direction of the communication terminal 10-1. Here, the position information of the communication terminal 10-1 may be detected through any method. For example, the position information of the communication terminal 10-1 may be detected on the basis of an arrival period of time (a difference between a transmission time and a reception time) of a signal received from each GPS satellite by the communication terminal 10-1. Alternatively, in a case in which the communication terminal 10-1 can receive wireless signals transmitted from the repeaters 50-1 and 50-2 similarly to the wearable devices 40-1 to 40-N, the position information of the communication terminal 10-1 can be detected as well similarly to the position information of the wearable devices 40-1 to 40-N.

For example, the position of the worker K may be a relative current position of an HMD measured by a positioning sensor such as a simultaneous localization and mapping (SLAM) camera. Further, the position information of the communication terminal 10-1 may be position information corrected (offset) on the basis of a mounting position of the HMD.

The communication unit 130 includes a communication circuit and has a function of communicating with other devices via the network 931 (FIG. 1). For example, the communication unit 130 is constituted by a communication interface. For example, the communication unit 130 can communicate with the server 20 via the network 931 (FIG. 1).

The storage unit 150 includes a memory and is a recording device that stores a program to be executed by the control unit 110 and data necessary for executing the program. Further, the storage unit 150 temporarily stores data for calculation by the control unit 110. Further, the storage unit 150 may be a magnetic storage device, a semiconductor storage device, an optical storage device, or a magneto-optical storage device.

The output unit 160 is an output device that outputs various types of information. For example, the output unit 160 may include a display capable of performing visible display to the farmer K, or the display may be a liquid crystal display or may be an organic electro-luminescence (EL).

Further, the output unit 160 may include an audio output device such as a speaker. Alternatively, the output unit 160 may include a tactile sense presenting device that presents a tactile sense to the farmer K (the tactile presenting device includes an oscillator that vibrates in accordance with a predetermined voltage).

In particular, in work sites for farm animals or the like, a hands-free manipulation is desirable because there are cases in which the hands are unable to be used for work for the farm animals or the like because they are being used for other work. In this regard, the display is desirably a device that can be worn on the head of the farmer K (for example, a head mounted display (HMD)). In a case in which the output unit 160 includes a housing which can be worn on the head of the farmer K, the housing may include a display that displays information related to a cow. At this time, the display may be a transmissive display or a non-transmissive display. In a case in which the display is a non-transmissive display, an image captured by an imaging device included in a detecting unit 120 is displayed, and thus the farmer K can visually recognize a space corresponding to the field of view.

The functional configuration example of the communication terminal 10 according to an embodiment of the present disclosure has been described above.

1.3. Functional Configuration Example of Server

Next, a functional configuration example of the server 20 according to an embodiment of the present disclosure will be described. FIG. 3 is a block diagram illustrating a functional configuration example of the server 20 according to an embodiment of the present disclosure. As illustrated in FIG. 3, the server 20 includes a control unit 210, a storage unit 220, and a communication unit 230. The functional blocks of the server 20 will be described below.

The control unit 210 controls each unit of the server 20. Further, the control unit 210 may be constituted by a processing device such as, for example, one or a plurality of CPUs. In a case in which the control unit 210 is constituted by a processing device such as a CPU, the processing device may be constituted by an electronic circuit. As illustrated in FIG. 3, the control unit 210 includes an information acquiring unit 211, a processing unit (machine learning control unit) 212, and an information providing unit 213. The blocks of the control unit 210 will be described later in detail.

The storage unit 220 is a recording device that includes a memory, stores a program to be executed by the control unit 210 or stores data (for example, cow information or the like) necessary for executing a program. Further, the storage unit 220 temporarily stores data for calculation by the control unit 210. Further, the storage unit 220 may be a magnetic storage unit device, a semiconductor storage device, an optical storage device, or a magneto-optical storage device.

The communication unit 230 includes a communication circuit and has a function of communicating with other devices via the network 931 (FIG. 1). For example, the communication unit 230 includes a communication interface. For example, the communication unit 230 can communicate with the communication terminal 10, the external sensor 30, the wearable device 40 (the wearable devices 40-1 to 40-N) and the breeding machine 70 via the network 931 (FIG. 1).

The functional configuration example of the server 20 according to an embodiment of the present disclosure has been described above.

1.4. Functional Configuration Example of External Sensor

Figure 4:
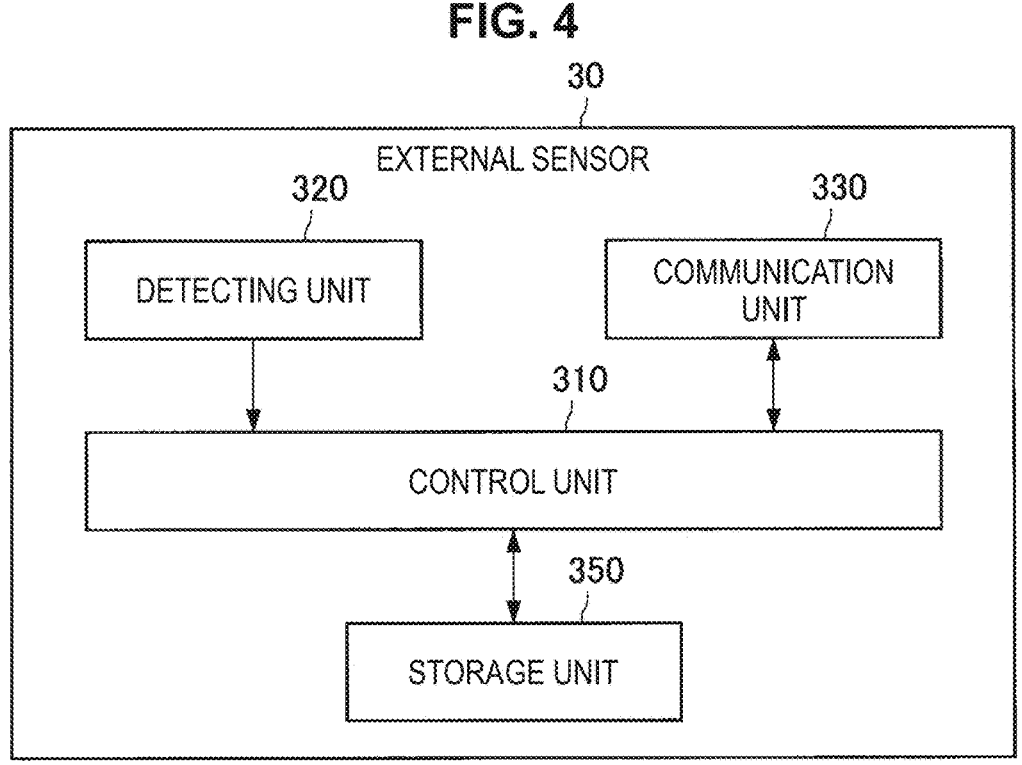
FIG. 4 is a block diagram illustrating a functional configuration example of an external sensor according to the embodiment.

Next, a functional configuration example of the external sensor 30 according to an embodiment of the present disclosure will be described. FIG. 4 is a block diagram illustrating a functional configuration example of the external sensor 30 according to an embodiment of the present disclosure. As illustrated in FIG. 4, the external sensor 30 includes a control unit 310, a detecting unit 320, a communication unit 330, and a storage unit 350. The functional blocks of the external sensor 30 will be described below.

The control unit 310 controls each unit of the external sensor 30. Further, the control unit 310 may be constituted by a processing device such as, for example, one or a plurality of CPUs. In a case in which the control unit 310 is constituted by a processing device such as a CPU, the processing device may be constituted by an electronic circuit.

The detecting unit 320 includes sensors. For example, the detecting unit 320 includes an image sensor and obtains an overhead image by capturing an overhead image of some or all of the cows B (the cows B-1 to B-N). However, a direction (imaging direction) of the image sensor is not limited. Further, the detecting unit 320 may include environmental sensors such as an outside air temperature sensor and a humidity sensor.

The communication unit 330 includes a communication circuit and has a function of communicating with other devices via the network 931 (FIG. 1). For example, the communication unit 330 includes a communication interface. For example, the communication unit 330 can communicate with the server 20 via the network 931 (FIG. 1).

The storage unit 350 includes a memory and is a recording device that stores a program to be executed by the control unit 310 and data necessary for executing the program. Further, the storage unit 350 temporarily stores data for calculation by the control unit 310. Further, the storage unit 350 may be a magnetic storage device, a semiconductor storage device, an optical storage device, or a magneto-optical storage device.

The functional configuration example of the external sensor 30 according to an embodiment of the present disclosure has been described above.

1.5. Functional Configuration Example of Wearable Device

Figure 5:
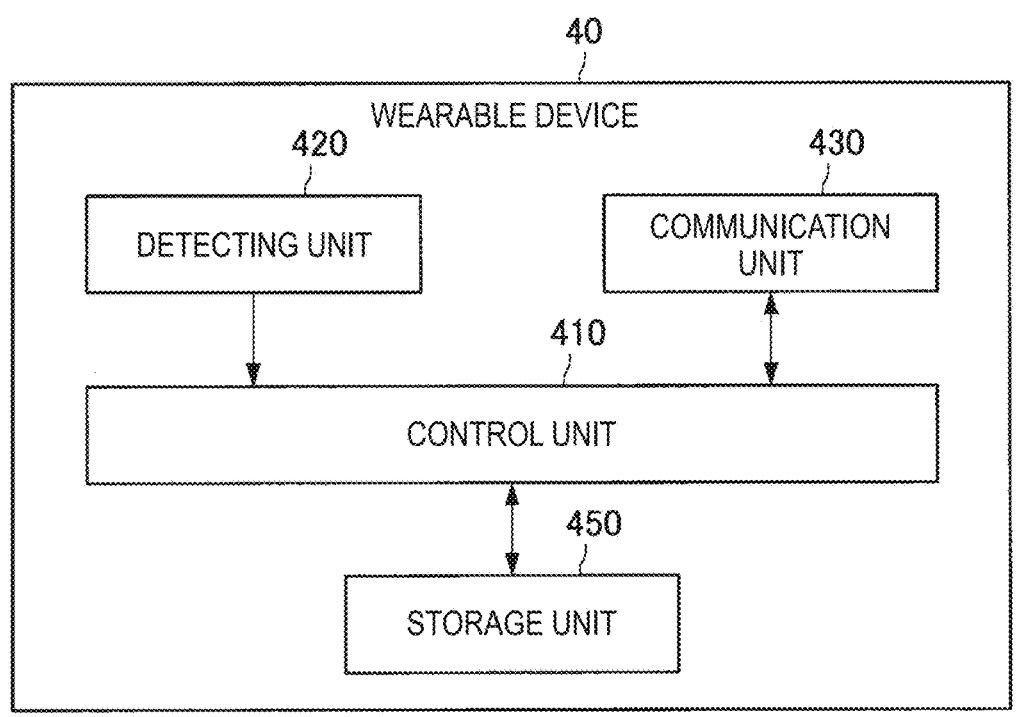
FIG. 5 is a block diagram illustrating a functional configuration example of a wearable device according to the embodiment.

Next, a functional configuration example of the wearable device 40 according to an embodiment of the present disclosure will be described. FIG. 5 is a block diagram illustrating a functional configuration example of the wearable device 40 according to an embodiment of the present disclosure. As illustrated in FIG. 5, the wearable device 40 includes a control unit 410, a detecting unit 420, a communication unit 430, and a storage unit 450. The functional blocks of the wearable device 40 will be described below.

The control unit 410 controls each unit of the wearable device 40. Further, the control unit 410 may be constituted by a processing device such as, for example, one or a plurality of CPUs. In a case in which the control unit 410 is constituted by a processing device such as a CPU, the processing device may be constituted by an electronic circuit.

The detecting unit 420 includes sensors. For example, the detecting unit 420 may have an activity amount sensor. The activity amount sensor may include an acceleration sensor and detect an activity amount on the basis of an acceleration detected by the acceleration sensor. Further, the detecting unit 420 may include a body temperature sensor. Further, the detecting unit 420 may include a meal amount measuring sensor. The meal amount measuring sensor may include a vibration sensor and measure the number of ruminations on the basis of the number of vibrations detected by the vibration sensor.

The communication unit 430 includes a communication circuit and has a function of communicating with other devices via the network 931 (FIG. 1). For example, the communication unit 430 includes a communication interface. For example, the communication unit 430 can communicate with the server 20 via the network 931 (FIG. 1).

The storage unit 450 includes a memory and is a recording device that stores a program to be executed by the control unit 410 and data necessary for executing the program. Further, the storage unit 450 temporarily stores data for calculation by the control unit 410. Further, the storage unit 450 may be a magnetic storage device, a semiconductor storage device, an optical storage device, or a magneto-optical storage device.

The functional configuration example of the wearable device 40 according to an embodiment of the present disclosure has been described above.

1.6. Details of Functions of Display Control System

Next, the functions of the display control system 1 will be described in detail.

(1.6.1. Communication Terminal Used by Farmer)

First, a case in which the communication terminal 10-1 is used by the farmer K will be mainly described. In an embodiment of the present disclosure, in order to enable the farmer K to take care of the cow B (the cows B-1 to B-N) more enjoyably, an association of a personification model (personification model data) and the cow B (the cows B-1 to B-N) is executed. Here, the personification model (character model) is not limited to a human being but may be a target object having a certain feature (for example, a living object or a non-living object). For example, the personification model may be a person having a certain feature (for example, an actor, an artist, or the like) that is actually present in the real world or may be a fictitious person (for example, it may be a fictitious person appearing in a work such as an animation or a cartoon) or may be a character having individuality such as a robot appearing in a science fiction (SF) movie.

Information related to the personification model (hereinafter also referred to as "personification model information") is registered in the server 20 in advance. Further, in this specification, a case in which the personification model information is registered in the server 20 in advance is mainly assumed, but the personification model information may be registered in a device other than the server 20 in advance. For example, the personification model information may be registered in a server different from the server 20 in advance or may be registered in the communication terminal 10-1 in advance.

FIG. 6 is a diagram illustrating an example of the personification model information. As illustrated in FIG. 6, personification model information 221 is configured such that an ID (a personification model ID) uniquely identifying a personification model, a name of a personification model (personification model name), feature information of a personification model, conversation information, and icon information are associated with one another. In FIG. 6, an "actress A" is illustrated as an example of the personification model name. Further, "XXXXXX" is illustrated as an example of the feature information of the personification model. Further, although the personification model is a person existing in the real world, the feature information of the personification model need not necessarily exactly match feature information of a person existing in the real world. The feature information of the personification model is data for deciding the personification model on the basis of the determination result of the correspondence relation with individual feature information of a cow. The conversation information includes each national language ID, a dialect ID, and speaking style information. The speaking style information is information indicating a way of speaking (including wording or the like) when the decided personification model actually speaks to the user. Further, the icon information is information identifying an icon for each state information. An icon image corresponding to the individual state information among icon images specified by the icon information is output under the control of the display control unit 111. In other words, icon data for each personification model is displayed, and icon data thereof is changed depending on a state.

Here, the feature information of the personification model is not particularly limited. For example, the feature information of the personification model may include at least one of an action of the personification model, a growth level of the personification model, a sex of the personification model, an age of the personification model, a volume level of the personification model, a location of the personification model in an area, a location of the personification models in a group, information related to an area in which the personification model is located, or pedigree information of the personification model.

The action of the personification model may be an action of eating or an action of resting. Further, the growth level of the personification model may be indicated by a range of a growth degree (for example, a BCS) or may be indicated by information corresponding to the range of the growth degree (for example, "thin," "fat," "normal," or the like). The volume level of the personification model may be indicated by a volume range or may be indicated by information corresponding to the volume range (for example, "loud," "normal," "quiet," or the like).

The location of the personification model in the area may be information indicating a part of an area in which the personification model is frequently located (for example, a cowshed or the like) (for example, "located frequently in a corner of the area," "located frequently in the center of the area," or the like). Further, the location of the personification model in the group may be information indicating a part of the group in which the personification model is frequently located (for example, "located frequently in a corner of the group," "located frequently in the center of the group," or the like). The information related to the area in which the personification model is located may be a prefecture (for example, "Miyazaki prefecture," "Hokkaido," or the like) and a state or the like in which the personification model is located. The pedigree information of the personification model may be information of the parents of the personification model, information of the grandparents, or the like As described above, in the personification model information 221, the personification model ID, the personification model name, and the feature information of the personification model are associated with each other. Here, there are cases in which the headcount of the cows B exceeds 100 or 1000 as described above. Therefore, it may be difficult to manually (or automatically) associate the personification model ID with all the cows B (the cows B-1 to B-N). In this regard, in this specification, a case in which initial values of the feature information of all the cows B (the cows B-1 to B-N) can be uniformly set is mainly assumed.

For example, if the farmer K uniformly inputs the initial values of the feature information of all the cows B (the cows B-1 to B-N), the initial values of the feature information are detected by the detecting unit 120. The initial values of the feature information detected by the detecting unit 120 are transmitted to the server 20 by the communication unit 130, and if the initial values of the feature information are received by the communication unit 230 in the server 20, the initial values of the feature information are acquired by the information acquiring unit 211, and the process executing unit 212 sets the initial values in the feature information of all the cows B (the cows B-1 to B-N).

Then, the process executing unit 212 updates some or all of the feature information of the cows B (the cows B-1 to B-N). For example, in a case in which sensor data of a certain cow is detected by various types of sensors capable of detecting the cow (for example, a sensor included by any one of the external sensor 30, the wearable device 40, and the communication terminal 10-1) and transmitted to the server 20, the information acquiring unit 211 may acquire the sensor data of the cow, and the process executing unit 212 may update the feature information of the cow in accordance with the sensor data of the cow. Alternatively, the process executing unit 212 may analyze the sensor data of the cow and update the feature information of the cow in accordance with an analysis result obtained by analysis.

Alternatively, in a case in which data input by the farmer K is detected by the detecting unit 120 and acquired by the information acquiring unit 211, the process executing unit 212 may update the feature information of the cow with the data input by the farmer K.

Further, the feature information of the cow is not particularly limited, similarly to the feature information of the personification model. For example, the feature information of the cow may include at least one of an action of the cow, a growth level of the cow, a sex of the cow, an age of the cow, a volume level of the cow, a location of the cow in an area, a location of the cow in a group, information related to an area in which the cow is located, or pedigree information of the cow. As an example, some or all of the feature information of the cow can be input by the farmer K.

The action of the cow may be an action of eating. The action of eating may be an analysis result of sensor data detected by the activity amount sensor included in the wearable device 40. Alternatively, the action of the cow may be an action of resting. The action of resting may be an analysis result of sensor data detected by an eating amount measuring sensor of the wearable device 40.

Further, the growth level of the cow may be indicated by the growth degree (for example, the BCS). The growth level of the cow may be an analysis result of an image captured by the external sensor 30 or an analysis result of an image captured by the imaging device included in the communication terminal 10-1. The volume level of the cow may be indicated by a volume or it may be indicated by an analysis result of a volume (for example, "loud," "normal," "quiet," or the like). In a case in which the communication terminal 10-1, the external sensor 30, or the wearable device 40 includes a volume sensor, the volume may be detected by the volume sensor.

The location of the cow in the area may be information indicating a part of the area in which the cow is located frequently (for example, a cowshed or the like) (for example, "located frequently in the corner of the area," "located frequently in the center of the area," or the like). The information indicating the part of the area in which the cow is located frequently may be calculated by the process executing unit 212 on the basis of the position information of the cow B (the cows B-1 to B-N) and the position information of the area.

Further, the location of the cow in the group may be information indicating a part of the group in which the cow is located frequently (for example, "located frequently in the corner of the group," "located frequently in the center of the group," or the like). The information indicating a part of the group in which the cow is located frequently may be calculated by the process executing unit 212 on the basis of the position information of the cow B (the cows B-1 to B-N).

The information related the area in which the cow is located may be a prefecture (for example, "Miyazaki prefecture," "Hokkaido," or the like) and the state or the like in which the cow is located. The information related to the area in which the cow is located may be calculated by the process executing unit 212 on the basis of the position information of the cow and the position information of the area. The pedigree information of the cow may be information of the parents of the cow, information of the grandparents, or the like If some or all of the feature information of the cow B (the cows B-1 to B-N) is updated as described above, the process executing unit 212 determines whether or not there is feature information of the cow satisfying a predetermined relation with the feature information of any personification model among the cows B (the cows B-1 to B-N). In a case in which there is feature information of the cow satisfying the predetermined relation with the feature information of any personification model among the cows B (the cows B-1 to B-N), the process executing unit 212 associates the personification model ID with the individual ID of the cow.

Further, the technique of determining that the feature information of the personification model and the feature information of the cow satisfy a predetermined relation is not limited. For example, in a case in which the feature information of the personification model and the feature information of the cow coincide with each other or a degree of relevance decided on the basis of a correlation between the feature information or the like is higher than a threshold value, the feature information of the personification model and the feature information of the cow are determined to satisfy a predetermined relation. Alternatively, in a case in which the feature information of the personification model is indicated by a range of a certain parameter, the feature information of the personification model and the feature information of the cow are determined to satisfy a predetermined relation in a case in which the feature information of the cow belongs to the range. Further, there may be cases in which there is no cow in which the feature information of the cow does not coincide or the degree of relevance is higher than a threshold value, but in this case, the process executing unit 212 may generate new personification model data through a machine learning process or the like using the feature information of the cow and associate the personification model ID of the newly generated personification model data with the individual ID of the cow.

Accordingly, the association between the individual ID and the personification model ID can be executed for some or all of the cows B (the cows B-1 to B-N). The information in which the individual ID and the personification model name corresponding to the personification model ID are associated is transmitted to the communication terminal 10-1 through the communication unit 230 in the server 20, and received by the communication unit 130 in the communication terminal 10-1, and display thereof is controlled the display control unit 111.

Further, the personification model ID that can be associated with the individual ID may be decided for each farmer K (for each communication terminal 10-1). At this time, in a case in which there is a personification model ID which the farmer K has no authority to associate with the individual ID, the personification model name corresponding to the personification model ID is transmitted to the communication terminal 10-1 by the communication unit 230 in the server 20 and received by the communication unit 130 in the communication terminal 10-1, and display thereof is controlled by the display control unit 111. Then, in a case in which the farmer K is considered to desire to associate the personification model ID corresponding to the displayed personification model name with the individual ID, the farmer K can purchase an authority to associate the personification model ID corresponding to the personification model name with the individual ID on the basis of the input by the farmer K.

Thereafter, the association between the individual ID and the personification model ID may be executed on the basis of the input by the farmer K. For example, if the farmer K inputs the individual ID and the personification model name, the individual unit ID and the personification model ID corresponding to the personification model name are detected by detecting unit 120. If the individual ID and the personification model ID detected by the detecting unit 120 are transmitted to the server 20 by the communication unit 130 and received by the communication unit 230 in the server 20, the information acquiring unit 211 acquires the individual ID and the personification model ID, and the process executing unit 212 associates the individual ID with the personification model ID.

An association between the individual ID and each national language ID (each national language information) may be executed on the basis of input by the farmer K. For example, if the farmer K inputs the individual ID and each national language ID, the detecting unit 120 detects the individual ID and each national language ID. If the individual ID and the language ID detected by the detecting unit 120 are transmitted to the server 20 by the communication unit 130 and received by the communication unit 230 in the server 20, the information acquiring unit 211 acquires the individual ID and each national language ID, and the process executing unit 212 associates the individual ID with each national language ID.

An association between the individual ID and a dialect ID (dialect information) may be executed on the basis of an input by the farmer K. For example, if the farmer K inputs the individual ID and dialect ID, the detecting unit 120 detects the individual ID and the dialect ID. If the individual ID and the dialect ID detected by the detecting unit 120 are transmitted to the server 20 by the communication unit 130 and received by the communication unit 230 in the server 20, the information acquiring unit 211 acquires the individual ID and the dialect ID, and the process executing unit 212 associates the individual ID with the dialect ID.

FIG. 7 is a diagram illustrating an example of some individual information. As described above, the association of the personification model ID, each national language ID, and the dialect ID is executed for the individual ID by the process executing unit 212. In this regard, as illustrated in FIG. 7, some individual information 222 is formed by associating the individual ID, the personification model ID, each national language ID, and the dialect ID. In the example illustrated in FIG. 7, a personification model ID "01: actress A," each national language ID "00: Japanese," and a dialect ID "05: Hokkaido" are associated for an individual ID "05: cow B-2."

Further, the storage unit 220 in the server 20 stores speaking style information in association with the personification model ID, each national language ID, and the dialect ID. In this specification, a case in which the speaking style information is stored in the storage unit 220 in the server 20 will be mainly described. However, the speaking style information may be stored in other servers. The output control unit 114 uses the speaking style information in a process of processing original data of comment information into a speaking style of the personification model. Further, the original data of the comment information is set for each state of the cow. In other words, the output control unit 114 generates the comment information by processing the original data corresponding to the state information on the basis of the speaking style information. Further, the original data of the comment information may be, for example, text or audio data of a standard word (for example, "good morning") or may be data expressing the meaning or context of a comment (for example, a "morning greeting") or an ID associated therewith. Further, instead of using the original data, text or audio data of a word finally output may be stored as the speaking style information of the personification model data.

Here, a type of comment information is not limited. For example, the comment information may include at least one of text data or audio data. For example, in a case in which the comment information includes text data, it is desirable that the text data be generated to imitate the tone of the personification model. Further, in a case in which the comment information includes audio data, it is desirable that the audio data be a voice spoken by the personification model or be generated to imitate the voice spoken by the personification model.

Figure 8:
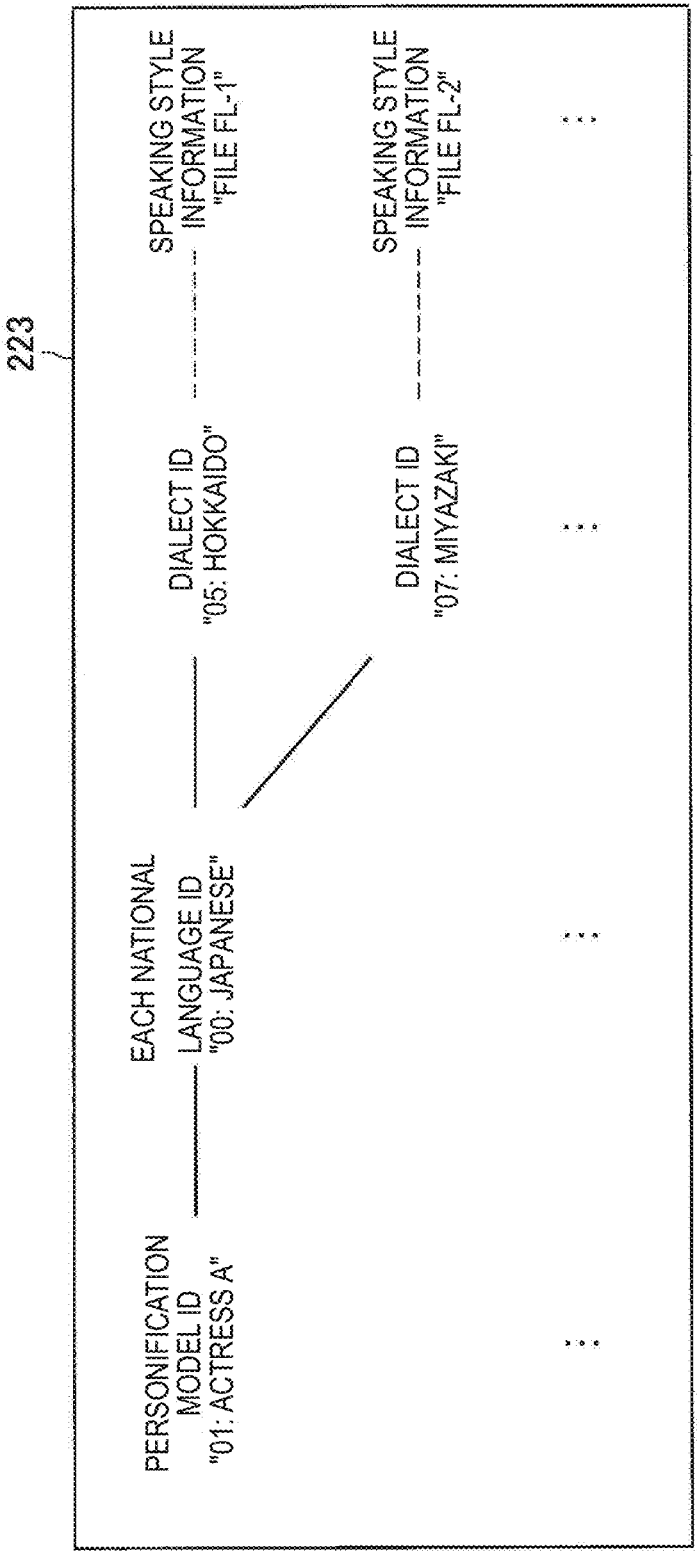
FIG. 8 is a diagram illustrating an example of a correspondence relation of a personification model ID, each national language ID, and a dialect ID and speaking style information.

FIG. 8 is a diagram illustrating an example of a correspondence relation of the personification model ID, each national language ID, and the dialect ID and the speaking style information. The correspondence relation between the personification model ID, each national language ID, and the dialect ID and the speaking style information is not limited. For example, as in a correspondence relation 223 illustrated in FIG. 8, one or more national languages corresponding to the personification model may be decided, one or more dialects corresponding to the personification model and each national language may be decided, and the speaking style information corresponding to the personification model, each national language, and the dialect may be decided. Further, as illustrated in FIG. 8, the speaking style information may be prepared as a file.

Figure 9:
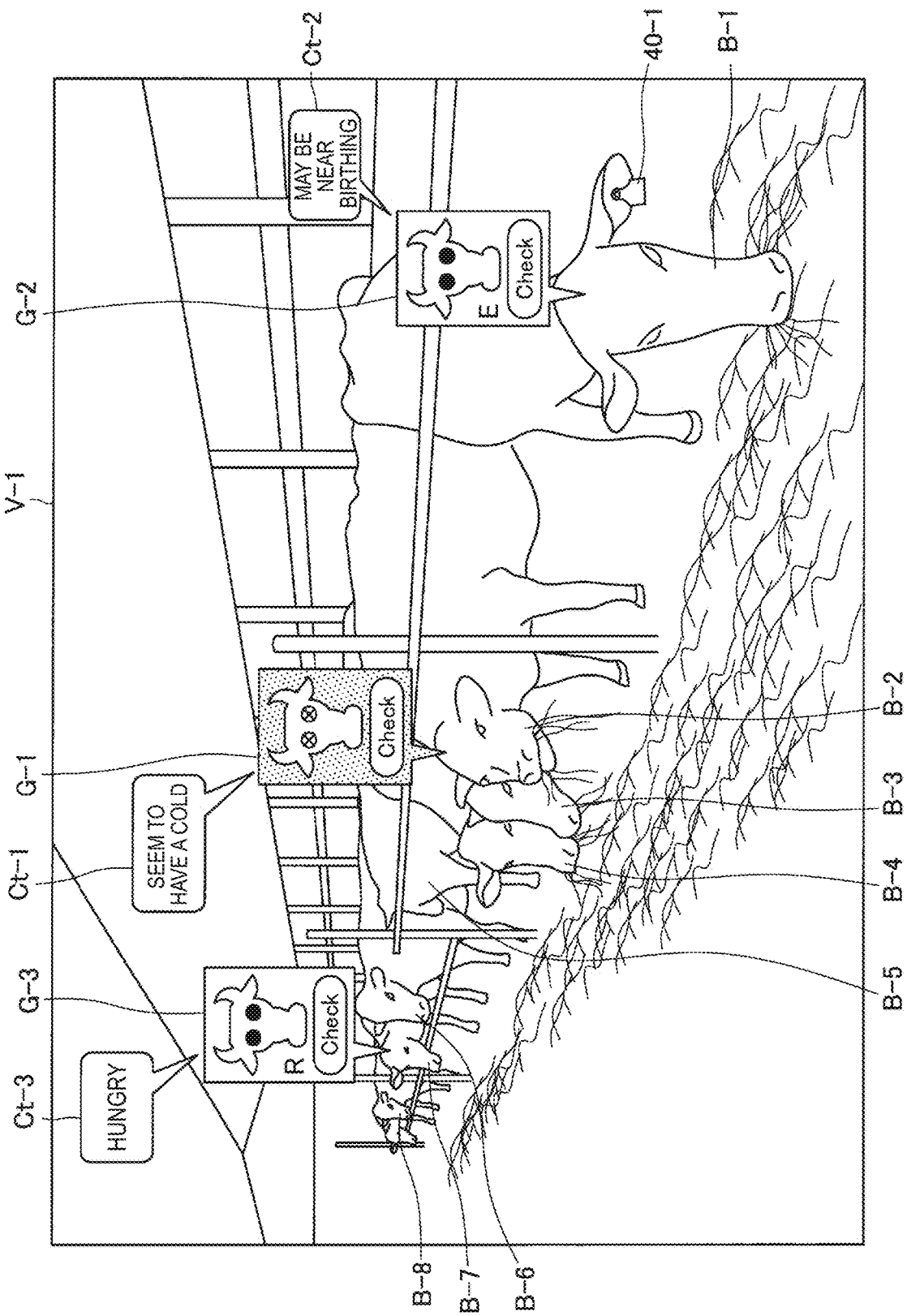
FIG. 9 is a diagram illustrating an example of a field of view of a farmer using a communication terminal.

FIG. 9 is a diagram illustrating an example of a field of view of the farmer K using the communication terminal 10-1. In the example illustrated in FIG. 9, a case in which the farmer K wearing the communication terminal 10-1 is located in the real world. Referring to FIG. 9, a field of view V-1 of the farmer K is illustrated. Here, the field of view V-1 may simply be a field of view of the farmer K itself, may be a range corresponding to a captured image of a sensor (for example, a camera) of the detecting unit 120, or may be a region which can be viewed through a transparent/non-transparent display.

As illustrated in FIG. 9, the group of cows (the cows B-1 to B-8) is located in the indoor farm, and the group of cows (the cows B-1 to B-8) is located in the field of view V-1 of the farmer K. Further, the number of cows included in the group of cows is not particularly limited. Here, in the communication terminal 10-1 worn by the farmer K, if the detecting unit 120 detects the state (the position information and the direction) of the communication terminal 10-1, the communication unit 130 transmits the state (the position information and the direction) of the communication terminal 10-1 to the server 20.

In the server 20, if the information acquiring unit 211 receives the state (the position information and the direction) of the communication terminal 10-1 via the communication unit 230, the process executing unit 212 decides the group of cows (the cows B-1 to B-M) (M is an integer of 2 or more) which are closely located at a predetermined distance from the position of communication terminal 10-1 (the farmer K) within a predetermined angle range (the field of view V-1 of the farmer K) based on the direction of the communication terminal 10-1 on the basis of the state (the position information and the direction) of the communication terminal 10-1 and the position information of each of the cows B-1 to B-M.

Further, the distance between the position of the communication terminal 10-1 (the farmer K) and the position of each of the cows B-1 to B-N may be calculated by any other technique. For example, in a case in which the communication terminal 10-1 can receive a wireless signal transmitted from the wearable device 40 (the wearable devices 40-1 to 40-M), the processing unit 113 may calculate the distance between the position of the communication terminal 10-1 (the farmer K) and the position of each of the cows B-1 to B-N on the basis of reception strengths of the wireless signals transmitted from the wearable devices 40-1 to 40-M.

In this specification, a case in which the group of cows (the cows B-1 to B-M) includes some cows included among the cows B-1 to B-N managed by the server 20 is mainly assumed, but the group of cows (the cows B-1 to B-M) may include all of the cows B-1 to B-N (M may be equal to N). Here, as illustrated in FIG. 9, the group of cows (the cows B-1 to B-8) is located in the field of view V-1 of the farmer K, and the process executing unit 212 decides the group of cows (the cows B-1 to B-8) from the group of cows (the cows B-1 to B-N).

If the individual information and the position information of each cow of the group of cows (the cows B-1 to B-8) are acquired by the process executing unit 212, the information providing unit 213 provides the individual information and the position information of each cow of the group of cows (the cows B-1 to B-8) to the communication terminal 10-1 via the communication unit 230. In the communication terminal 10-1, the communication unit 130 receives the individual information and the position information of each cow of the group of cows (the cows B-1 to B-8).

Further, here, the example in which the individual information and the position information of each cow of the group of cows (the cows B-1 to B-8) stored in the server 20 are received by the communication terminal 10-1 is illustrated. However, in a case in which the individual information and the position information of each cow of the group of cows (the cows B-1 to B-8) are stored in the storage unit 150 in the communication terminal 10-1, the individual information and the position information of each cow of the group of cows (the cows B-1 to B-8) may be read from the storage unit 150.

The display control unit 111 acquires the state information of each cow of the group of cows (the cows B-1 to B-8) from the individual information of each cow of the group of cows (the cows B-1 to B-8). Here "periodic measurement," "abnormality confirmation," and "estrus confirmation" are assumed as the state information of each cow of the group of cows (the cows B-1 to B-8). However, "periodic measurement," "abnormality confirmation," and "estrus confirmation" are assumed as the state information of each cow of the group of cows (the cows B-1 to B-8). Here, a case in which the state information of the cow B-1 is the "estrus confirmation" (in particular, information indicating the state having the sign of estrus) and the state information of the cow B-2 is the "abnormality confirmation" (in particular, information indicating a state suspected of having a cold), and the state information of the cow B-7 is the "periodic measurement" is assumed.

Further, the periodic measurement indicates a state in which measurement has to be currently performed in a case in which a body condition score (BCS) or the like of a cow is periodically measured. For example, in a case in which a measurement interval is one month, the cow in which one month has passed at a current time point since the last measurement date registered in the cow information (database) is a periodic measurement target. The abnormality confirmation indicates a state in which a health problem such as a disease, an injury, or State suspected of having cold is estimated. The estrus confirmation indicates a state in which there is a sign of estrus, and estrus is estimated.

As described above, in the example illustrated in FIG. 9, the state information of the cow B-1 is the estrus confirmation. In this regard, the display control unit 111 performs control such that an icon G-2 corresponding to the state information "estrus confirmation" of the cow B-1 located in the field of view V-1 of the farmer K is displayed at a position having a predetermined positional relation with the position of the cow B-1. If the icon G-2 corresponding to the state "estrus confirmation" is displayed at a position having a predetermined positional relation with the position of the cow B-1, it is possible to intuitively comprehend that the icon G-2 corresponding to the state information "estrus confirmation" corresponds to the cow B-1. Further, in this specification, displaying a virtual image superimposed on a position depending on the position of the target object located in the field of view as in this example is also referred to as "augmented reality (AR) display."

FIG. 9 illustrates an example in which the display control unit 111 recognizes the position of the head of the cow B-1 and performs control such that the icon G-2 is displayed above the head of the cow B-1 in order to prevent the farmer K from seeing the cow B-1 which is the estrus confirmation in the field of view V-1. However, the position at which the icon G-2 is displayed is not limited. For example, the display control unit 111 may recognize the position of the head of the cow B-1 using the position information of the cow B-1 or using the position of the head of the cow B-1 recognized from an image detected by the detecting unit 120 in addition to the position information of the cow B-1.

In addition, the display control unit 111 may cause the icon G-2 to be displayed at a position that is a predetermined distance above the position indicated by the position information of the cow B-1 or may cause the icon G-2 to be displayed on the back of the cow B-1. Alternatively, the display control unit 111 may cause the icon G-2 to be displayed at a position apart from the cow B-1 by a predetermined distance and cause an anchor connecting the icon G-2 and the cow B-1 to be displayed. With this anchor, the farmer K can intuitively comprehend that the icon G-2 corresponds to the cow B-1.

As described above, in the example illustrated in FIG. 9, the state information of the cow B-2 is the estrus confirmation. In this regard, the display control unit 111 performs control such that the icon G-1 corresponding to the state information "abnormality confirmation" of the cow B-2 located in the field of view V-1 of the farmer K is displayed at a position having a predetermined positional relation with the position of the cow B-2. If the icon G-1 corresponding to the state information "abnormality confirmation" is displayed at a position having a predetermined positional relation with the position of the cow B-2, it is possible to intuitively comprehend that the icon G-1 corresponding to the state information "abnormality confirmation" corresponds to the cow B-2.

As described above, in the example illustrated in FIG. 9, the state information of the cow B-7 is the periodic measurement. In this regard, the display control unit 111 performs control such that an icon G-3 corresponding to the state information "periodic measurement" of the cow B-7 located in the field of view V-1 of the farmer K is displayed at a position having a predetermined positional relation with the position of the cow B-7. If the icon G-3 corresponding to the state information "periodic measurement" is displayed at a position having a predetermined positional relation with the position of the cow B-7, it is possible to intuitively comprehend that the icon G-3 corresponding to the state information "periodic measurement" corresponds to the cow B-7.

Further, the position at which each of the icon G-1 and the icon G-3 is displayed may be controlled similarly to the position at which the icon G-2 is displayed. In other words, the positional relation between the cow B and the icon G may be constant regardless of the type (state information type) of the icon G. Accordingly, the farmer K can easily comprehend a correspondence relation between the cow B and the icon G regardless of the type of the icon G. However, the position of the icon G may be different depending on the type (state information type) of the icon G.

The icon G displayed as described above may be selectable. The selection of the icon G may be automatically performed by the communication terminal 10 or may be performed by the selecting unit 112 on the basis of a selection manipulation in a case in which the selection manipulation by the farmer K is detected by the detecting unit 120 in the communication terminal 10-1. Variations of the selection manipulations have been described above. However, as described above, a hands-free manipulation is desirable because there are cases in which the hands are unable to be used for work on the farm animal or the like. In this regard, the selecting unit 112 may select an image in a case in which a predetermined condition other than the presence or absence of a touch manipulation and a button manipulation by the farmer K is satisfied.

For example, a case in which the farmer K performs the selection manipulation by matching the indication direction (for example, the line of sight of the farmer K) with the icon G-1 corresponding to the state information "abnormality confirmation" of the cow B-2 is assumed. In this case, in a case in which the selection manipulation is detected by the detecting unit 120, the selecting unit 112 determines that the icon G-1 is located in the indication direction of the farmer K detected by the detecting unit 120, and selects the icon G-1 corresponding to the state information "abnormality confirmation."

At this time, in order to make it easy for the farmer K to notice a position of an indication direction, the display control unit 111 may perform control such that a pointer is displayed at a position corresponding to the indication direction of the farmer K (for example, the line of sight of the farmer K or the like). In other words, it is desirable for the selecting unit 112 to select the icon G in a case in which the selection manipulation is performed in the state in which the pointer is at the position of the icon G or the position near the icon G.

Further, instead of the indication direction of the farmer K, a direction of interest of the farmer K (for example, the direction of the face of the farmer K) may be used. At this time, in order to make it easy for the farmer K to comprehend the position in the direction of interest, the display control unit 111 may perform control such that the pointer is displayed at the position with which the direction of interest of the farmer matches. Further, since it is assumed that the direction of interest (for example, the direction of the face of the farmer K) does not change (that the direction of interest does not change in the field of view V-1) in a case in which the communication terminal 10-1 is used as a reference, it is desirable for the display control unit 111 to perform control such that the pointer is displayed at a fixed position (for example, at the center of the field of view V-1 or the like).

As described above, in a case in which the icon G-1 corresponding to the state information "abnormality confirmation" of the cow B-2 is selected, the output control unit 114 controls the output of the comment information of the cow B-2 corresponding to the state information "abnormality confirmation" of the cow B-2 and the feature information of the cow B-2. According to such a configuration, the farmer K can easily specify the cow B-2 of a predetermined state from a group of cows (the cows B-1 to B-8). Further, according to such a configuration, it is possible to easily perform the confirmation corresponding to the specified state of the cow B-2. Further, according to such a configuration, the farmer K can take care of the cow more enjoyably. Further, as described above, the display control unit 111 mainly controls the display of the icon and the anchor, whereas the output control unit 114 mainly controls the output of the comment information. For example, in a case in which the audio data is not output as the comment information (only the text data is output as the comment information), the display control unit 111 may also serve as the output control unit 114.

For example, as described above, in a case in which the feature information of the cow B satisfies a predetermined relation with the feature information of any personification model, the personification model ID is associated with the individual ID of the cow B. In this case, the output control unit 114 may control the output of the comment information corresponding to the personification model (the personification model ID) and the state information of the cow B. The output control unit 114 performs control such that the comment information of the cow B is output by voice or display so that the farmer K can recognize the comment information as the speech of the cow B. In the example illustrated in FIG. 9, display of text data "seem to have a cold" is controlled as comment information Ct-1 corresponding to the personification model ID "01: actress A" and the state information "abnormality confirmation" of the cow B-2 (in particular, the information indicating a state suspected of having a cold).

Further, the comment information Ct-1 may be stored in the server 20 as a file FL-1 as illustrated in the correspondence relation 223 (FIG. 8). In this regard, the output control unit 114 can acquire the comment information Ct-1 corresponding to the personification model ID "01: actress A," each national language ID "00: Japanese," and the dialect ID "05: Hokkaido" from the server 20 as the file FL-1. An acquisition timing of the comment information Ct-1 is not limited. In other words, the comment information Ct-1 may be downloaded in advance or may be acquired at an output timing (may be reproduced in a streaming manner).

Further, the position at which the comment information Ct-1 is displayed is not limited. However, similarly to the icon G-1, the output control unit 114 may perform control such that the comment information Ct-1 is displayed (AR-displayed) at a position having a predetermined positional relation with the position of the cow B-1. In this case, it is possible to intuitively understand that the comment information Ct-1 corresponding to the state information "abnormality confirmation" and the personification model ID "01: actress A" correspond to the cow B-2. In particular, in the example illustrated in FIG. 9, the comment information Ct-1 is displayed to extend from the icon G-1.

Similarly, in a case in which the icon G-2 corresponding to the state information "estrus confirmation" of the cow B-1 is selected, the output control unit 114 may control the output of the comment information corresponding to the state information "estrus confirmation" of the cow B-1 and the feature information of the cow B-1. In the example illustrated in FIG. 9, display of text data "may be near birthing" is controlled as comment information Ct-2 corresponding to the personification model ID associated with the individual ID of the cow B-1 and the state information "estrus confirmation" of the cow B-2 (in particular, the information indicating the state having the sign of estrus). Further, the icon G-2 corresponding to the state information "estrus confirmation" may differ for each personification model. In other words, the display control unit 111 may control the display of the icon corresponding to the state information "estrus confirmation" of the cow B-1 and the feature information of the cow B-1. For example, the display control unit 111 may control display of an icon G-2-01 corresponding to the state information "abnormality confirmation" in the icon information (FIG. 6) corresponding to the personification model ID associated with the individual ID of the cow B-1.

Further, similarly, in a case in which the icon G-3 corresponding to the state information "periodic measurement" of the cow B-7 is selected, the output control unit 114 may control the output of the comment information corresponding to the state information "periodic measurement" of the cow B-7 and the feature information of the cow B-7. In the example illustrated in FIG. 9, display of text data "hungry" is controlled as comment information Ct-3 corresponding to the personification model ID associated with the individual ID of the cow B-7 and the state information "periodic measurement" of the cow B-7.

Figure 10:
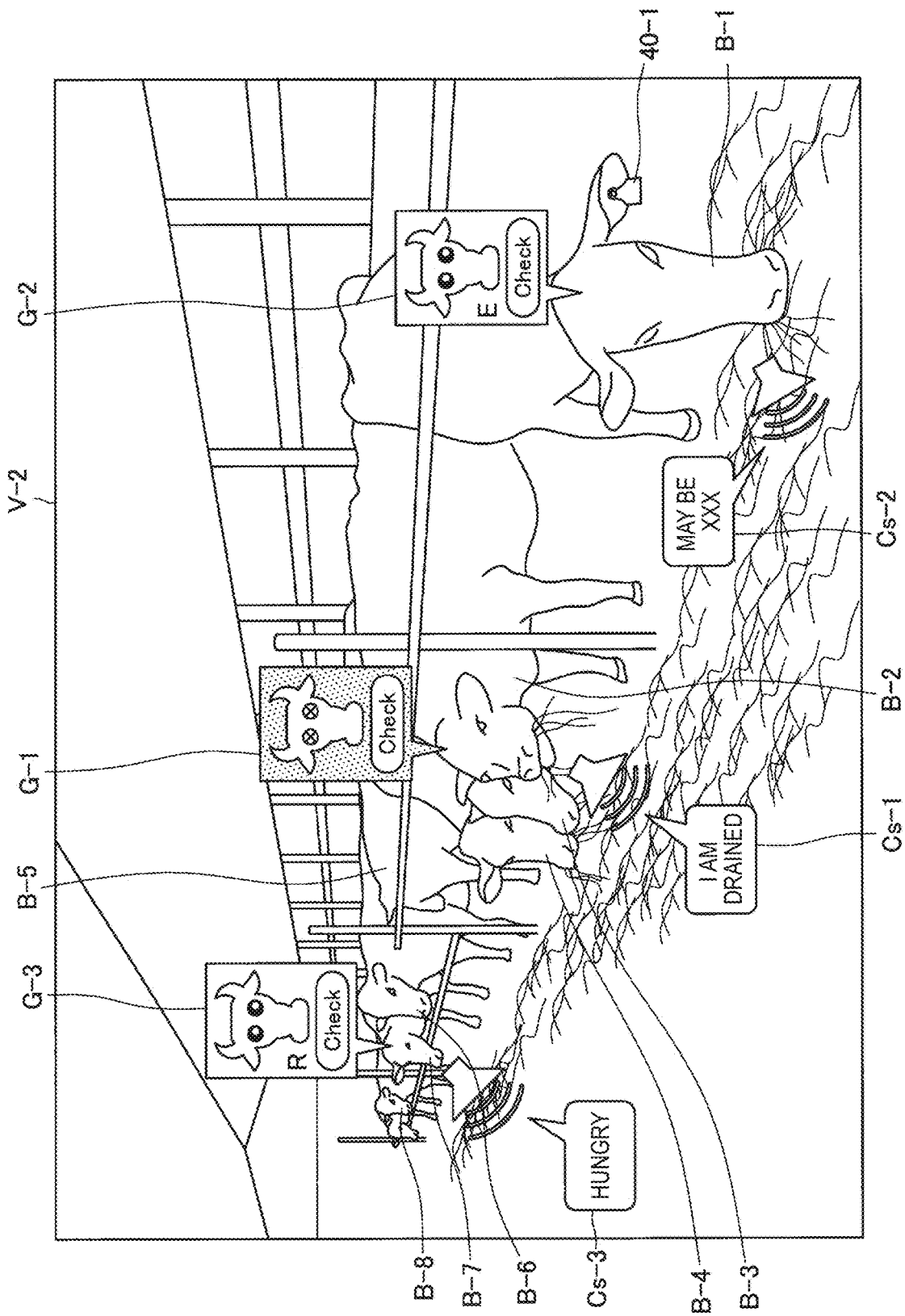
FIG. 10 is a diagram illustrating another example of a field of view of a farmer using a communication terminal.

FIG. 10 is a diagram illustrating another example of the field of view of the farmer K using the communication terminal 10-1. Referring to FIG. 10, a field of view V-2 of the farmer K is illustrated. Here, in FIG. 9, the case in which the comment information is the text data is illustrated as an example. However, as described above, the comment information may be audio data. In other words, instead of or in addition to the display of the text data, the audio data may be output.

Referring to FIG. 10, an example in which the output control unit 114 controls an output of audio data "I am drained" as comment information Cs-1 instead of the text data "seem to have a cold" is illustrated. Further, an example in which the output control unit 114 controls an output of audio data "may be xxx" as comment information Cs-2 in place of the text data "may be near birthing" is illustrated. Further, an example in which the output control unit 114 controls an output of audio data "hungry" as comment information Cs-3 instead of the text data "hungry" is illustrated.

Figure 11:
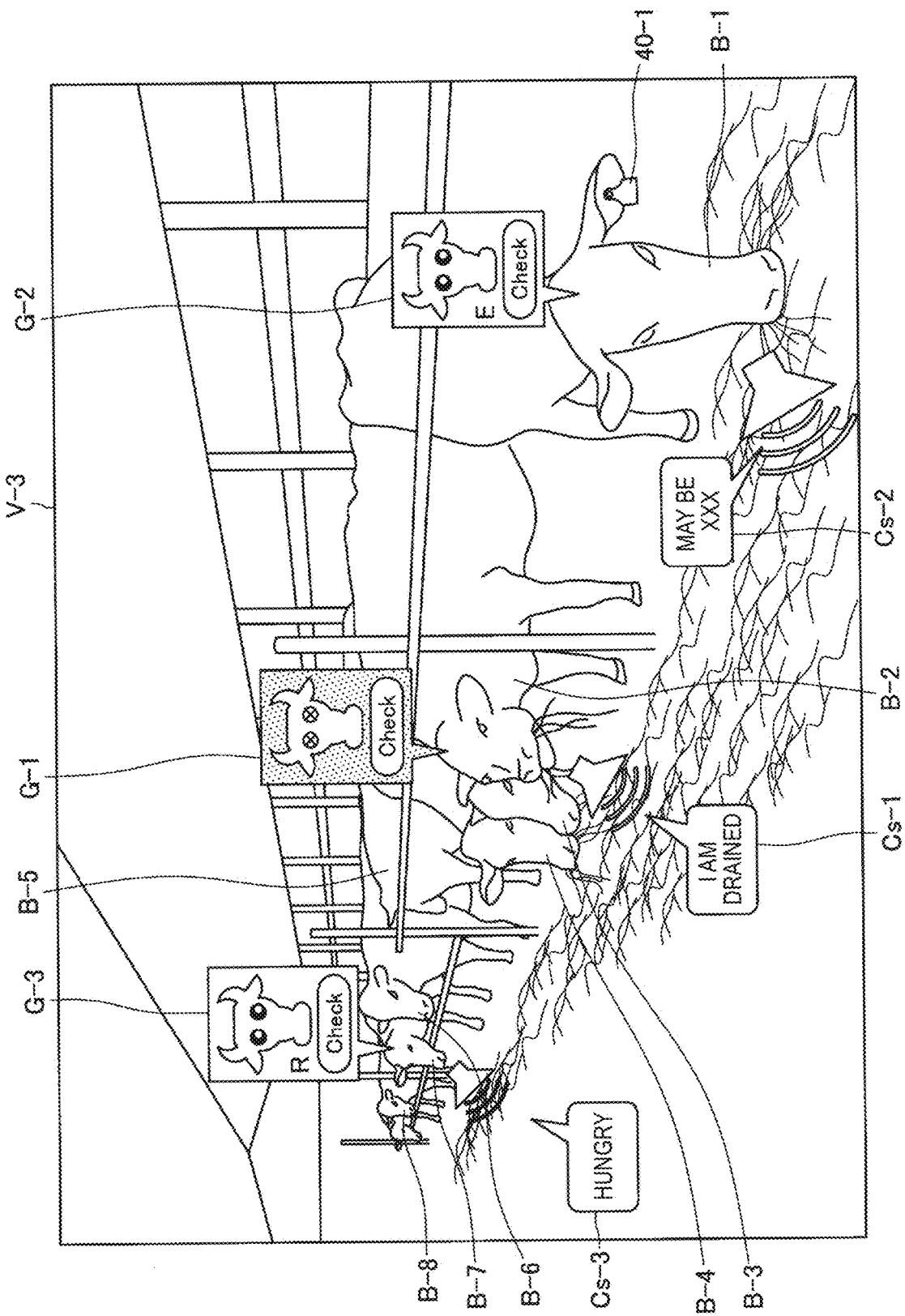
FIG. 11 is a diagram illustrating another example of a field of view of a farmer using a communication terminal.

FIG. 11 is a diagram illustrating another example of the field of view of the farmer K using the communication terminal 10-1. Referring to FIG. 11, a field of view V-3 of the farmer K is illustrated. In FIG. 10, the case in which the comment information is the audio data is illustrated as an example. Further, in the example illustrated in FIG. 10, a case in which a plurality of pieces of audio data have the same output volume is assumed. However, a plurality of pieces of audio data may have different output volumes. As an example, in a case in which the comment information includes the audio data, the output control unit 114 may control the output volume of the audio data on the basis of a distance between the cow B and the communication terminal 10-1 (the farmer K). Accordingly, it is possible to cause the farmer K to intuitively understand how far the farmer K is from the cow B.

Referring to FIG. 11, the output control unit 114 performs control such that the output volume of the comment information Cs-3 corresponding to the cow B-7 whose distance to the communication terminal 10-1 (the farmer K) is largest among the cow B-1, the cow B-2, and the cow B-7 is lowest. Further, the output control unit 114 performs control such that the output volume of the comment information Cs-1 corresponding to the cow B-2 whose distance to the communication terminal 10-1 (the farmer K) is next largest is next lowest. Further, the output control unit 114 performs control such that the output volume of the comment information Cs-2 corresponding to the cow B-1 whose distance to the communication terminal 10-1 (the farmer K) is smallest largest is highest.

As described above, in a case in which the comment information includes the audio data, the output control unit 114 performs control such that the output volume of the audio data increases as the distance between the cow B and the communication terminal 10-1 (the farmer K) decreases. Accordingly, it is possible to naturally cause the farmer K to understand how far the farmer K is from the cow B. Further, the processing unit 113 can calculate the distance between the cow B and the communication terminal 10-1 (the farmer K) on the basis of the position information of the cow B and the position information of the communication terminal 10-1 (the farmer K).

Further, in FIG. 11, the case in which the comment information includes audio data is illustrated as an example. However, as described above, the comment information may include the text data. In this case, a plurality of pieces of text data may have different display sizes. As an example, in a case in which the comment information includes the text data, the output control unit 114 may control the display size of the text data on the basis of the distance between the cow B and the communication terminal 10-1 (the farmer K). Accordingly, it is possible to allow the farmer K to intuitively understand how far the farmer K is from the cow B.

As an example, in a case in which the comment information includes the text data, the output control unit 114 may perform control such that the display size of text data increases as the distance between the cow B and the communication terminal 10-1 (the farmer K) decreases. Accordingly, it is possible to naturally allow the farmer K to understand how far the farmer K is from the cow B.

Figure 12:
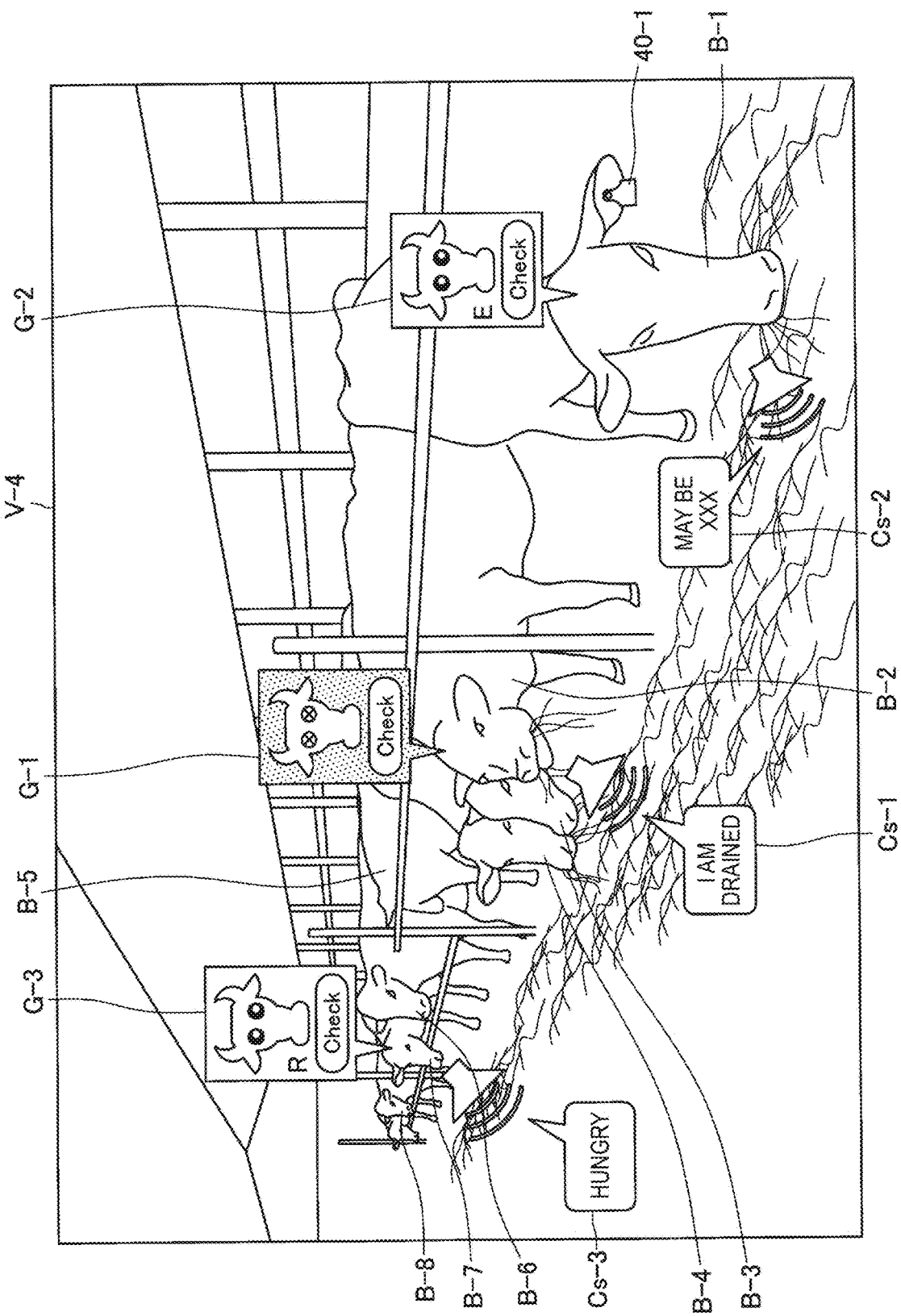
FIG. 12 is a diagram illustrating another example of a field of view of a farmer using a communication terminal.

FIG. 12 is a diagram illustrating another example of the field of view of the farmer K using the communication terminal 10-1. In FIGS. 9 to 11, the examples in which the output control unit 114 controls the output of the comment information corresponding to the personification model ID and the state information associated with the individual ID of the cow B are illustrated. However, in a case in which a national language ID is associated with the individual ID of the cow B as described above, the output control unit 114 may control the output of the comment information corresponding to the national language ID. Further, in a case in which the dialect ID is associated with the individual ID of the cow B as described above, the output control unit 114 may control the output of the comment information corresponding to the dialect ID.

Referring to FIG. 7, the personification model ID "01: actress A," the national language ID "00: Japanese," and the dialect ID "05: Hokkaido" are associated with the individual ID "05: cow B-2." Further, as described above, the state information of the cow B-2 is "abnormal state." In this regard, it is desirable for the output control unit 114 to control the output of the comment information corresponding to the state information "abnormal state" of the cow B-2, the personification model ID "01: actress A" associated with the individual ID "05: cow B-2," the national language ID "00: Japanese," and the dialect ID "05: Hokkaido." As an example of the comment information, the comment information Cs-1 "I am tired" is illustrated.

Similarly, it is desirable for the output control unit 114 to control the output of the comment information corresponding to the state information "estrus confirmation" of the cow B-1, the personification model ID associated with the individual ID of the cow B-1, the national language ID, and the dialect ID. As an example of the comment information, the comment information Cs-2 "may be xxx" is illustrated. Further, it is desirable for the output control unit 114 to control the output of the comment information corresponding to the state information "periodic measurement" of the cow B-7, the personification model ID associated with the individual ID of the cow B-7, the national language ID, and the dialect ID. As an example of the comment information, the comment information Cs-3 "I am hungry" is illustrated.

The example in which the output of the comment information of the cow B is unconditionally controlled in a case in which the state information of the cow B is any one of "periodic measurement," "abnormality confirmation," or "estrus confirmation" is illustrated. However, there are cases in which the headcount of the cows B exceeds 100, and there are also cases in which the headcount of the cows B exceeds 1000 as described above. Therefore, outputting the comment information of all the cows B whose state information is any one of "periodic measurement," "abnormality confirmation, " or "estrus confirmation" is likely to confuse the farmer K since the amount of comment information is too large.

In this regard, in order to reduce the possibility of confusion of the farmer K, the output control unit 114 may restrict cows whose comment information is to be output from all the cows B whose state information is any one of "periodic measurement," "abnormality confirmation," and "estrus confirmation." For example, the output control unit 114 may control the output of the comment information of the cow in a case in which the cow is located within a predetermined range with reference to the position of the communication terminal 10-1 (the farmer K). However, in a case in which there is a cow that is not located in a predetermined range but has a predetermined state (for example, a state in which urgent work is necessary), the output control unit 114 may control the output of the comment information of the cow.

Figure 13:
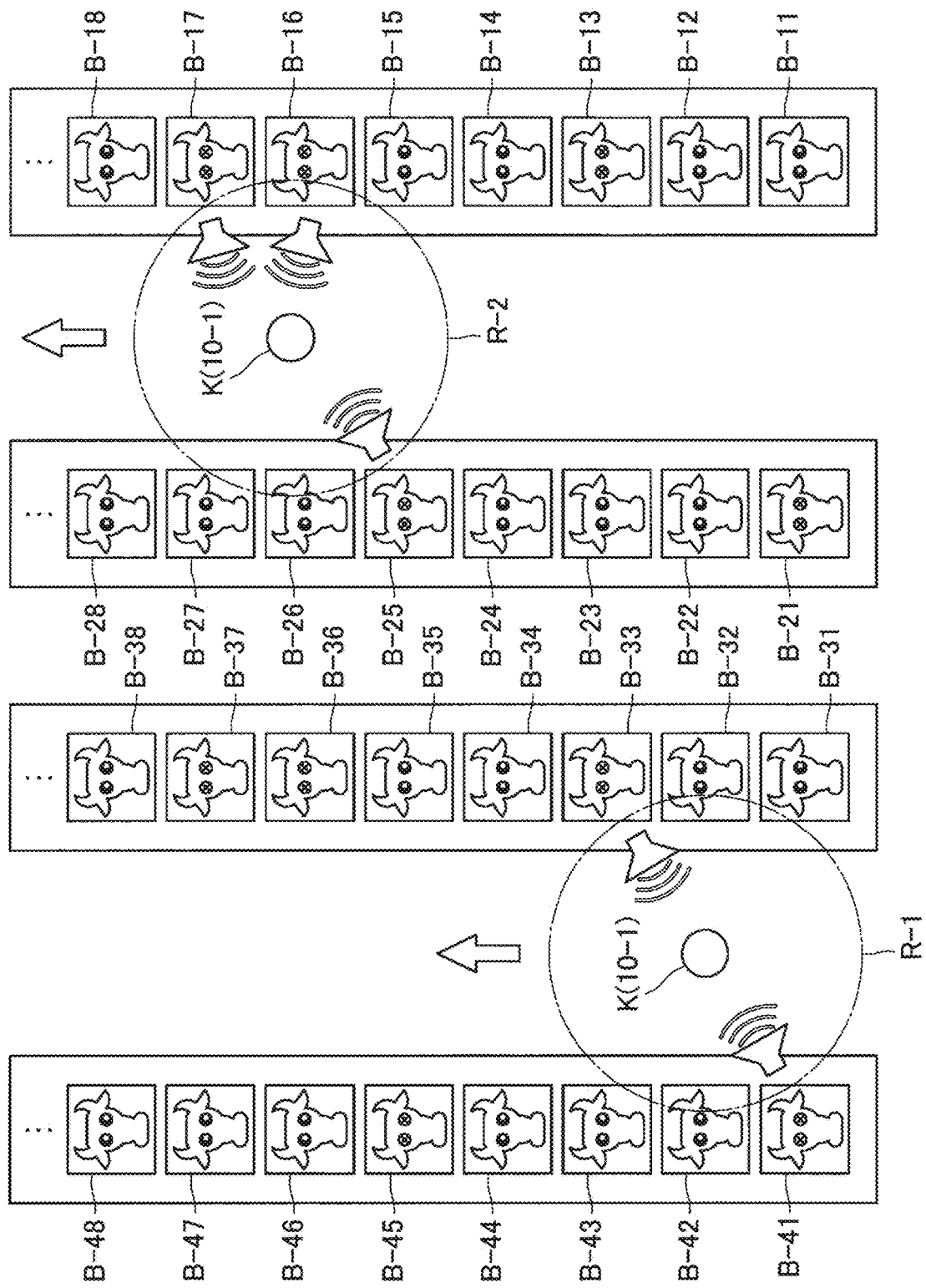
FIG. 13 is a diagram for explaining an example of restricting a cow whose comment information is to be output.

FIG. 13 is a diagram for describing an example of restricting a cow whose comment information is to be output. Referring to FIG. 13, there are cows B-11 to B-18, cows B-21 to B-28, cows B-31 to B-38, and cows B-41 to B-48. Further, referring to FIG. 13, an example in which the communication terminal 10-1 (the farmer K) moves, and the position of the communication terminal 10-1 (the farmer K) changes with the lapse of time is illustrated. Further, a range R-1 based on the position of the communication terminal 10-1 (the farmer K) at a certain time and a range R-2 based on the position of the communication terminal 10-1 (the farmer K) at another time are illustrated as an example of the predetermined range.

Here, each of the range R-1 and the range R-2 is a set of positions within a predetermined distance based on different positions of the communication terminal 10-1 (the farmer K). However, the predetermined range is not particularly limited. It is assumed that, as illustrated in FIG. 13, the state information of each of the cows B-13, B-16, B-17, B-21, B-25, B-33, B-36, B-37, B-41, and B-45 is "abnormality confirmation," and the state information of the other cows is neither "abnormality confirmation" nor "periodic measurement" nor "estrus confirmation."

At this time, since the cows B-33 and B-41 having the state information "abnormality confirmation" are located within in the range R-1 based on the position of the communication terminal 10-1 (the farmer K) at a certain time point, the output control unit 114 may control the output of the comment information of each of the cows B-33 and B-41. Further, although the cows B-13, B-16, B-17, B-21, B-25, B-36, B-37, and B-45 are located outside the range R-1, the output control unit 114 may determine that the state information "abnormality confirmation" of these cows is the state information indicating that urgent work is necessary and control the output of the comment information of these cows.

On the other hand, since the cows B-16, B-17, and B-25 having the state information "abnormality confirmation" are located within in the range R-2 based on the position of the communication terminal 10-1 (the farmer K) at a certain time point, the output control unit 114 may control the output of the comment information of each of the cows B-16, B-17, and B-25. Further, although the cows B-13, B-21, B-33, B-36, B-37, B-41, and B-45 are located outside the range R-2, the output control unit 114 may determine that the state information "abnormality confirmation" of these cows is the state information indicating that urgent work is necessary and control the output of the comment information of these cows.

In addition, in a case in which the number of selections of an icon corresponding to certain state information exceeds a threshold value, confirmation of the cow corresponding to the state is considered to be more important to the farmer K. In this regard, in a case in which the number of selections of an icon corresponding to a certain cow exceeds a predetermined threshold value, the output control unit 114 may control predetermined highlighting display associated with the cow. The number of selections of an icon may be counted by the processing unit 113 or may be counted by the process executing unit 212 in the server 20.

Here, the predetermined highlighting display is not particularly limited. For example, the predetermined highlighting display may include at least one of a change in an icon size, a change in color, a change in an output volume of audio data, a change in a frequency of audio data, or a change in content of the comment information corresponding to the state information of the cow. A way in which these parameters are changed is not limited, but as an example, the icon size may be changed to increase, or the output volume of audio data may be changed to increase.

Further, the output comment information may be able to be cancelled by a predetermined cancellation manipulation by the farmer K. In other words, the output control unit 114 may cancel the output of the comment information in a case in which a predetermined cancellation manipulation by the farmer K is detected by the detecting unit 120. For example, in a case in which the comment information includes the text data, the output control unit 114 may erase display of the text data. As another example, in a case in which the comment information includes audio data, the output control unit 114 may cause the output of the audio data to fade out. The predetermined cancellation manipulation is not particularly limited. For example, in a case in which the comment information includes the text data, the predetermined cancellation manipulation may be a motion of pushing the displayed text data out of the field of view with the hands of the user.

Figure 14:
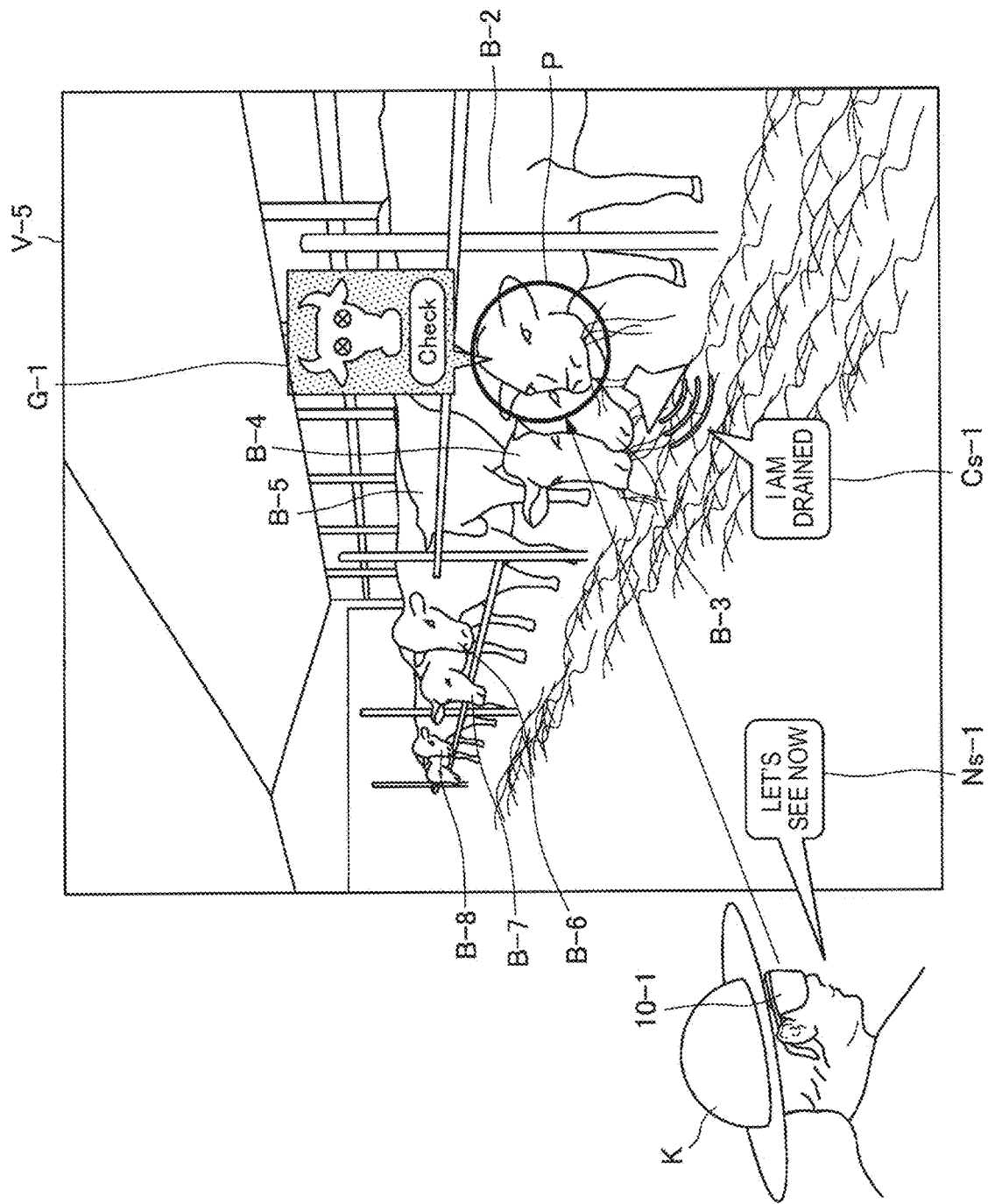
FIG. 14 is a diagram illustrating an example of a field of view of a farmer after selection of an icon corresponding to state information "abnormality confirmation" of a cow.

FIG. 14 is a diagram illustrating an example of the field of view of the farmer K after the icon G-1 corresponding to the state information "abnormality confirmation" of the cow B-2 is selected. Referring to FIG. 14, a field of view V-5 of the farmer K is illustrated. Further, referring to FIG. 14, since the farmer K has approached the cow B-2 corresponding to the state information "abnormality confirmation," the farmer K can see the cow B-2 from close up. Here, in the example illustrated in FIG. 14, the icon G-1 is selected by the selecting unit 112, and the output control unit 114 controls the output the comment information Cs-1 "I am tired" corresponding to the state information "abnormality confirmation" in the cow B-2 and the feature information of the cow B-2.

Next, a case in which the farmer K considers performing an abnormality confirmation for the cow B-2 as a result of viewing the comment information Cs-1 "I am tired" is assumed. At this time, the farmer K may indicate the cow B-2. The indication of the cow B-2 by the farmer K is detected by the detecting unit 120. Here, a case in which the detecting unit 120 detects that the indication direction coincides with the cow B-2 is assumed. In this case, the display control unit 111 may control at least one of predetermined display for guiding the farmer to visually recognize the confirmation location corresponding to the state information "abnormality confirmation" in the cow B-2 with which the indication direction coincides or display of an object for selecting execution of a predetermined operation.

Alternatively, the farmer K may execute a predetermined sound or a predetermined action while indicating the cow B-2. The indication of the cow B-2 by the farmer K can be detected by detecting unit 120. Further, the predetermined sound or predetermined action may be recognized by the processing unit 113. In a case in which the indication of the cow B-2 is detected by the detecting unit 120, and the predetermined sound or predetermined action is recognized by the processing unit 113, the display control unit 111 may control at least one of predetermined display for guiding the farmer to visually recognize the confirmation location corresponding to the state information "abnormality confirmation" in the indicated cow B-2 or display of an object for selecting execution of a predetermined operation.

Further, although the predetermined sound is not limited, it may be "let's see now" or the like. Further, although the predetermined action is not limited, it may be an action of winking. In a case in which the detecting unit 120 in the communication terminal 10-1 includes an imaging device capable of imaging the eyes of the farmer K, the processing unit 113 may recognize the action of winking on the basis of the eye region shown in the image obtained by the imaging device. Although the action of closing both eyes is sometimes performed unconsciously by the farmer K, since the action of winking is unlikely to be performed unconsciously by the farmer K, the recognition of the action of winking is more preferable.

Further, there are cases in which the farmer K decides to perform the abnormality confirmation for the cow B-2 immediately, but there may be cases in which the farmer K decides to perform the abnormality confirmation for the cow B-2 later. In this regard, in a case in which the farmer K performs the abnormality confirmation for the cow B-2 immediately, a sound produced by the farmer K may be different from that in a case in which the farmer K performs the abnormality confirmation for the cow B-2 later.

Specifically, in a case in which the farmer K considers performing the abnormality confirmation for the cow B-2 immediately, the farmer K indicates the cow B-2 and produces a first sound. On the other hand, in a case in which the farmer K considers performing the abnormality confirmation to the cow B-2 later, the farmer K indicates the cow B-2 and produces a second sound. The indication of the cow B-2 by the farmer K and the sound produced by the farmer K are detected by detecting unit 120. Then, the voice recognition process is performed by the processing unit 113, and it is recognized whether the sound produced by the farmer K is any of the first sound, the second sound, or another sound.

Specifically, the processing unit 113 performs the voice recognition on the basis of the sound produced by the farmer K, and in a case in which the voice recognition result includes first input data prepared in advance, the processing unit 113 recognizes that the farmer K has produced the first sound. On the other hand, in a case in which the voice recognition result includes second input data prepared in advance, the processing unit 113 recognizes that the farmer K has produced the second sound.

In the following description, a case in which the first input data and the first sound are "now," and the second input data and the second sound are "later" will be mainly described. However, the first input data, the first sound, the second input data, and the second sound are not limited thereto.

First, an example in which the farmer K decides to perform the abnormality confirmation for the cow B-2 immediately will be described. Further, a case in which the abnormality confirmation for the cow B-2 is performed will be mainly described below, but the same applies in the case in which the estrus confirmation for the cow B-1 is performed and in a case in which the periodic measurement for the cow B-7 is performed.

For example, in a case in which the farmer K decides to perform the abnormality confirmation for the cow B-2 immediately, the farmer K indicates the cow B-2 and produces a sound including the first sound "now." In the example illustrated in FIG. 14, the farmer K produces a sound Ns-1 "let's see now" as the sound including the first sound "now." Then, the indication of the cow B-2 and the sound Ns-1 "let's see now" are detected by the detecting unit 120. Then, the processing unit 113 recognizes the first sound "now."

Here, the indication of the cow B-2 may be performed through any method.

For example, as illustrated in FIG. 14, the indication of the cow B-2 may be an action of matching the indication direction (for example, the line of sight) with the body of the cow B-2 (for example, the head or the like). Alternatively, the indication of the cow B-2 may be an action of matching the indication direction (for example, the line of sight) with the wearable device 40-2 of the cow B-2. Alternatively, the indication of the cow B-2 may be an action of calling the name of the cow B-2 (for example, the personification model name of the cow B-2).

Figure 15:
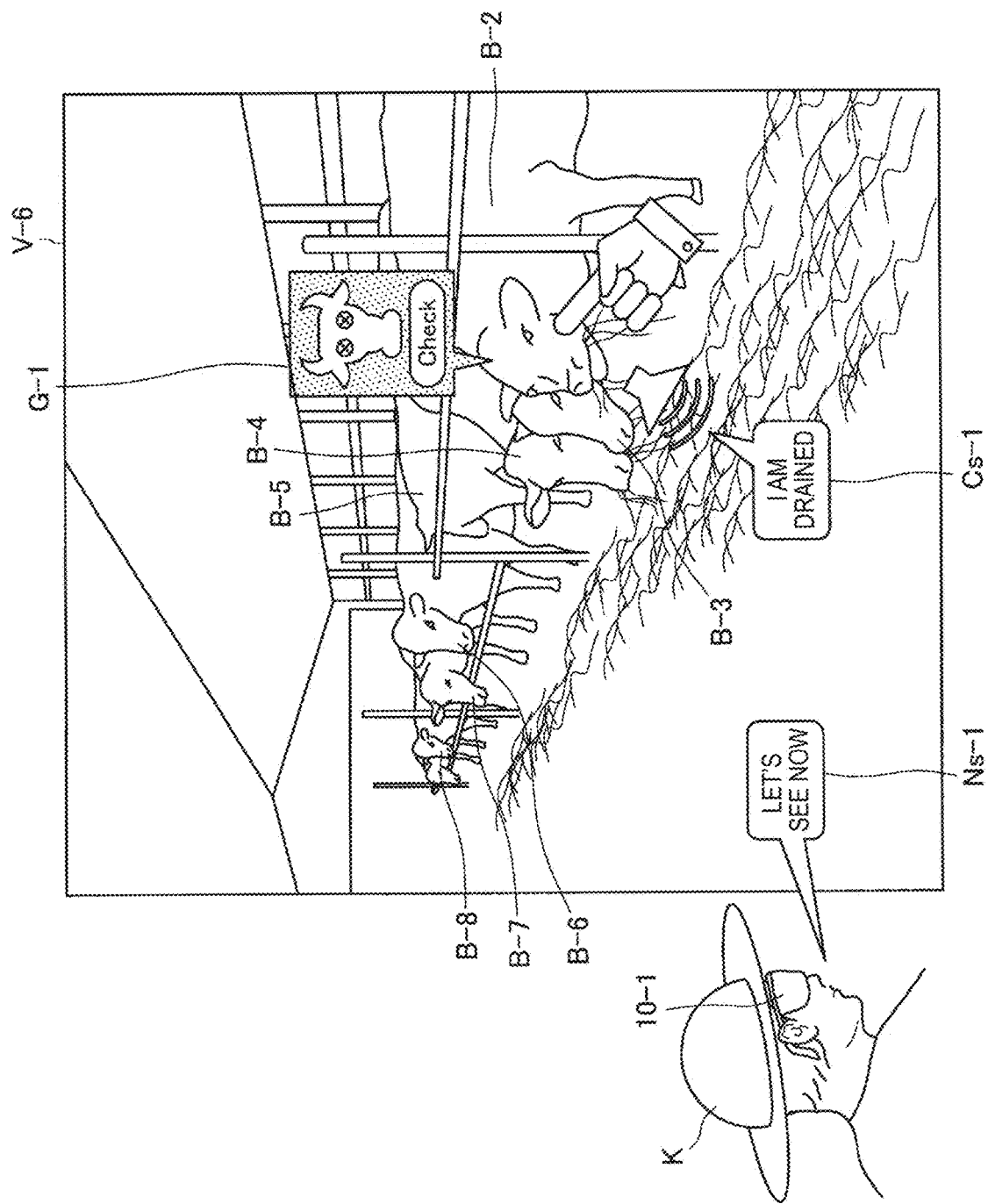
FIG. 15 is a diagram illustrating another example of a field of view of a farmer after selection of an icon corresponding to state information "abnormality confirmation" of cow.

FIG. 15 is a diagram illustrating another example of the field of view of the farmer K after the icon G-1 corresponding to the state information "abnormality confirmation" of the cow B-2 is selected. Referring to FIG. 15, a field of view V-6 of the farmer K is illustrated. As illustrated in FIG. 15, the indication of the cow B-2 may be an action of matching the indication direction (for example, the direction indicated by the finger of the farmer K) with the body of the cow B-2 (for example, the head or the like). Alternatively, the indication of the cow B-2 may be an action of matching the indication direction (for example, the direction indicated by the finger of the farmer K) with the wearable device 40-2 of the cow B-2.

Here, a case in which the detecting unit 120 detects the indication of the cow B-2 and the sound Ns-1 "let's see now," and the processing unit 113 recognizes that the first sound "now" is input from the sound Ns-1 "let's see now" is assumed. In this case, the display control unit 111 may control at least one of predetermined display for guiding the farmer to visually recognize the confirmation location corresponding to the state information "abnormality confirmation" in the indicated cow B-2 or display of an object for selecting execution of a predetermined operation.

Figure 16:
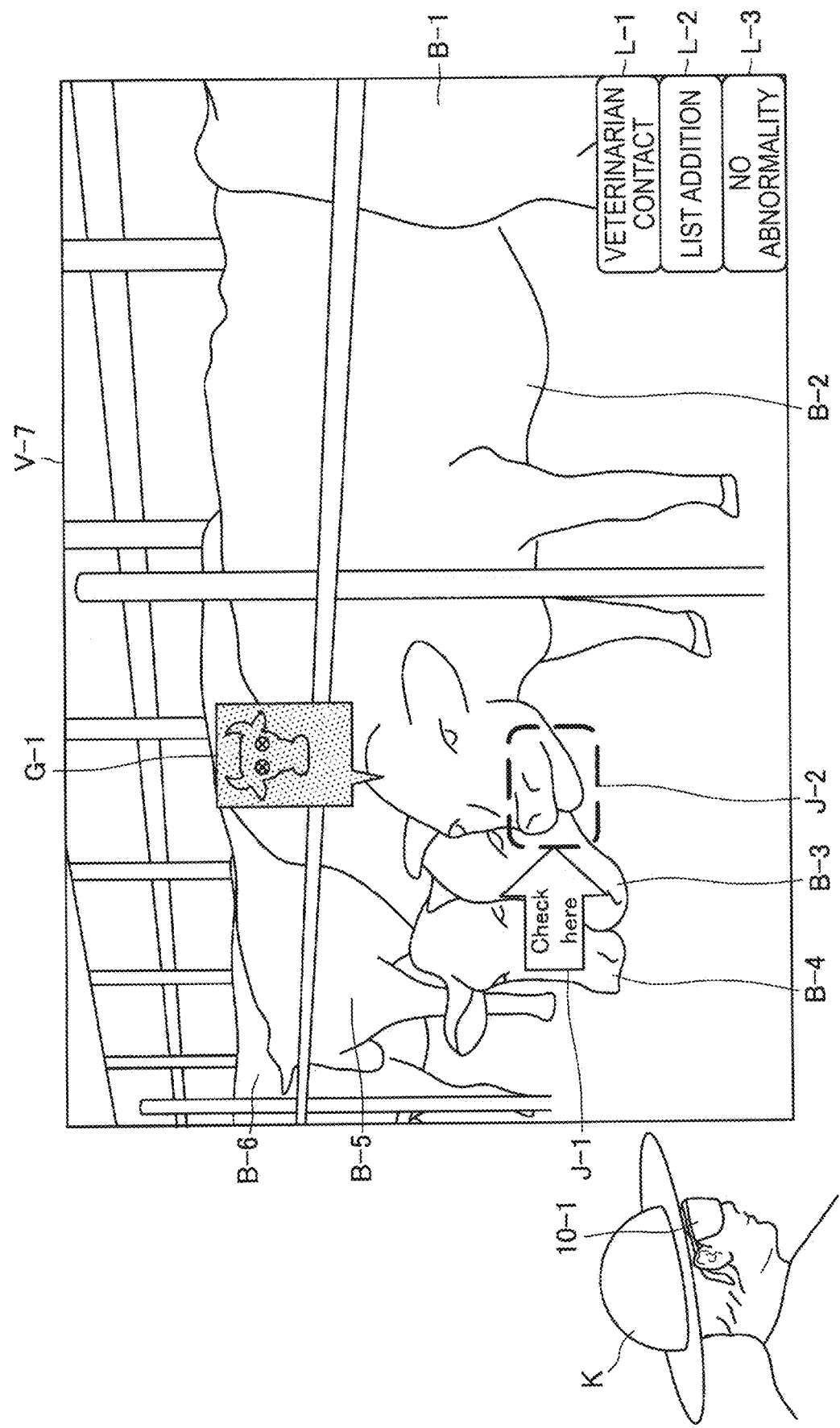
FIG. 16 is a diagram illustrating an example of a field of view provided to a farmer in a case in which an indication of a cow by a farmer is detected, and a first sound spoken by a farmer is recognized.

FIG. 16 is a diagram illustrating an example of the field of view provided to the farmer K in a case in which the indication of the cow B-2 by the farmer K is detected, and the first sound produced by the farmer K is recognized. Referring to FIG. 16, a field of view V-7 is provided to the farmer K. Here, an example in which, in a case in which the detecting unit 120 detects the indication of the cow B-2, and the processing unit 113 recognizes the input of the first sound "now," the display control unit 111 controls both of predetermined display for guiding the farmer to visually recognize the confirmation location corresponding to the state information "abnormality confirmation" in the indicated cow B-2 and display of an object for selecting execution of a predetermined operation will be described.

If the farmer K selects the icon corresponding to the state information in the cow when the icon corresponding to the state information of the cow is displayed, guidance is performed so that the farmer visually recognizes the confirmation location corresponding to the state information in the cow, and the cows can be easily managed. For example, in a case in which the farmer K desires to perform work only on a cow which is required to be confirmed, if the farmer K views only the cow whose icon is displayed, the farmer K can comprehend the confirmation part and perform necessary communication. At this time, the farmer K can specify the cow which is required to be confirmed and naturally move the line of sight from the icon to the confirmation part, and thus a manipulation burden on the farmer K can be reduced.

The confirmation part may be in the field of view of the farmer K or may not be in the field of view of the farmer K. For example, in a case in which the confirmation part is in the field of view of the farmer K, it is desirable for the display control unit 111 to control predetermined highlighting display for the confirmation part.

As an example, a case in which the confirmation part corresponding to the state information "abnormality confirmation" in the cow B-2 is a nose is assumed. In this case, since the confirmation part "nose" is in a field of view V-6, it is desirable for the display control unit 111 to control the highlighting display (for example, the AR display) for the confirmation part "nose" as the predetermined display of guiding the farmer K to visually recognize the confirmation part "nose." Here, the highlighting display is not particularly limited. In the example illustrated in FIG. 16, the highlighting display is performed by an arrow J-1 pointing to the confirmation part "nose" and a broken line J-2 surrounding the confirmation part "nose."

For example, in a case in which the confirmation part corresponding to the state information "abnormality confirmation" in cow B-2 is a nose, the following cases are assumed. For example, a case in which, in the server 20, the process executing unit 212 estimates that the cow B-2 is suspected of having a cold as the state of the cow B-2 since the body temperature of the cow B-2 has increased to exceed a predetermined value for a predetermined period (for example, a short period). Here, in a case in which the muzzle (the surface of the nose) of the cow B-2 is dry, and a definite fever symptom is confirmed, the cow B-2 is likely to have a cold. Further, in a case in which a runny nose symptom of the cow B-2 is confirmed, the cow B-2 is likely to have a cold.

Therefore, in a case in which it is estimated that the cow B-2 is suspected of having a cold in the server 20, it is desirable for the farmer K to confirm the state of the nose of the cow B-2. In this regard, in a case in which it is estimated that the cow B-2 is suspected of having a cold in the server 20, in the communication terminal 10-1, in a case in which the detecting unit 120 includes an imaging device, it is desirable for the processing unit 113 to recognize the nose of the cow B-2 from an image obtained by the imaging device and the display control unit 111 performs the highlighting display for the nose as the confirmation part.

The confirmation part corresponding to the state information "abnormality confirmation" is not limited to the nose, and the confirmation part may differ depending on a type of abnormal state. For example, a case in which, in the server 20, the process executing unit 212 estimates that the cow B-2 is suspected of having an injury on the foot as the state of the cow B-2 since the activity amount of the cow B-2 has decreased to exceed a predetermined value for a predetermined period (for example, a short period). In this case, it is desirable for the farmer K to confirm the state of the foot of the cow B-2. In this regard, it is desirable for the processing unit 113 to recognize the foot of the cow B-2 from the image obtained by the imaging device and the display control unit 111 performs the highlighting display for the foot as the confirmation part.

Further, a case in which, in the server 20, the process executing unit 212 estimates that a state of faeces is required to be confirmed as the state of the cow B-2. In this case, it is desirable for the farmer K to confirm an anal state of the cow B-2. In this regard, it is desirable for the processing unit 113 to recognize the anus of the cow B-2 from the image obtained by the imaging device and the display control unit 111 performs the highlighting display for the anus as the confirmation part.

Further, a case in which, in the server 20, the process executing unit 212 estimates that the cow B-2 is suspected of having mastitis as the state of the cow B-2 on the basis of a measurement result of the milk components by an automatic milking machine is assumed. In this case, it is desirable for the farmer K to confirm the breast of the cow B-2. In this regard, it is desirable for the processing unit 113 to recognize the breast of the cow B-2 from the image obtained by the imaging device and the display control unit 111 performs the highlighting display for the breast as the confirmation part.

As described above, in the embodiment of the present disclosure, the icon corresponding to the state information of the cow is displayed in the vicinity of the cow (for example, above the head of the cow). Further, the confirmation part corresponding to the state information of the cow is highlighted and displayed by the AR display. Therefore, according to the embodiment of the present disclosure, there are effects in that it is possible to reduce the cognitive burden on the farmer K by reducing the movement of the line of sight of the farmer K in a case in which the farmer K confirms the confirmation part by looking at the highlighting display after selecting the icon. On the other hand, for example, a case in which a list of cows which are required to be checked is displayed on a smartphone, and a schematic diagram illustrating the confirmation part at a position distant from the list is displayed on the smartphone is assumed. In this case, at least one hand of the farmer K is tied up, and the movement of the line of sight of the farmer K increases as well. The work burden on the farmer K is not reduced.

Further, in the example illustrated above, the case in which there is one confirmation part corresponding to the state information "abnormality confirmation" has mainly been described. However, there may be a plurality of confirmation parts corresponding to the state information "abnormality confirmation." Even in this case, the display control unit 111 may perform the highlighting display for each of the plurality of confirmation parts corresponding to the state information "abnormality confirmation."

In a case in which the confirmation part highlighted by the highlighting display is confirmed by the farmer K, and the detecting unit 120 detects that the confirmation of the confirmation part by the farmer K has been completed, the process executing unit 113 may control execution of the operation. Here, the process whose execution is controlled by the processing unit 113 is not particularly limited. For example, the operation whose execution is controlled by the processing unit 113 may include at least one of a video call start process with other devices, a process of adding identification information of the cow B-2 corresponding to the state information "abnormality confirmation" to an abnormality confirmation list, or a process of adding information indicating that there is no abnormality to the state information "abnormality confirmation" of the cow B-2.

For example, the detection indicating that the confirmation of the confirmation part has been completed may be detection of the selection manipulation by the farmer K. For example, the display control unit 111 controls display of a veterinarian contact button L-1, a list addition button L-2, and a no abnormality button L-3. If the confirmation part indicated by the highlighting display is confirmed, the farmer K performs the selection manipulation on any one of the veterinarian contact button L-1, the list addition button L-2, and the no abnormality button L-3. If the selection manipulation by the farmer K is detected by the detecting unit 120, the processing unit 113 may select an operation on the basis of the selection manipulation by the farmer K and control execution of the selected operation.

In a case in which the selection manipulation by the farmer K on the veterinarian contact button L-1 is detected by the detecting unit 120, the processing unit 113 may initiate the video call with the communication terminal 10-2 used by the veterinarian M. A conversation is performed between the farmer K and the veterinarian M through the video call. According to this function, in a case in which the farmer K determines that the state of the cow B-2 is very bad, and an urgent treatment is required for the cow B-2, the farmer K can immediately make a call to the veterinarian M and call the veterinarian M to the place of the farmer K.

Further, the processing unit 113 may automatically activate the imaging device included in the detecting unit 120 during the video call and control the communication unit 130 so that an image (video) captured by the imaging device is transmitted to the communication terminal 10-2 used by the veterinarian M. Accordingly, since the farmer K can show the veterinarian M the confirmation part of the cow B-2 in real time, the veterinarian M can perform more accurate examination.

Further, the processing unit 113 may control the communication unit 130 such that a voice and a video at the time of video call are transmitted to the server 20 together with a call history (such as a call start time). In the server 20, if the voice, the video, and the call history are received by the communication unit 230, the storage unit 220 may store the voice, the video, and the call history in association with the individual ID of the cow B-2.

Further, in a case in which the communication with the veterinarian M ends, the processing unit 113 may control the communication unit 130 such that flag information indicating necessary diagnosis is transmitted to the server 20. In the server 20, if the flag information indicating the necessary diagnosis is received by the communication unit 230, the storage unit 220 may store the flag information in association with individual ID of the cow B-2. Accordingly, in the communication terminal 10-2 used by the veterinarian M, a mark indicating that the flag information indicating the necessary diagnosis is attached can be AR-displayed on the basis of the position of the cow B-2.

Further, here, the example in which the flag information indicating the necessary diagnosis is transmitted to the server 20 has been described. However, the flag information transmitted to the server 20 is not limited to the flag information indicating the necessary diagnosis. For example, flag information indicating that a livestock barn is moved, flag information indicating that the farmer performs treatment, flag information indicating that treatment by the veterinarian is necessary, flag information indicating that the estrus confirmation by the veterinarian is necessary, flag information indicating slaughter, flag information indicating shipping, or the like may be transmitted to the server 20 on the basis of the selection manipulation by the farmer K.

At this time, similarly to the case in which the flag information indicating the necessary diagnosis is transmitted to the server 20, in the communication terminal 10-2 used by the veterinarian M, a mark indicating that the flag information is attached may be AR-displayed on the basis of the position of the cow B-2.

Further, in a case in which the selection manipulation by the farmer K on the list addition button L-2 is detected by the detecting unit 120, the processing unit 113 may control the communication unit 130 such that flag information indicating the diagnosis necessity is transmitted to the server 20. Accordingly, even in a case in which an urgent treatment for the cow B-2 is unnecessary, the veterinarian M can examine the cow B-2 when visiting the farmer K later. Further, the flag information may be 0 (examination not required)/1 (examination required) or may be time information such as a current date (for example, year, month, and day, or the like).

In the server 20, in a case in which the flag information indicating the necessary diagnosis is received by the communication unit 230, the storage unit 220 may store the flag information indicating the necessary diagnosis in association with the individual ID of the cow B-2. Accordingly, in the communication terminal 10-2 used by the veterinarian M, a mark indicating that the flag information indicating the necessary diagnosis is attached can be AR-displayed on the basis of the position of the cow B-2. The veterinarian M can perform clinical practice efficiently on the basis of the abnormality confirmation list (the individual ID of the cow with the flag information indicating the necessary diagnosis) and the AR display when visiting the famer K later.

Further, even in a case in which the selection manipulation by the farmer K on the veterinarian contact button L-1 is detected by the detecting unit 120, and the video call with the communication terminal 10-2 used by the veterinarian M is performed, diagnosis for the cow B-2 may be necessary. In this case, the farmer K may perform the selection manipulation on the list addition button L-2. The process performed in a case in which the selection manipulation by the farmer K on the list addition button L-2 is detected by the detecting unit 120 has been described above.

Further, the display control unit 111 may control display of an imaging start button (not illustrated) for starting capturing of a still image or a moving image with the imaging device included in the communication terminal 10-1 of the farmer K. Further, in a case in which the selection manipulation by the farmer K on the imaging start button (not illustrated) is detected by the detecting unit 120, the processing unit 113 may start the capturing of the still image or the moving image and control the communication unit 130 such that the still image or the moving image is transmitted to the server 20. In the server 20, if the still image or the moving image is received by the communication unit 230, the storage unit 220 may store the still image or the moving image in association with the individual ID of the cow B-2.

Further, the manipulation for starting the capturing of the still image or the moving image with the imaging device included in the communication terminal 10-1 of the farmer K is not limited to the selection manipulation on the imaging start button (not illustrated). For example, the manipulation for starting the capturing of the still image or the moving image may be any other selection manipulation (for example, a gesture command, a voice command, or the like).

Further, when the identification information of the cow B-2 corresponding to the state "abnormality confirmation" is added to the abnormality confirmation list, the farmer K may be able to add additional information such as a disease name which the cow B-2 is suspected of having (for example, by voice or the like). At this time, the processing unit 113 may control the communication unit 130 such that the additional information detected by the detecting unit 120 is transmitted to the server 20. In the server 20, if the additional information is received by the communication unit 230, the storage unit 220 may store the additional information in association with the individual ID of the cow B-2.

Further, in a case in which the selection manipulation by the farmer K on the no abnormality button L-3 is detected by the detecting unit 120, the processing unit 113 may control the communication unit 130 such that flag information indicating that there is no abnormality is transmitted to the server 20. In the server 20, if the flag information indicating that there is no abnormality is received by the communication unit 230, the storage unit 220 may store the flag information in association with individual ID of the cow B-2.

In this case, in a case in which the state of the cow B-2 is estimated to be "abnormality confirmation" by the server 20, but there is no abnormal part in an observation of the farmer K (for example, in a case in which erroneous estimation is made by the server 20), it is possible to prevent the icon G-1 indicating the state "abnormality confirmation" from being displayed until the state "abnormality confirmation" is newly estimated by the server 20.

The example in which the processing unit 113 selects any one of the operations "contact veterinarian," "add to list," and "no abnormality" on the basis of the selection manipulation by the farmer K has been described above. However, the process control unit 113 can also select an operation on the basis of the sensor data. The sensor data may be detected by the external sensor 30, may be detected by the wearable device 40, or may be detected by the detecting unit 120 in the communication terminal 10-1 used by the farmer K.

For example, the sensor data may be an image captured by the imaging device of the detecting unit 120 in the communication terminal 10-1. At this time, the processing unit 113 may recognize a portion highlight-displayed from an image and automatically select any one of the operations "contact veterinarian," "add to list," and "no abnormality" on the basis of an image recognition result.

Further, a selection result of any one of the actions "contact veterinarian," "add to list," and "no abnormality" by the farmer K may be used as the correct data of the machine learning process for the state estimation on the basis of the sensor data. The machine learning process can be executed by the process executing unit 212 on the server 20. Specifically, the selection result by the farmer K is transmitted to the server 20 by the communication unit 130, received by the communication unit 230 in the server 20, and used as the correct data of the machine learning process by the process executing unit 212 in the server 20. At this time, a selection result obtained in the communication terminal 10-1 in the past can also be used as the correct data of the machine learning process.

As described above, the confirmation result input data input after the farmer K looks at the location is used as the correct data of the machine learning process of performing the estimation on the basis of the sensor data and contributes to the improvement in the accuracy of the machine learning process. Depending on conditions such as individual differences between bred cows, feedstuff given to the cows, how to grow the cows, or climates of a place in which the farmer is located, a correct rate of the state estimation is likely to decrease. However, since the confirmation result input data is used as the correct data of the machine learning process, it is possible to perform the state estimation suitable for the farmer.

As described above, according to the embodiment of the present disclosure, the display control unit 111 can control the icon display only in the vicinity of the cow which is required to be checked and control the highlighting display of the confirmation part of the cow in a case in which the icon selection is detected by the detecting unit 120. Accordingly, the farmer K can take, for example, an action of contacting the veterinarian immediately once the confirmation part is confirmed. Therefore, it is possible to improve the efficiency of the confirmation work by the farmer K and reduce the burden on the farmer K. As comparative examples of the embodiment of the present disclosure, (1) a technique of displaying an icon indicating a state for all the cows from the beginning, (2) a technique of displaying an icon at a position corresponding to an abnormal state of a cow from the beginning, and the like are assumed, but according to the embodiment of the present disclosure, it is possible to perform display which is easier to see than in these techniques.

Figure 17:
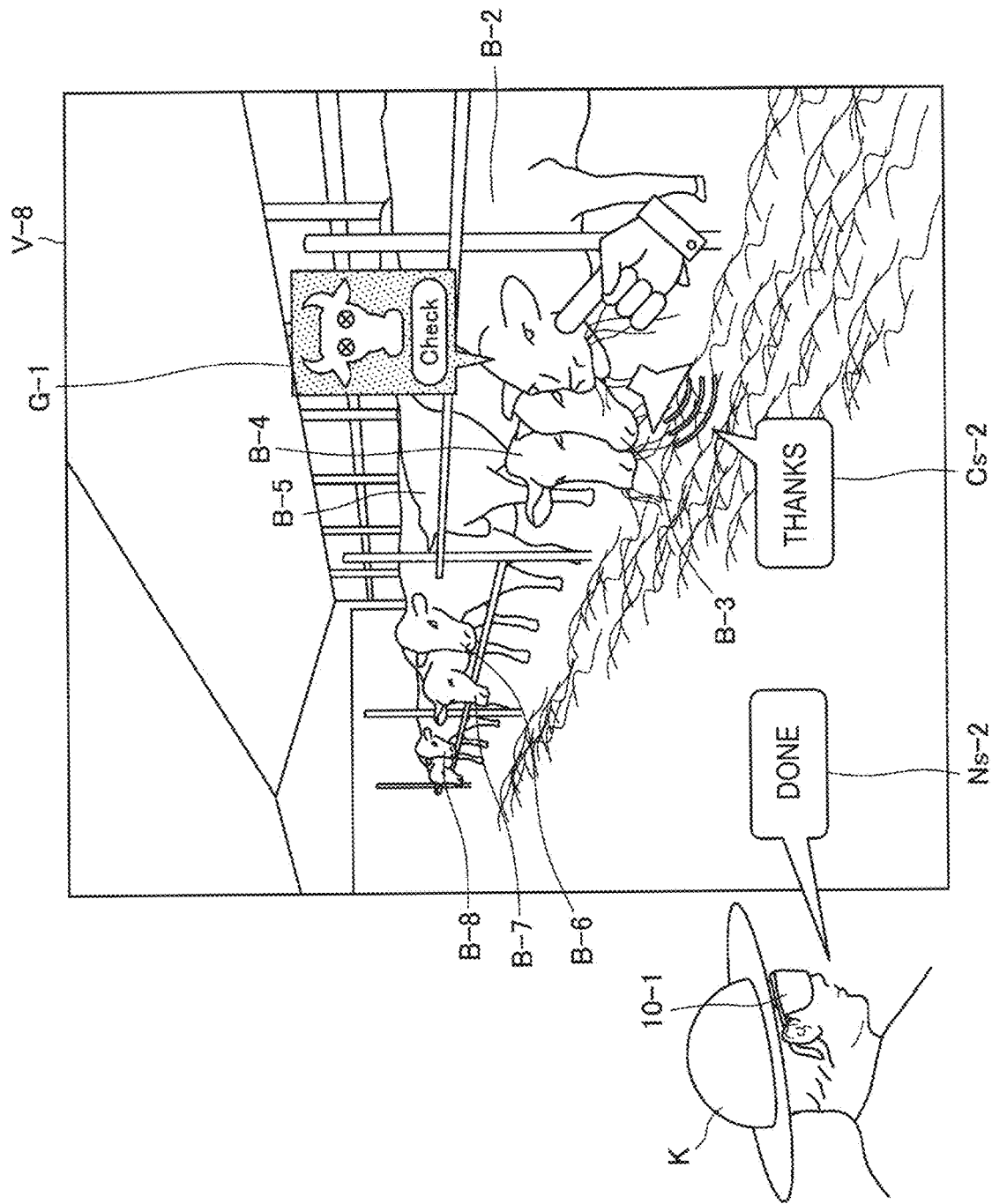
FIG. 17 is a diagram illustrating an example of a field of view provided to a farmer in a case in which abnormality confirmation for a cow ends.

FIG. 17 is a diagram illustrating an example of the field of view provided to the farmer K in a case in which the abnormality confirmation for the cow B-2 ends. Referring to FIG. 17, a field of view V-8 is illustrated. Here, in a case in which the farmer K considers to end the abnormality confirmation for the cow B-2, it is desirable for the farmer K to indicate cow B-2, similarly to in the case in which the abnormality confirmation is started. The indication of the cow B-2 by the farmer K is detected by the detecting unit 120. Alternatively, the farmer K may speak a predetermined voice or take a predetermined action while indicating the cow B-2. The predetermined voice or the predetermined action can be recognized by the processing unit 113.

In a case in which the indication of the cow B-2 is detected by the detecting unit 120, and a predetermined voice or a predetermined action is recognized by the processing unit 113, the output control unit 114 may control the output of predetermined comment information. Further, although the predetermined voice is not limited, it may be "done" or the like. In the example illustrated in FIG. 17, a voice Ns-2 "done" is spoken as a voice including a predetermined voice "done." Further, although the predetermined comment information is not limited, it may be the comment information Cs-2 "thanks."

The farmer K can confirm the end of the abnormality confirmation for the cow B-2 by viewing the comment information Cs-2 "thanks." Further, a command necessary for ending the abnormality confirmation for the cow B-2 is not particularly limited. It is also possible for the farmer K to freely select and set the command necessary to end the abnormality confirmation for the cow B-2 from the indication of the cow B-2, a combination of the indication of the cow B-2 and a predetermined voice, a combination of the indication of the cow B-2 and a predetermined action, and the like.

Next, a case in which the farmer K decides to perform the abnormality confirmation for the cow B-2 later as a result of visually recognizing the comment information Cs-1 "I am drained" is assumed. In this case, the farmer K indicates the cow B-2 and speaks the second sound. The indication of the cow B-2 by the farmer K and the voice spoken by the farmer K are detected by detecting unit 120. Then, the processing unit 113 performs the voice recognition process on the speech spoken by the farmer K, and in the case in which the speech recognition result includes the second input data prepared in advance, the processing unit 113 recognizes that the farmer K speaks the second sound.

Figure 18:
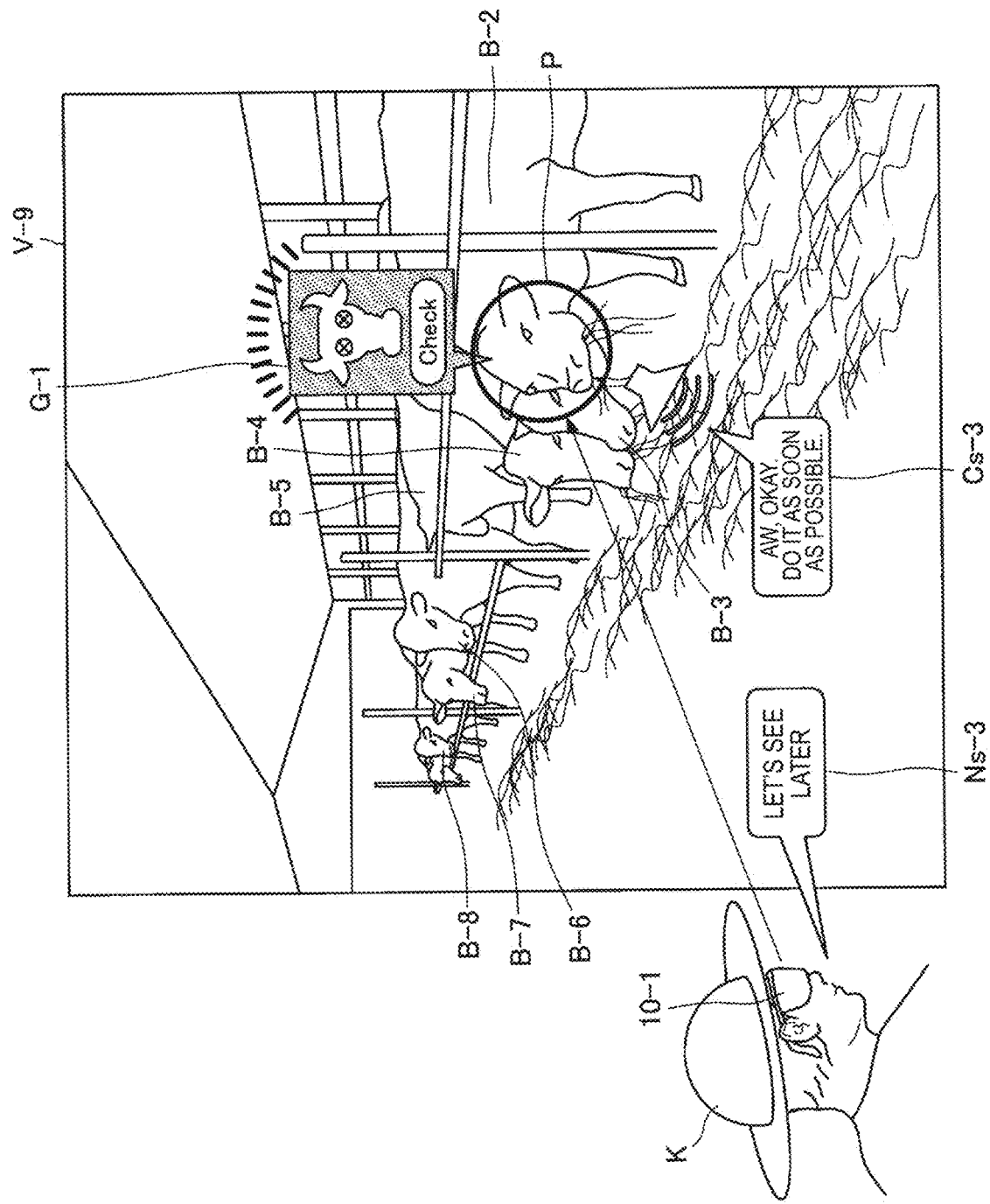
FIG. 18 is a view illustrating an example of a field of view provided to a farmer in a case in which an indication of a cow by a farmer is detected, and a second sound spoken by a farmer is recognized.

FIG. 16 is a diagram illustrating an example of the field of view provided to the farmer K in a case in which the indication of the cow B-2 by the farmer K is detected, and the second sound spoken by the farmer K is recognized. Referring to FIG. 18, a field of view V-9 is provided to the farmer K. In the example illustrated in FIG. 18, the farmer K speaks a voice Ns-3 "let's see later" as a voice including the second sound "later." Then, the indication of the cow B-2 and the voice Ns-3 "let's see later" are detected by the detecting unit 120. Then, the second sound "later" is recognized by the processing unit 113.

Here, the indication of the cow B-2 may be performed, similarly to when the abnormality confirmation for the cow B-2 is started. A case in which the indication of the cow B-2 and the voice Ns-2 "let's see later" are detected by the detecting unit 120, and the processing unit 113 recognizes that the second sound "later" is input from the voice Ns-2 "let's see later" is assumed. In this case, the display control unit 111 may control the output of other comment information (response comment information) corresponding to the second sound "later." In FIG. 18, as an example of the other comment information (the response comment information), the comment information Cs-3 "Aw, okay. Do it as soon as possible." is illustrated.

Further, the output control unit 114 may control the comment information Cs-3 "Aw, okay. Do it as soon as possible," and the display control unit 111 may change the display state of the icon G-1. The display state of icon G-1 may be changed through any method. As an example, as illustrated in FIG. 18, the display control unit 111 may change a color of the icon G-1 but may change a character included in the icon G-1 or may change an illustration included in the icon G-1. Further, the output control unit 114 may change the comment information Cs-3 or may change the display state of the icon G-1 on the basis of a previous treatment history for the cow B-2 (for example, a level indicating that a treatment for the cow B-2 is "properly performed," "normal," "not properly performed," or the like).

The example in which, in the communication terminal 10-1, the display control unit 111 controls the AR display of the icon corresponding to the state of the cow has mainly been described above. However, in the communication terminal 10-1, the display control unit 111 may perform control such that the state information of the cow is displayed in another form. For example, in the communication terminal 10-1, the display control unit 111 may attach a predetermined mark to a position at which the cow is located in a map and control display of the map in which a predetermined mark is attached to the position at which the cow is located. Further, here, the map display in the communication terminal 10-1 will be mainly described, but the communication terminal 10-2 may also control the map display, similarly to the communication terminal 10-1.

Figure 19:
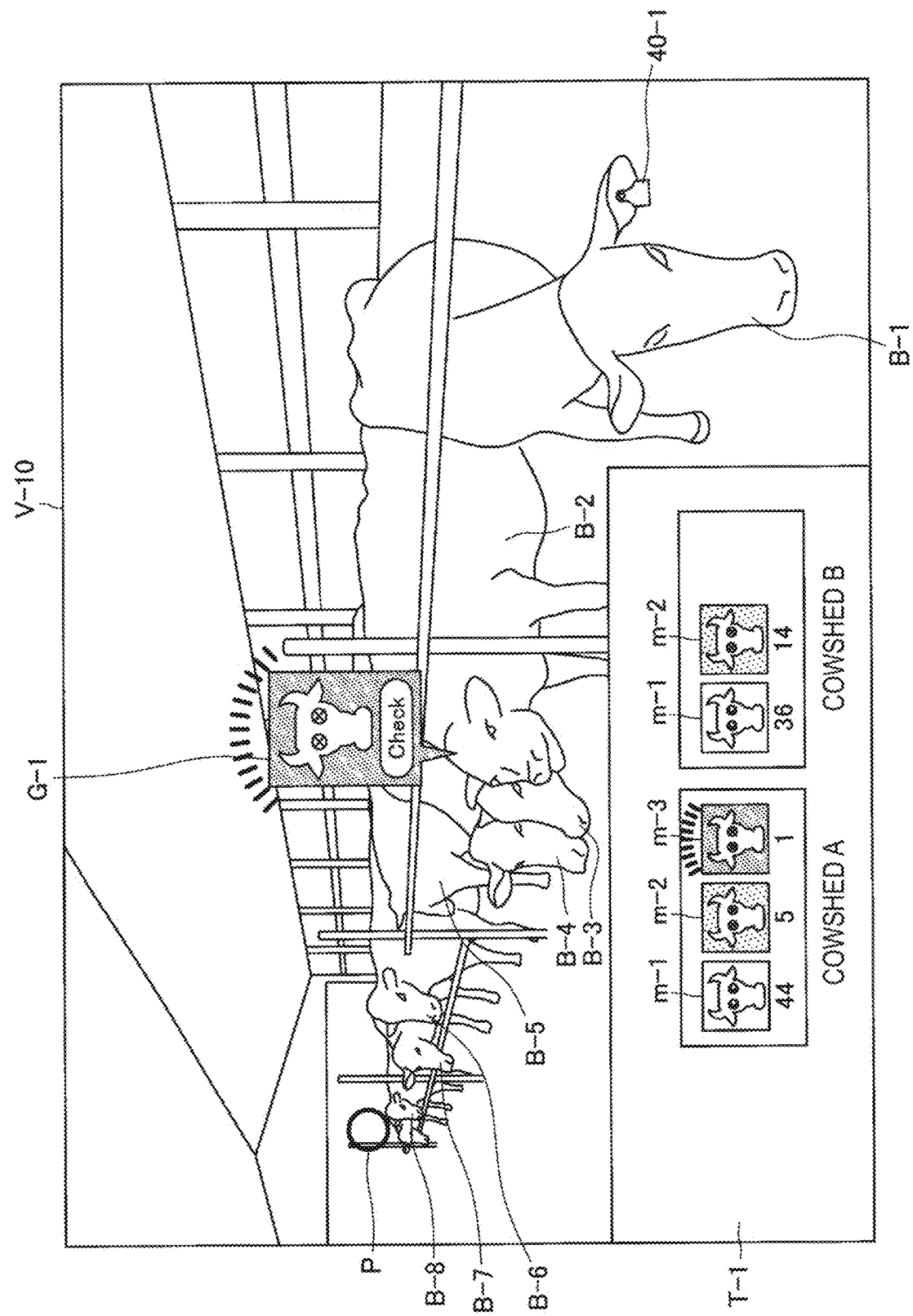
FIG. 19 is a diagram illustrating an example of map display.

FIG. 19 is a diagram illustrating an example of a map display. Referring to FIG. 19, a field of view V-10 of the farmer K is illustrated. As illustrated in FIG. 19, in the communication terminal 10-1, the display control unit 111 may calculate the headcount of the cows having no abnormality (that is, the cows for which the no abnormality button L-3 is selected) for each region (for example, a cowshed A, a cowshed B, a region outside the shed, or the like) on the basis of the position information of each of the cows B-1 to B-11 and perform control such that a map T-1 to which an icon m-1 in which the headcount of the cows having no abnormality is attached to a predetermined position (a lower portion in the example illustrated in FIG. 19) is attached for each region is displayed.

Similarly, the display control unit 111 may calculate the headcount of the cows for which diagnosis is necessary (that is, the cows in which the list addition button L-2 is selected) for each region and attach an icon m-2 in which the headcount of the cows for which diagnosis is necessary is attached to a predetermined position to each region in the map T-1. Further, the display control unit 111 may calculate the headcount of the cows to which information indicating that the farmer K will confirm later is input for each region and attach an icon m-2 in which the headcount of the cows to which information indicating that the farmer K will confirm later is input is attached to a predetermined position to each region in the map T-1.

A timing at which the map T-1 is displayed is not particularly limited. For example, the display control unit 111 may determine whether or not any one of the cows B-1 To BN is in the field of view V-10 on the basis of the position information of each of the cows B-1 to B-N and the direction of the communication terminal 10-1 (the direction of the face of the farmer K). Then, in a case in which the display control unit 111 determines that none of the cows B-1 to B-N is in the field of view V-10, the display control unit 111 may control display of the map T-1.

Alternatively, in a case in which it is determined that the farmer K performs a predetermined action on the basis of a motion of the farmer K detected by the motion sensor included in the detecting unit 120, the display control unit 111 may control display of the map T-1. The predetermined action may be an action of the farmer K of looking up (that is, an action of tilting the top of the head of the farmer K backward) or an action of the farmer K of looking down (that is, an action of tilting the top of the head of the farmer K forward).

Alternatively, the display control unit 111 may determine whether or not the farmer K is in a predetermined region on the basis of the position information of the farmer K. Further, in a case in which it is determined that the farmer K is in the predetermined region, the display control unit 111 may control the display of the map T-1. The predetermined region is not particularly limited. For example, the predetermined region may be a region in which it is difficult for any of the cows B-1 to B-N to be in the field of view V-10 of the farmer K or may be an office or the like.

Further, in FIG. 19, the example in which the map T-1 is displayed in a part of the field of view V-10 of the farmer K, and the icon G-1 is AR-displayed in the field of view other than the region in which the map T-1 is displayed in the field of view V-10 of the farmer K (that is, the example in which the map display and the AR display are displayed at the same time) is illustrated. However, the map T-1 may be displayed in the entire field of view V-10 of the farmer K. At this time, the icon G-1 may not be AR-displayed in the field of view other than the region in which the map T-1 is displayed in the field of view V-10 of the farmer K.

The functions of communication terminal 10-1 used by the farmer K has mainly been described above.

1.6.2. Communication Terminal Used by Veterinarian

Next, the functions of communication terminal 10-2 used by the veterinarian M will be mainly described. Here, a case in which the veterinarian M wearing the communication terminal 10-2 is in the real world is assumed. More specifically, a case in which the veterinarian M is called by the farmer K through the video call or visits the farmer K periodically is assumed.

Even in the communication terminal 10-2 used by the veterinarian M, similarly to the example described in the functions of the communication terminal 10-1 used by the farmer K, the display of the icon G-1 corresponding to the state "abnormality confirmation" in the cow B-2 and the icon G-2 corresponding to the state "estrus confirmation" in the cow B-1 may be controlled. Alternatively, in the communication terminal 10-2, the display control unit 111 may AR-display only the icon G-1 of the cow whose individual ID is included in the abnormality confirmation list received from the server 20 by the communication unit 130.

The icon G-1 displayed as described above may be selectable. The selection of the icon G-1 may be performed by the selecting unit 112 in a case in which the selection manipulation by the veterinarian M is detected by detecting unit 120 in communication terminal 10-2. Variations of the selection manipulations have been described above. Here, a case in which the communication terminal 10-1 selects the icon G-1 corresponding to the state information "abnormality confirmation" is assumed.

Figure 20:
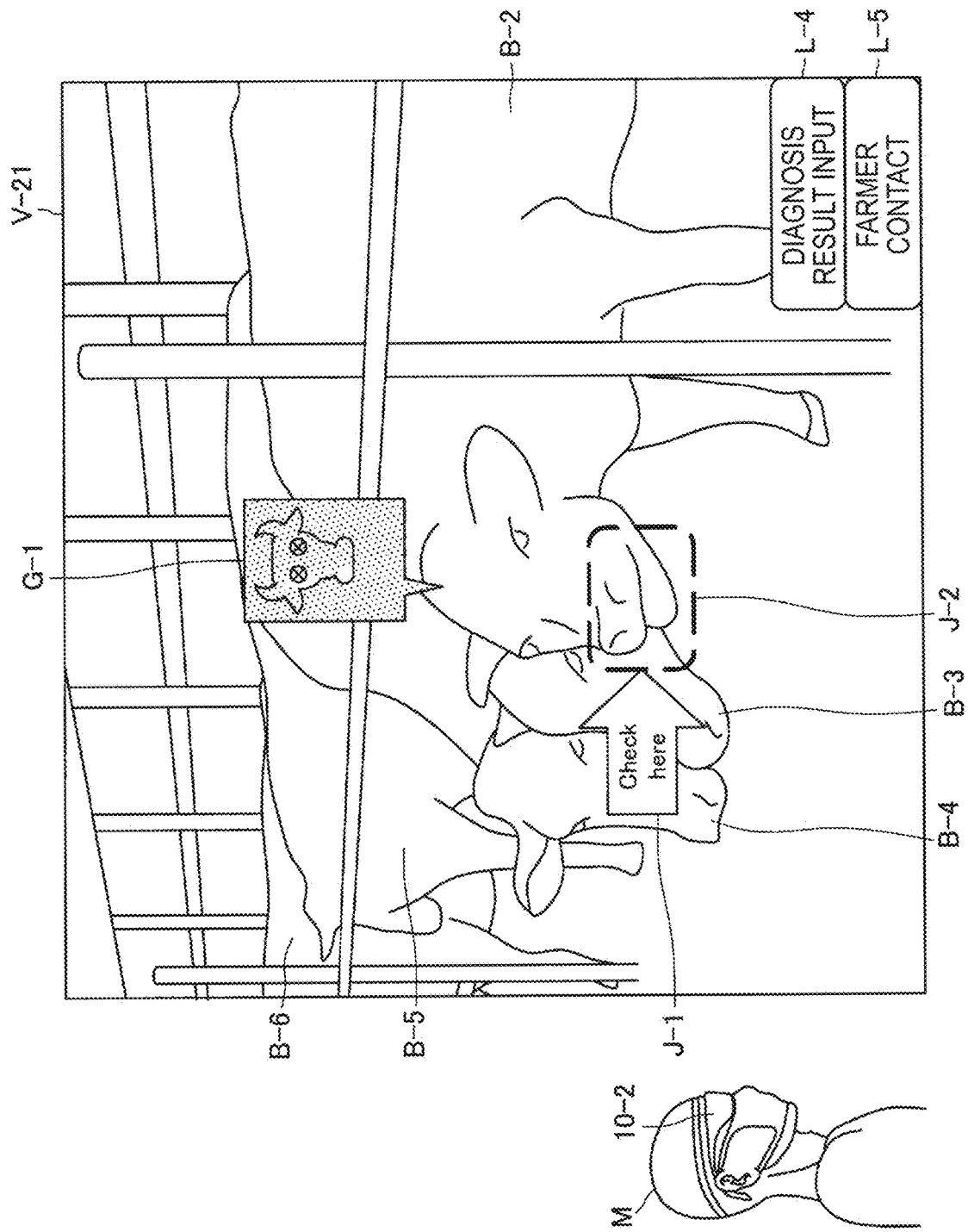
FIG. 20 is a diagram illustrating an example of field of view of a veterinarian after selection of icon corresponding to state information "abnormality confirmation."

FIG. 20 is a diagram illustrating an example of the field of view of the veterinarian M after selecting the icon G-1 corresponding to the state information "abnormality confirmation." Referring to FIG. 20, as the veterinarian M approaches the cow B-2 corresponding to the state "abnormality confirmation," the cow B-2 is closed up for the veterinarian M. Here, in the communication terminal 10-2, in a case in which the selecting unit 112 selects the icon G-1, the output control unit 114 controls the output of the comment information corresponding to the state information "abnormality confirmation" of the cow B-2 and the feature information of the cow B-2. In this case, in a case in which the icon G-1 is selected by the selecting unit 112, the display control unit 111 controls predetermined display of guiding the farmer K to visually recognize a confirmation part corresponding to the state information "abnormality confirmation" in the cow B-2.

Here, in the communication terminal 10-2 used by the veterinarian M, similarly to the communication terminal 10-1 used by the farmer K, the display control unit 111 controls the highlighting display (for example, the AR display) for the confirmation part "nose" as the predetermined display of guiding the veterinarian M to visually recognize the confirmation part "nose." In the example illustrated in FIG. 20, the highlighting display is also performed by an arrow J-1 pointing to the confirmation part "nose" and a broken line J-2 surrounding the confirmation part "nose."

In a case in which the confirmation part highlighted by the highlighting display is examined by the veterinarian M, treatment corresponding to a symptom is performed, and completion of the examination of the confirmation part by the veterinarian M is detected by the detecting unit 120, the processing unit 113 may control execution of an operation. Here, the process whose execution is controlled by the processing unit 113 is not particularly limited. For example, the operation whose execution is controlled by the processing unit 113 may include at least one of a diagnosis result input or a video call start with other devices.

For example, the detection of the completion of the examination of the confirmation part may be detection of a selection manipulation by the veterinarian M. For example, the display control unit 111 controls display of a diagnosis result input button L-4 and a farmer contact button L-5. If the confirmation part indicated by the highlighting display is examined, the veterinarian M performs the selection manipulation on either the diagnosis result input button L-4 or the farmer contact button L-5. In a case in which the selection manipulation by the veterinarian M is detected by the detecting unit 120, the processing unit 113 may select an operation on the basis of the selection manipulation by the veterinarian M and control execution of the selected operation.

In a case in which the selection manipulation by the veterinarian M on the diagnosis result input button L-4 is detected by the detecting unit 120, if the diagnosis result input by the veterinarian M is detected by the detecting unit 120, the processing unit 113 performs control such that the diagnosis result is transmitted to the server 20 by the communication unit 130. For example, the diagnosis result may be input by voice. In the server 20, in a case in which the diagnosis result is received by the communication unit 230, the storage unit 220 stores the diagnosis result in an electronic chart of the cow information (data in the database) in association with the individual ID of the cow B-2.

Further, the diagnosis result may be used as the correct data of the machine learning process for performing the state estimation on the basis of the sensor data. The machine learning process can be executed by the process executing unit 212 on the server 20. Specifically, the diagnosis result by the veterinarian M may be used as the correct data of the machine learning process by the process executing unit 212 in the server 20. At this time, a diagnosis result obtained in the communication terminal 10-2 in the past can also be used as the correct data of the machine learning process.

In a case in which the selection manipulation by the veterinarian M on the farmer contact button L-5 is detected by the detecting unit 120, the processing unit 113 may initiate the video call with the communication terminal 10-1 used by the farmer K. A conversation is performed between the veterinarian M and the farmer K through the video call. According to this function, the veterinarian M is able to talk with the farmer K which is in a remote place in a hands-free manner.

Further, the highlighting display may interfere with the examination by the veterinarian M. In this regard, it is desirable that the highlighting display can be deleted by a predetermined deletion manipulation by the veterinarian M. In other words, in the communication terminal 10-2, in a case in which the predetermined deletion manipulation by the veterinarian M is detected by the detecting unit 120, the display control unit 111 may delete the highlighting display. The predetermined deletion manipulation is not limited and may be a predetermined voice input.

As described above, in a case in which the diagnosis result for the cow B-2 input by the veterinarian M is detected by the detecting unit 120, the processing unit 113 performs control such that the diagnosis result for the cow B-2 is transmitted to the server 20 by the communication unit 130. Further, the veterinarian M may be able to input treatment content for the cow B-2 in a case in which the treatment is performed after the diagnosis result for the cow B-2 is input. For example, the treatment content for the cow B-2 may be input by voice.

Figure 21:
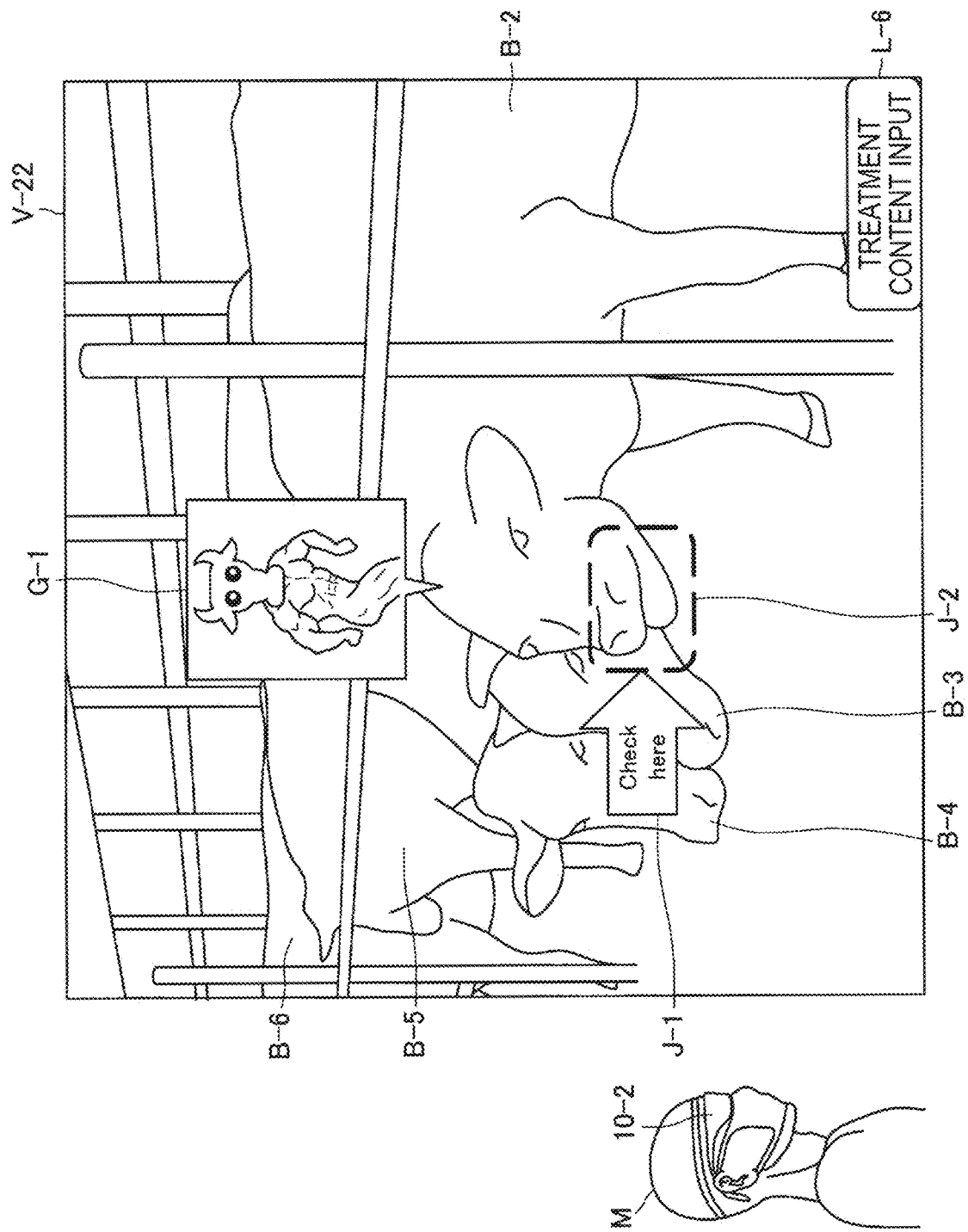
FIG. 21 is a diagram illustrating an example of field of view of a veterinarian after diagnosis result input.

FIG. 21 is a diagram illustrating an example of the field of view of the veterinarian M after the diagnosis result is input. Referring to FIG. 21, a field of view V-21 of the veterinarian M after the diagnosis result is input is illustrated. After the diagnosis result is input, the display control unit 111 controls display of the treatment content input button L-6. After the diagnosis result is input, the veterinarian M performs the selection manipulation on the treatment content input button L-6 in a case in which the treatment is performed on the cow B-2. If the selection manipulation on the treatment content input button L-6 is detected by the detecting unit 120, the detecting unit 120 may detect the treatment content input from the veterinarian M.

Further, in a case in which the treatment content for the cow B-2 input from the veterinarian M is detected by the detecting unit 120, the processing unit 113 performs control such that the treatment content for the cow B-2 is transmitted to the server 20 by the communication unit 130. In the server 20, if the treatment content for the cow B-2 is received by the communication unit 230, the treatment content for the cow B-2 is associated with the individual ID of the cow B-2 by the storage unit 220 and stored in the electronic chart of the cow information ("data" in the database).

Further, in a case in which the treatment content for the cow B-2 input from the veterinarian M is detected by the detecting unit 120, the processing unit 113 may change the icon G-1 on the basis of the treatment content. For example, in a case in which the veterinarian M gives an injection to the cow B-2, the display control unit 111 may changes the icon G-1 so that it can be understood that the injection is given, and the processing unit 113 may associate the flag information indicating that the injection is given with the individual ID of the cow B-2.

Depending on the flag information indicating that the injection is given, in the communication terminal 10-1 used by the farmer K, an icon may be displayed so that it can be understood that the injection is given. Therefore, the farmer K easily understands that the injection is given to the cow B-2. Further, a way of changing the icon G-1 is not limited and may be set in accordance with the preference of the farmer K. Further, the output of a predetermined voice indicating that the injection is given may be controlled so that the farmer K can more easily understand that the injection is given to the cow B-2.

Here, in a case in which the veterinarian M considers to finish the diagnosis and the treatment for the cow B-2, it is desirable for the veterinarian M to indicate the cow B-2, similarly to when the farmer K ends the abnormality confirmation. Alternatively, the veterinarian M may speak a predetermined voice or take a predetermined action while indicating the cow B-2. At this time, since a specific operation by the communication terminal 10-2 used by the veterinarian M is similar to the operation performed by the communication terminal 10-1 used by the farmer K in a case in which the farmer K ends the abnormality confirmation, detailed description thereof is omitted.

The functions of communication terminal 10-2 used by the veterinarian M have mainly been described above.

1.6.3. Operation Examples

Figure 22:
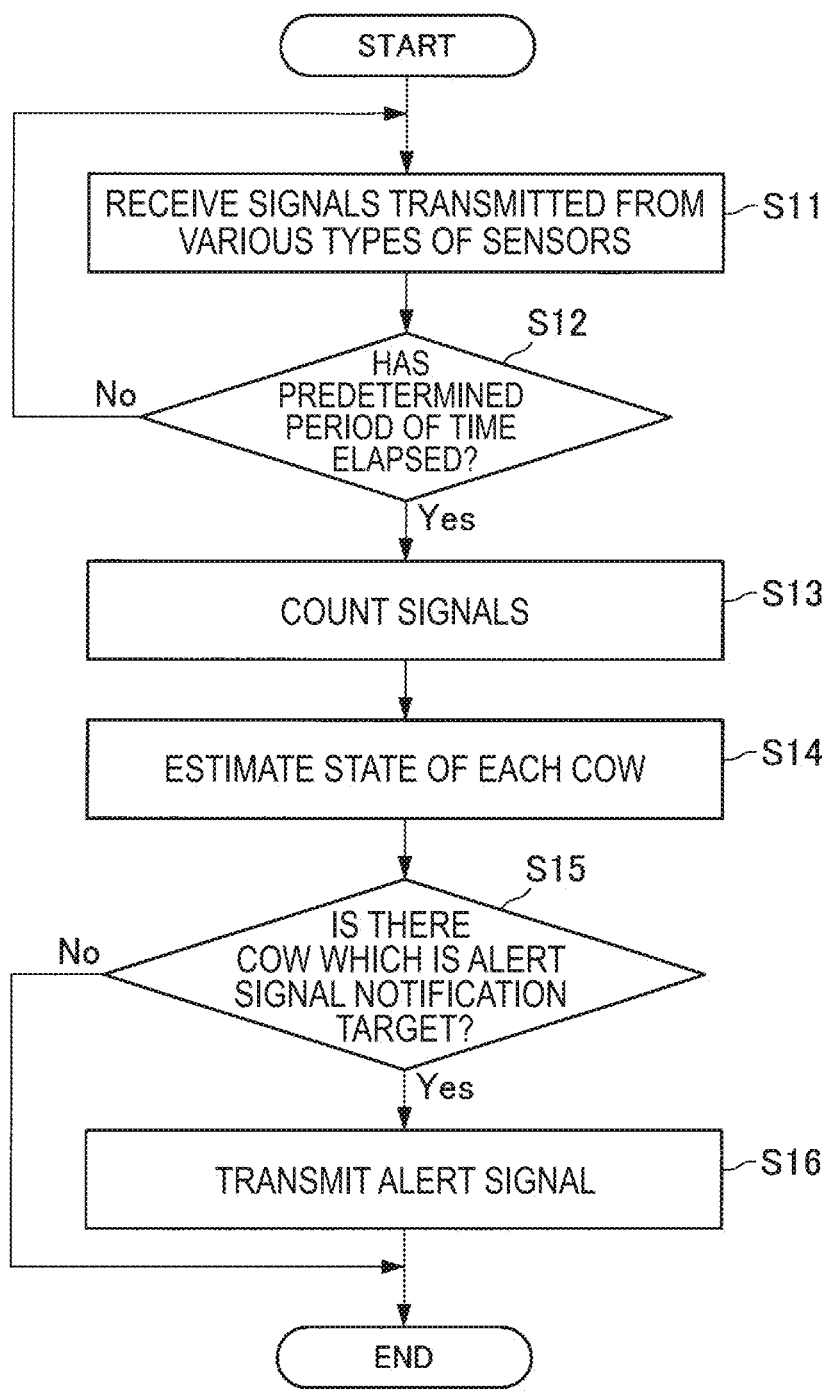
FIG. 22 is a flowchart illustrating an example of a state estimation operation by a server according to the embodiment.

Next, an example of an operation of the display control system 1 according to an embodiment of the present disclosure will be described. FIG. 22 is a flowchart illustrating an example of a state estimation operation by the server 20 according to an embodiment of the present disclosure. Further, the flowchart illustrated in FIG. 22 merely illustrates an example of the state estimation operation by the server 20. Therefore, the state estimation operation by the server 20 is not limited to the operation example of the flowchart illustrated in FIG. 22.

As illustrated in FIG. 22, in the server 20, the communication unit 230 receives signals transmitted from various sensors (S11). Examples of various sensors include the external sensor 30 and the wearable devices 40-1 to 40-N. In a case in which a predetermined period of time has not elapsed ("No" in S12), the control unit 210 returns to S11. On the other hand, in a case in which the predetermined period of time has elapsed ("Yes" in S12), the information acquiring unit 211 acquires the signals received from various sensors until a predetermined time elapses, and the process executing unit 212 counts the signals acquired by the information acquiring unit 211 (S13).

The process executing unit 212 estimates the state of each cow by the counting (S14). Then, the process executing unit 212 determines whether or not there is a cow which is an alert signal notification target on the basis of the state information of each cow. The cow which is an alert signal notification target is not limited but may be a cow corresponding to a state "injured" as an example. In a case in which there is no cow that is an alert signal notification target ("No" in S15), the control unit 210 ends the operation. On the other hand, in a case in which there is a cow which is an alert signal notification target ("Yes" in S15), the information providing unit 213 controls the communication unit 230 such that the alert signal is transmitted to the communication terminal 10-1 through the communication unit 230 (S16).

Here, the information providing unit 213 may include the individual ID of the cow that is the alert signal notification target and the state information of the cow in the alert signal. Further, in the communication terminal 10-1, if the alert signal is received by the communication unit 130, the display control unit 111 may acquire the individual ID of the cow and the state information of the cow from the alert signal and control the display of the individual ID of the cow and the state information of the cow.

Figure 23:
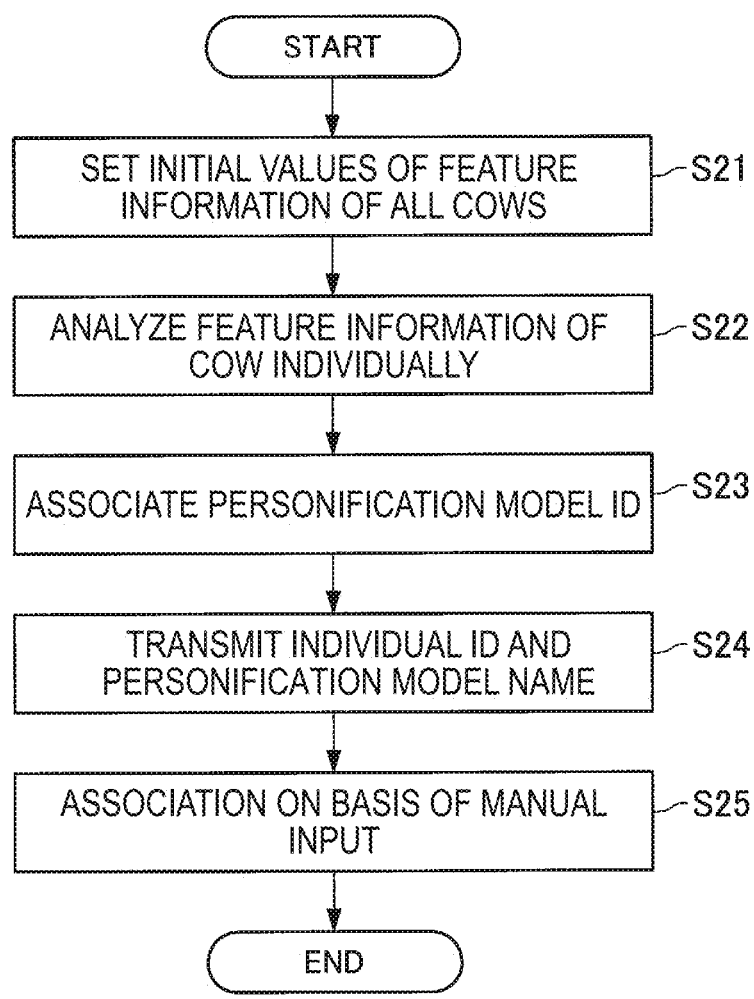
FIG. 23 is a flowchart illustrating an example of an association operation by a server according to the embodiment.

FIG. 23 is a flowchart illustrating an example of an association operation by the server 20 according to an embodiment of the present disclosure. Further, the flowchart illustrated in FIG. 23 merely illustrates an example of the association operation by the server 20. Therefore, the association operation by the server 20 is not limited to the operation example of the flowchart illustrated in FIG. 23. Further, a part (for example, all or some of S21 to S25) of the operation illustrated in FIG. 23 may be executed by the communication terminal 10-1 instead of the server 20.

First, in a case in which the farmer K uniformly inputs the initial value of the feature information of all the cows B (the cows B-1 to B-N), the initial value of the feature information is detected by the detecting unit 120 in the communication terminal 10-1. If the initial value of the feature information detected by the detecting unit 120 is transmitted to the server 20 by the communication unit 130 and received by the communication unit 230 in the server 20, the information acquiring unit 211 acquires the initial value of the feature information, the process executing unit 212 sets the initial values to the feature information of all the cows B (the cows B-1 to B-N) (S21).

Next, in a case in which sensor data of a certain cow is detected by various types of sensors capable of detecting the cow (for example, a sensor included in any one of the external sensor 30, the wearable device 40, the communication terminal 10-1, or the like) and transmitted to the server 20, the information acquiring unit 211 acquires the sensor data of the cow, and the process executing unit 212 analyzes the sensor data of the cow (S22) and analyzes the feature information of the cow.

If some or all of the feature information of the cows B (the cows B-1 to B-N) is updated, the process executing unit 212 determines whether or not there is feature information of a cow satisfying a predetermined relation with the feature information of any personification model among the cows B (the cows B-1 to B-N). If there is feature information of a cow satisfying a predetermined relation with the feature information of any personification model among the cows B (the cows B-1 to B-N), the process executing unit 212 associates the personification model ID with the individual ID of that cow (S23).

If the association between the individual ID and the personification model ID is executed for some or all of the cows B (the cows B-1 to B-N), the information in which the individual ID is associated with the personification model name corresponding to the personification model ID is transmitted to the communication terminal 10-1 in the server 20 by the communication unit 230 (S24), and received by the communication unit 130 in the communication terminal 10-1, and display thereof is controlled by the display control unit 111.

In a case in which there is a personification model ID which the farmer K has no authority to associate with the individual ID, the personification model name corresponding to that the personification model ID is transmitted to the communication terminal 10-1 by the communication unit 230 in the server 20 and received by the communication unit 130 in the communication terminal 10-1, and display thereof is controlled by the display control unit 111. In a case in which the farmer K is considered to desire to the personification model ID corresponding to the displayed personification model name with the individual ID, authority to associate the personification model ID corresponding to the personification model name with the individual ID is purchased on the basis of an input by the farmer K. Further, the personification model name may be output in the AR display having a predetermined positional relation with the position of the cow in the field of view of the user through the output unit 160 of the communication terminal 10 or may be output as voice.

If the farmer K inputs the individual ID and the personification model name, the individual unit ID and the personification model ID corresponding to the personification model name are detected by the detecting unit 120. If the individual ID and the personification model ID detected by the detecting unit 120 are transmitted to the server 20 by the communication unit 130 and received by the communication unit 230 in the server 20, the individual ID and the personification model ID are acquired by the information acquiring unit 211 and associated by the process executing unit 212 on the basis of a manual input (the association between the individual ID and the personification model ID) (S25).

Figure 24:
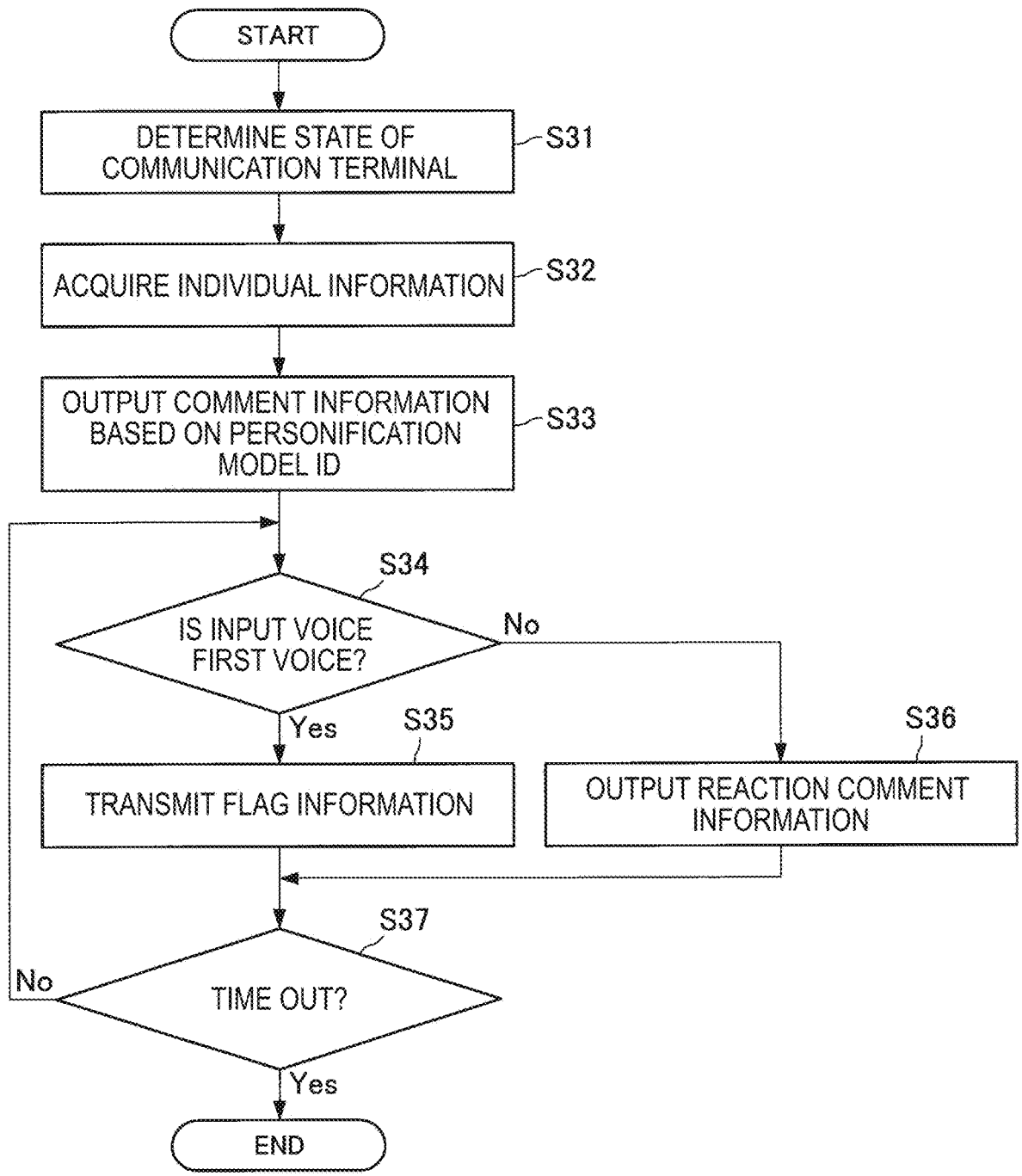
FIG. 24 is a flowchart illustrating an example of a comment information output operation by a communication terminal according to the embodiment.

FIG. 24 is a flowchart illustrating an example of a comment information output operation by the communication terminal 10-1 according to an embodiment of the present disclosure. Further, the flowchart illustrated in FIG. 24 merely illustrates an example of the comment information output operation by the communication terminal 10-1. Therefore, the comment information output operation by the communication terminal 10-1 is not limited to the operation example of the flowchart illustrated in FIG. 24. Further, a part (for example, all or some of S31, S32, and S35) of the operation illustrated in FIG. 24 may be executed by the server 20 instead of the communication terminal 10-1.

As illustrated in FIG. 24, in the communication terminal 10-1, the processing unit 113 determines the state of the communication terminal 10-1 (S31). Examples of the state of the communication terminal 10-1 include the position information of the communication terminal 10-1 and the direction of the communication terminal 10-1. Then, if the communication unit 130 transmits the state of the communication terminal 10-1 to the server 20, the server 20 decides the individual information of one or more of cows located in the field of view of the farmer on the basis of the state of the communication terminal 10-1. The display control unit 111 acquires the decided individual information from the server 20 via the communication unit 130 (S32).

Then, the display control unit 111 controls the display of the icon on the basis of the individual information of the cow. More specifically, the display control unit 111 determines whether or not there is a cow corresponding to a predetermined state with reference to the individual information of the cow, and in a case in which there is a cow corresponding to predetermined state information, the display control unit 111 controls the AR display of the icon corresponding to the predetermined state. Here, the abnormality confirmation, the estrus confirmation, and the periodic measurement are assumed as the predetermined state information.

Then, the control unit 110 acquires the manipulation of the farmer K. In a case in which the manipulation of the farmer K is the icon selection manipulation (that is, the selection manipulation on the icon) corresponding to certain state information of the cow, the output control unit 114 acquires the original data of the comment information in accordance with the state information, generate the comment information corresponding to the original data and the personification model ID, and control the output of the comment information (S33). The speaking style information may be downloaded in advance or may be obtained at an output timing (may be reproduced in a streaming manner).

Then, in a case in which the farmer K considers to perform the confirmation for the cow as a result of visually recognizing the comment information, the farmer K indicates the cow and speaks a voice. Specifically, in a case in which the farmer K considers to confirm the cow immediately, the farmer K indicates the cow and speaks the first sound (the first sound "now" in the example described above). On the other hand, in a case in which the farmer K considers to confirm the cow later, the farmer K indicates the cow and speaks the second sound (the second sound "later" in the example described above). The indication of the cow by the farmer K and the voice spoken by the farmer K are detected by the detecting unit 120.

Then, as the voice recognition process is executed by the processing unit 113, it is recognized whether the voice spoken by the farmer K is the first sound or the second sound. In a case in which the processing unit 113 recognizes the first sound from the voice spoken by the farmer K ("Yes" in S34), the processing unit 113 controls the communication unit 130 such that the flag information corresponding to the first sound is transmitted to the server 20 (S35). In the server 20, if the flag information is received by the communication unit 230, the storage unit 220 stores the flag information in association with the individual ID of the cow.

On the other hand, in a case in which the output control unit 114 recognizes the second sound from the voice spoken by the farmer K ("No" in S34), the output control unit 114 controls the output of the reaction comment information corresponding to the second sound (the comment information Cs-3 "Aw, okay. Do it as soon as possible" in the above example) (S36). In a case in which it is not timed out ("No" in S37), the control unit 110 causes the process to return to S34. On the other hand, in a case in which it is timed out ("Yes" in S37), the control unit 110 ends the operation.

Figure 25:
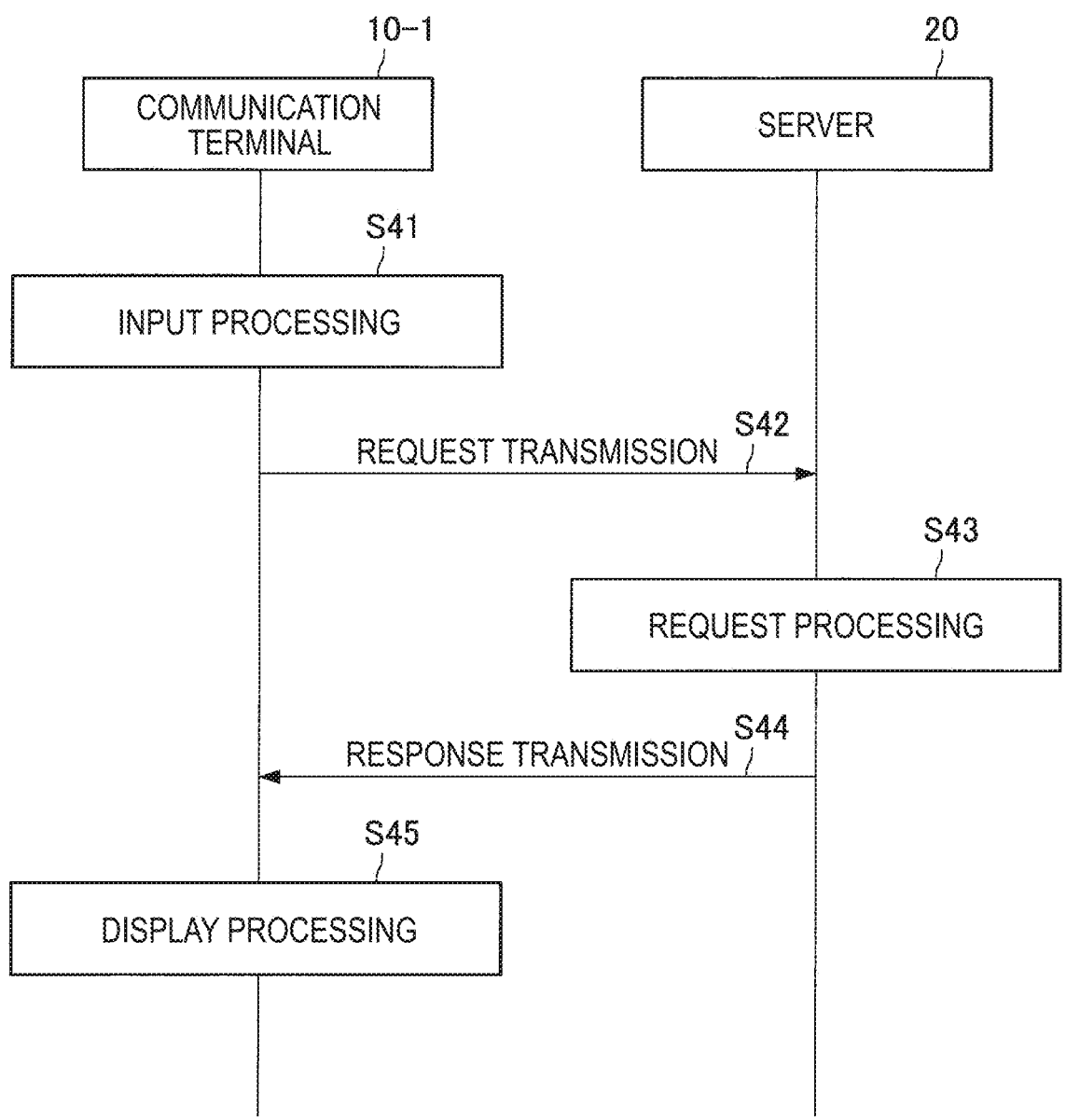
FIG. 25 is a flowchart illustrating an example of an operation of a display control system according to the embodiment.

FIG. 25 is a flowchart illustrating the example of the operation of the display control system 1 according to an embodiment of the present disclosure. Further, the flowchart illustrated in FIG. 25 merely indicates an example of the operation of the display control system 1. Therefore, the operation of the display control system 1 is not limited to the operation example of the flowchart illustrated in FIG. 25.

As illustrated in FIG. 25, in the communication terminal 10-1, an input process is executed by the detecting unit 120 (S41). An example of the input process includes detection of the state (the position information and the direction) of the communication terminal 10-1. Then, the communication unit 130 transmits a request corresponding to the input process to the server 20 (S42). For example, the request may include the state of the communication terminal 10-1.

Then, in the server 20, if the request is received by the communication unit 230, the control unit 210 executes a process for the request (S43). For example, as the process for the request, the information acquiring unit 211 may acquire the individual information of the cow located in the field of view of the farmer on the basis of the state of the communication terminal 10-1 and the position information of each cow.

In the server 20, in a case in which a response based on a processing result is transmitted by the communication unit 230 (S44), the response is received by the communication unit 130 in the communication terminal 10-1. For example, the response may include the individual information of the cow located in the field of view of the farmer. Further, a display process based on the response is executed by the output unit 160 (S45). The display process may be a process of displaying an icon based on the individual information of the cow located in the field of view of the farmer.

The example of the operation of the display control system 1 according to an embodiment of the present disclosure has been described above.

1.7. Hardware Configuration Example

Figure 26:
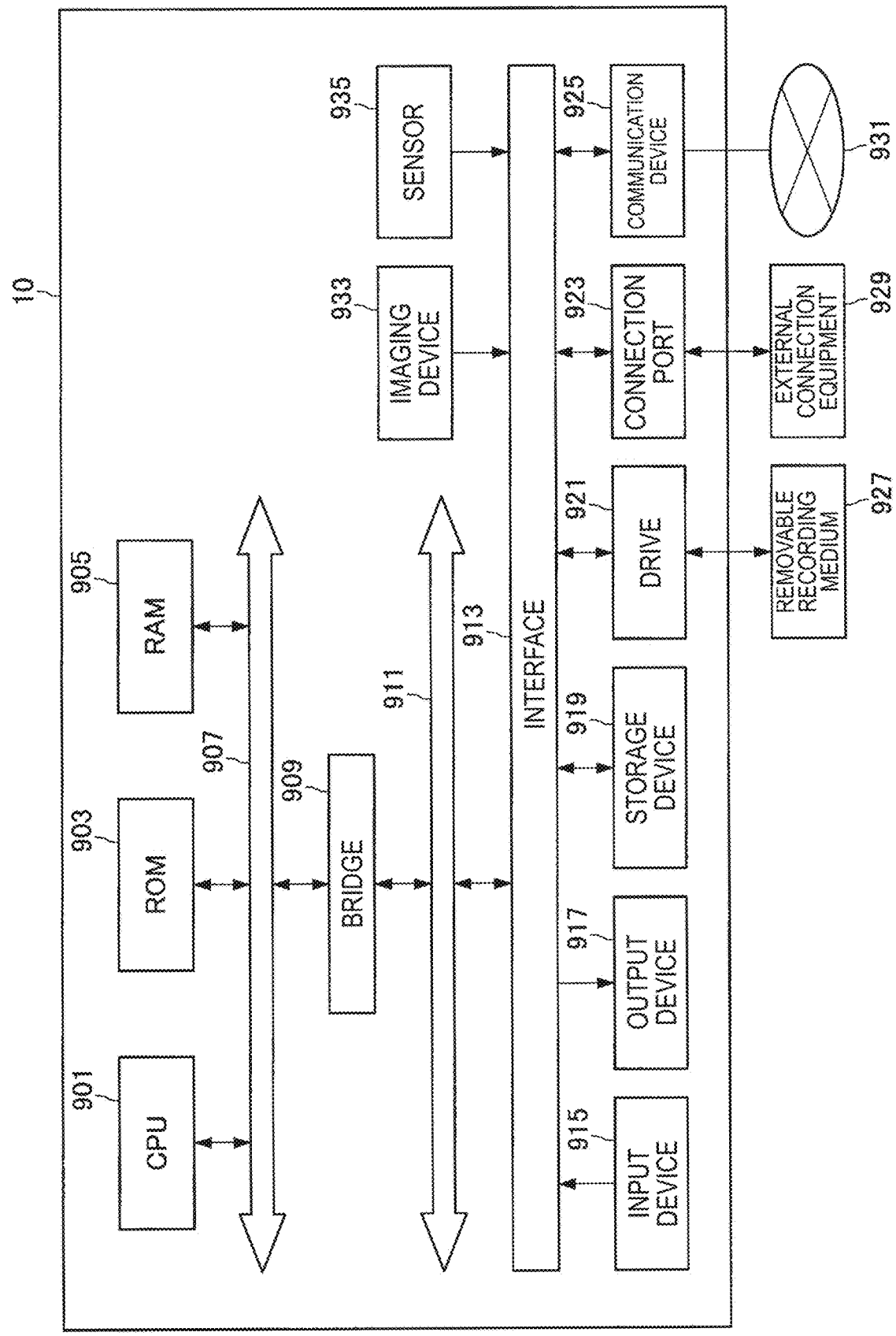
FIG. 26 is a block diagram illustrating a hardware configuration example of a communication terminal according to the embodiment.

Next, with reference to FIG. 26, a hardware configuration of the communication terminal 10 according to the embodiment of the present disclosure will be described. FIG. 26 is a block diagram illustrating the hardware configuration example of the communication terminal 10 according to the embodiment of the present disclosure. Further, the hardware configuration of the server 20 according to an embodiment of the present disclosure can be realized, similarly to the hardware configuration example of the communication terminal 10 illustrated in FIG. 26.

As illustrated in FIG. 26, the communication terminal 10 includes a central processing unit (CPU) 901, read only memory (ROM) 903, and random access memory (RAM) 905. The control unit 110 can be realized by the CPU 901, the ROM 903 and the ROM 905. In addition, the communication terminal 10 may include a host bus 907, a bridge 909, an external bus 911, an interface 913, an input device 915, an output device 917, a storage device 919, a drive 921, a connection port 923, and a communication device 925. Moreover, the communication terminal 10 may include an imaging device 933 and a sensor 935, as necessary. The communication terminal 10 may include a processing circuit such as a digital signal processor (DSP) or an application specific integrated circuit (ASIC), alternatively or in addition to the CPU 901.

The CPU 901 serves as an arithmetic processing device and a control device, and controls the overall operation or a part of the operation of the communication terminal 10 according to various programs recorded in the ROM 903, the RAM 905, the storage device 919, or a removable recording medium 927. The ROM 903 stores programs, operation parameters, and the like used by the CPU 901. The RAM 905 temporarily stores programs used when the CPU 901 is executed, and parameters that change as appropriate when executing such programs. The CPU 901, the ROM 903, and the RAM 905 are connected with each other via the host bus 907 configured from an internal bus such as a CPU bus. In addition, the host bus 907 is connected to the external bus 911 such as a Peripheral Component Interconnect/Interface (PCI) bus via the bridge 909.

The input device 915 is a device operated by a user such as a button. The input device 915 may include a mouse, a keyboard, a touchscreen, a button, a switch, a lever and the like. The input device 915 may include a microphone configured to detect voice of users. The input device 915 may be a remote control device that uses, for example, infrared radiation and another type of radio waves. Alternatively, the input device 915 may be external connection equipment 929 such as a mobile phone that corresponds to an operation of the communication terminal 10. The input device 915 includes an input control circuit that generates input signals on the basis of information which is input by a user to output the generated input signals to the CPU 901. A user inputs various types of data and indicates a processing operation to the communication terminal 10 by operating the input device 915. In addition, the imaging device 933 (to be described later) may function as the input device by capturing an image of movement of hands of a user or capturing a finger of a user. In this case, a pointing position may be decided in accordance with the movement of the hands or a direction of the finger. Further, the detecting unit 120 can be realized by the input device 915.

The output device 917 includes a device that can visually or audibly report acquired information to a user. The output device 917 may be, for example, a display device such as a liquid crystal display (LCD), an organic electro-luminescence (EL), a sound output device such as a speaker or a headphone, or the like. Further, the output device 917 may include a plasma display panel (PDP), a projector, a hologram, a printer, or the like. The output device 917 outputs a result obtained through a process performed by the communication terminal 10, in the form of text or video such as an image, or sounds such as voice and audio sounds. In addition, the output device 917 may include a light or the like to light the surroundings. Further, the output unit 160 can be realized by the output device 917.

The storage device 919 is a device for data storage that is an example of the storage unit of the communication terminal 10. The storage device 919 includes, for example, a magnetic storage device such as a hard disk drive (HDD), a semiconductor storage device, an optical storage device, or a magneto-optical storage device. The storage device 919 stores therein various data and programs executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the communication terminal 10. The drive 921 reads out information recorded on the mounted removable recording medium 927, and outputs the information to the RAM 905. The drive 921 writes the record into the mounted removable recording medium 927.

The connection port 923 is a port used to directly connect equipment to the communication terminal 10. The connection port 923 may be a USB (Universal Serial Bus) port, an IEEE1394 port, and a Small Computer System Interface (SCSI) port, or the like. In addition, the connection port 923 may be an RS-232C port, an optical audio terminal, an HDMI (registered trademark) (High-Definition Multimedia Interface) port, and so on. The connection of the external connection equipment 929 to the connection port 923 makes it possible to exchange various kinds of data between the communication terminal 10 and the external connection equipment 929.

The communication device 925 is a communication interface including, for example, a communication device for connection to the network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transmits signals to and receives signals from another communication device by using a predetermined protocol such as TCP/IP. The network 931 to which the communication device 925 connects is a network established through wired or wireless connection. The network 931 is, for example, the Internet, a home LAN, infrared communication, radio communication, or satellite communication. Further, the communication unit 130 can be realized by the communication device 925.

The imaging device 933 is a device that captures images of a real space by using an image sensor such as a charge coupled device (CCD) or a complementary metal oxide semiconductor (CMOS), and various members such as a lens for controlling image formation of a subject image onto the image sensor, and generates the captured images. The imaging device 933 may capture a still image or a moving image. Further, the detecting unit 120 can be realized by the imaging device 933.

The sensor 935 is various sensors such as a ranging sensor, an acceleration sensor, a gyro sensor, a geomagnetic sensor, a vibration sensor, an optical sensor, and a sound sensor. The sensor 935 acquires information regarding a state of the communication terminal 10 such as a posture of a housing of the communication terminal 10, and information regarding an environment surrounding the communication terminal 10 such as luminous intensity and noise around the communication terminal 10. The sensor 935 may include a global positioning system (GPS) sensor that receives GPS signals to measure latitude, longitude, and altitude of the device. Further, the detecting unit 120 can be realized by the sensor 935.

2. CONCLUSION

As described above, according to an embodiment of the present disclosure, provided is a display control device including a display control unit configured to perform control such that an image corresponding to a state of a target object located in a field of view of a user is displayed at a position having a predetermined positional relation with a position of the target object and an output control unit configured to control output of comment information corresponding to the state of the target object and feature information of the target object in a case in which the image is selected. According to such a configuration, it is possible to manage the target objects with more pleasure.

The preferred embodiment (s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the position of each component is not particularly limited as long as the operations of the communication terminal 10 and the server 20 are realized. Some of the processes of the respective units in the communication terminal 10 may be performed by the server 20. As a specific example, some or all of the blocks (the display control unit 111, the selecting unit 112, the processing unit 113, and the output control unit 114) included in the control unit 110 in the communication terminal 10 may be installed in the server 20 or the like. Further, some of the processes of the respective units in the server 20 may be performed by the communication terminal 10. As a specific example, some or all of the blocks (the information acquiring unit 211, the process executing unit 212, and the information providing unit 213) included in the control unit 210 in the server 20 may be installed in the communication terminal 10 or the like. Further, in addition to the display control device 10 and the server 20, for example, one or more relay devices (not illustrated) that perform the processes of some of the respective units may be installed in the display control system 1. In this case, the relay device may be, for example, a smartphone carried by the user. For example, the relay device includes a communication circuit for communicating with the display control device 10 and the server 20 and a processing circuit for performing some of the processes performed by the respective blocks in the embodiment in the housing of the relay device. Further, when the relay device receives predetermined data from, for example, the communication unit 230 of the server 20, performs the processes of some of the respective units, and transmits data to the communication unit 130 of the display control device 10 on the basis of a processing result or performs communication and processes in an opposite direction, effects similar to those of the embodiment of the operations of the display control device 10 and the server 20 are obtained.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A display control device, including:

a display control unit configured to perform control such that an image corresponding to state information of a target object located in a field of view of a user is displayed at a position having a predetermined positional relation with a position of the target object; and an output control unit configured to control output of comment information of the target object corresponding to the state information of the target object and feature information of the target object.

(2)

The display control device according to (1), in which the target object is a farm animal, and the output control unit performs control for displaying or outputting comment information of the target object by voice so that the user is able to recognize the comment information as speech of the farm animal.

(3)

The display control device according to (1) or (2), in which the display control device comprises a housing capable of being worn on a head of the user, and a display installed in the housing and configured to display the image.

(4)

The display control device according to any one of (1) to (3), in which, in a case in which feature information of previously registered personification model data and the feature information of the target object satisfy a predetermined relation, the output control unit controls output of comment information corresponding to the personification model data.

(5)
The display control device according to any one of (1) to (4), in which, in a case in which national language information is associated with identification information of the target object, the output control unit controls output of comment information corresponding to the national language information.

(6)
The display control device according to any one of (1) to (5), in which, in a case in which dialect information is associated with identification information of the target object, the output control unit controls output of comment information corresponding to the dialect information.

(7)
The display control device according to any one of (1) to (6), in which, in a case in which an indication of the target object is input by the user, the display control unit controls at least one of predetermined display for guiding the user to visually recognize a confirmation location corresponding to the state information in the target object or display of an object for selecting execution of a predetermined operation.

(8)
The display control device according to any one of (1) to (7), in which, in a case in which an indication of the target object and a first sound are input by the user, the display control unit controls display of an object for selecting execution of a predetermined operation, and in a case in which an indication of the target object and a second sound are input by the user, the output control unit controls output of response comment information corresponding to the second sound.

(9)
The display control device according to any one of (1) to (8), in which, in a case in which the target object is located within a predetermined range based on a position of the user, the output control unit controls the output of the comment information.

(10)
The display control device according to (9), in which, in a case in which the state information of the target object indicates a predetermined state even in a case in which the target object is not located within the predetermined range, the output control unit controls the output of the comment information.

(11)
The display control device according to any one of (1) to (10), in which the comment information includes at least one of text data or audio data.

(12)
The display control device according to (11), in which the output control unit controls an output volume of the audio data on the basis of a distance between the target object and the user in a case in which the comment information includes the audio data.

(13)
The display control device according to (11) or (12), in which, in a case in which the comment information includes the text data, the output control unit controls a display size of the text data on the basis of a distance between the target object and the user.

(14)
The display control device according to any one of (1) to (13), in which, in a case in which the number of selections of an image corresponding to the target object exceeds a predetermined threshold value, the output control unit controls predetermined highlighting display associated with the target object.

(15)
The display control device according to (14), in which the predetermined highlighting display includes at least one of a change in a size of the image, a change in color, a change in an output volume of audio data included in the comment information, a change in a frequency of the audio data, or a change in content of the comment information corresponding to the state information of the target object.

(16)
The display control device according to any one of (1) to (15), in which, in a case in which a manipulation of cancelling the output of the comment information of the target object by the user is detected, the output control unit cancels the output of the comment information.

(17)
The display control device according to any one of (1) to (16), in which the feature information of the target object includes at least one of sensor data detected by a sensor capable of detecting the target object, an analysis result of the sensor data, or data input by the user.

(18)
The display control device according to any one of (1) to (17), in which the feature information of the target object includes at least one of an action of the target object, a growth level of the target object, a sex of the target object, an age of the target object, a volume level of the target object, a location of the target object in an area, a location of the target object in a group, information related to an area in which the target object is located, or pedigree information of the target object.

(19)
A display control method, including:

performing control such that an image corresponding to state information of a target object located in a field of view of a user is displayed at a position having a predetermined positional relation with a position of the target object; and controlling, by a processor, output of comment information of the target object corresponding to the state information of the target object and feature information of the target object.

(20)
A program causing a computer to function as a display control device including a display control unit configured to perform control such that an image corresponding to state information of a target object located in a field of view of a user is displayed at a position having a predetermined positional relation with a position of the target object, and an output control unit configured to control output of comment information of the target object corresponding to the state information of the target object and feature information of the target object.

REFERENCE SIGNS LIST

1 display control system
10 communication terminal
110 control unit
111 display control unit
112 selecting unit
113 processing unit
114 output control unit
120 detecting unit
130 communication unit
150 storage unit
160 output unit
20 server 210 control unit
211 information acquiring unit
212 process executing unit
213 information providing unit
220 storage unit
230 communication unit
30 external sensor
310 control unit
320 detecting unit
330 communication unit
350 storage unit
40 wearable device
410 control unit
420 detecting unit
430 communication unit
450 storage unit
50 repeater
60 gateway device
70 breeding machine

The invention claimed is:

1. A display control device, comprising:
processing circuitry configured to:
detect a field of view of a user and a position of a farm animal in the detected field of view;
perform control such that an image corresponding to state information of the farm animal located in the detected field of view of the user is displayed at a position on a display unit having a predetermined positional relation with the detected position of the farm animal; and
control output of comment information of the farm animal corresponding to the state information of the farm animal, wherein the processing circuitry is configured to perform control for displaying or outputting the comment information of the farm animal by voice so that the user is able to recognize the comment information as being associated with the farm animal, wherein, in a case in which national language information is associated with identification information of the farm animal, the processing circuitry is configured to control output of comment information corresponding to the national language information and wherein the display control device comprises a housing capable of being worn on a head of the user, and the display unit is installed in the housing and is configured to display the image.

2. The display control device according to claim 1, wherein, in a case in which feature information of previously registered personification model data and feature information of the farm animal satisfy a predetermined relation, the processing circuitry is configured to control output of comment information corresponding to the personification model data.

3. The display control device according to claim 1, wherein, in a case in which dialect information is associated with identification information of the farm animal, the processing circuitry is configured to control output of comment information corresponding to the dialect information.

4. The display control device according to claim 1, wherein, in a case in which an indication of the farm animal is input by the user, the processing circuitry is configured to control at least one of predetermined display for guiding the user to visually recognize a confirmation location corresponding to the state information in the farm animal or display of an object for selecting execution of a predetermined operation.

5. The display control device according to claim 1, wherein, in a case in which an indication of the farm animal and a first sound are input by the user, processing circuitry is configured to control display of an object for selecting execution of a predetermined operation, and in a case in which an indication of the farm animal and a second sound are input by the user, the processing circuitry is configured to control output of response comment information corresponding to the second sound.

6. The display control device according to claim 1, wherein, in a case in which the farm animal is located within a predetermined range based on a position of the user, the processing circuitry is configured to control the output of the comment information.

7. The display control device according to claim 6, wherein, in a case in which the state information of the farm animal indicates a predetermined state even in a case in which the farm animal is not located within the predetermined range, the processing circuitry is configured to control the output of the comment information.

8. The display control device according to claim 1, wherein the comment information includes at least one of text data or audio data.

9. The display control device according to claim 8, wherein the processing circuitry is configured to control an output volume of the audio data on a basis of a distance between the farm animal and the user in a case in which the comment information includes the audio data.

10. The display control device according to claim 8, wherein, in a case in which the comment information includes the text data, the processing circuitry is configured to control a display size of the text data on a basis of a distance between the farm animal and the user.

11. The display control device according to claim 1, wherein, in a case in which a number of selections of an image corresponding to the farm animal exceeds a predetermined threshold value, the processing circuitry is configured to control predetermined highlighting display associated with the farm animal.

12. The display control device according to claim 11, wherein the predetermined highlighting display includes at least one of a change in a size of the image, a change in color, a change in an output volume of audio data included in the comment information, a change in a frequency of the audio data, or a change in content of the comment information corresponding to the state information of the farm animal.

13. The display control device according to claim 1, wherein, in a case in which a manipulation of cancelling the output of the comment information of the farm animal by the user is detected, the processing circuitry is configured to cancel the output of the comment information.

14. The display control device according to claim 1, wherein feature information of the farm animal includes at least one of sensor data detected by a sensor capable of detecting the farm animal, an analysis result of the sensor data, or data input by the user.

15. The display control device according to claim 1, wherein feature information of the farm animal includes at least one of an action of the farm animal, a growth level of the farm animal, a sex of the farm animal, an age of the farm animal, a volume level of the farm animal, a location of the farm animal in an area, a location of the farm animal in a group, information related to an area in which the farm animal is located, or pedigree information of the farm animal.

16. A display control method executed by processing circuitry of a display control device, the method comprising:

detecting a field of view of a user and a position of a farm animal in the detected field of view;

performing control such that an image corresponding to state information of the farm animal located in the field of view of the user is displayed at a position on a display unit having a predetermined positional relation with the detected position of the farm animal; and controlling output of comment information of the farm animal corresponding to the state information of the farm animal, including performing control for displaying or outputting the comment information of the farm animal by voice so that the user is able to recognize the comment information as being associated with the farm animal, wherein, in a case in which national language information is associated with identification information of the farm animal, the processing circuitry controls output of comment information corresponding to the national language information and wherein the display control device comprises a housing capable of being worn on a head of the user, and the display unit is installed in the housing and is configured to display the image.

17. A non-transitory computer readable medium containing instructions that, when executed by processing circuitry of a display control device, are configured to:

detect a field of view of a user and a position of a farm animal in the detected field of view;

perform control such that an image corresponding to state information of the farm animal located in the detected field of view of the user is displayed at a position on a display unit having a predetermined positional relation with the detected position of the farm animal, and control output of comment information of the farm animal corresponding to the state information of the farm animal, including performing control for displaying or outputting the comment information of the farm animal by voice so that the user is able to recognize the comment information as being associated with the farm animal, wherein, in a case in which national language information is associated with identification information of the farm animal, the processing circuitry controls output of comment information corresponding to the national language information and wherein the display control device comprises a housing capable of being worn on a head of the user, and the display unit is installed in the housing and is configured to display the image.

* * * * *